US005617332A

United States Patent [19]
Fressola

[11] Patent Number: 5,617,332
[45] Date of Patent: Apr. 1, 1997

[54] METHOD AND SYSTEM FOR PRODUCING STEREOGRAPHIC IMAGES OF CELESTIAL OBJECTS

[76] Inventor: Alfred A. Fressola, 40 Todd's Way, Easton, Conn. 06430

[21] Appl. No.: 230,748

[22] Filed: Aug. 10, 1988

[51] Int. Cl.[6] ................................................ G06F 17/00
[52] U.S. Cl. .................................................. 364/514 R
[58] Field of Search ............................. 364/518, 522, 364/578, 514 R; 358/88, 89; 395/140, 141, 155, 161, 119, 127

[56] References Cited

U.S. PATENT DOCUMENTS

| | | |
|---|---|---|
| 4,558,359 | 12/1985 | Kuperman et al. .................. 364/522 X |
| 4,625,290 | 11/1986 | White ...................................... 364/522 |
| 4,660,157 | 4/1987 | Beckwith et al. ....................... 364/522 |
| 4,685,070 | 8/1987 | Flinchbaugh ............................ 364/522 |
| 4,809,065 | 2/1989 | Harris et al. ......................... 364/522 X |

FOREIGN PATENT DOCUMENTS 2169779  7/1986  United Kingdom ................... 364/522

*Primary Examiner*—Ellis B. Ramirez
*Attorney, Agent, or Firm*—Ware, Fressola, Van Der Sluys & Adolphson

[57] ABSTRACT

A method and system of producing stereographic images of celestial objects uses distance information to offset one of two images produced on a display device. A digital computer under program control is used in combination with a user input device, such as a keyboard, and a display device, such as a computer monitor and/or a printer.

38 Claims, 17 Drawing Sheets

```
        ALLSTAR  ASTRONOMIC  IMAGING  SYSTEM
              WITH  STEREO  VIEWING

Stereo Viewing  :  YES

Right Ascension :  5:42:00   OR  5.7000

Declination     :  -2:00:00  OR  -2.0000

Viewing Size    :  40.00

Coordinates : Y

Border : Y

Messier Objects : N

Arrow : N

Meteor Shower : N

Go          Quit
```

FIG. 4

| Viewed at 0.06 parsecs | Viewed at 0.06 parsecs |
|---|---|
| -24:12' | -24:12' |
| -27:56' | -27:56' |
| 07:04:15   05:42:07   04:19:59 | 07:04:15   05:42:07   04:19:59 |

*Fig. 5*

| Viewed at 0.06 parsecs | Viewed at 0.06 parsecs |
|---|---|
| -24:12' | -24:12' |
| -27:56' | -27:56' |
| 07:04:15   05:42:07   04:19:59 | 07:04:15   05:42:07   04:19:59 |

*Fig. 8*

| Viewed at 0.06 parsecs | Viewed at 0.06 parsecs |
|---|---|
| 39:43' 21:06:54 | 39:43' 21:06:54 |
| 36:08' | 36:08' |
| 89:15' | 89:15' |
| 42:11' | 42:11' |
| 15:01:54  12:10:21  09:18:48 | 15:01:54  12:10:21  09:18:48 |

*Fig. 9*

| 42:43'  20:15:29 | 04:06:35 |

89:15'

| 65:26' | | |
|---|---|---|
| 16:36:12 | 11:17:51 | 05:59:30 |

|
   04:10:48              03:41:11              03:11:35
```

1. spaceremove (remove leading spaces from the incoming string variable 2. beep (generate beep sound)

3. select (allow selection of specified characters)

4. rh_display (display right ascension coordinate information on celestial display(s))

5. convert_hms (convert from decimal hour to hour, minute and second)

6. dec-display (display declination coordinate information on celestial displays(s))

7. function conststr (fill a character "C" for "N" times)

8. Inputstr (input procedure for right ascension, declination and viewing area information. Procedure uses space or color characters for color)

9. indat (restrict input data by numerical value and sign)

10. errornew (write error message on line 24 of the display and wait for a key to be pressed)

11. say (displays data with highlighting of selected characters using the !)

12. iocheck (check for I/O error; print message if needed)

13. errormessage (display a desired error message)

14. title (to print title message on each menu display)

15. mainmenu (main menu for user input, celestial display and exiting program)

16. arrowdraw (draws arrow on celestial display. Arrow movable by cursor keys and the diagonal keys, (Home, PgUp, End, and PgDn))

17. meteor_show (displays simulated meteor shower in single or stereographic pairs. Repetition rate, meteor speed, meteor length randomly varied from meteor to meteor)

METHOD AND SYSTEM FOR PRODUCING STEREOGRAPHIC IMAGES OF CELESTIAL OBJECTS

The computer program implemented by the present invention is set forth in Table 1 and the data used in the execution of the program is found in Table 2. The source code listings for Borland International's Turbo Graphics™Toolbox, version 1, procedures entitled GRAPHIX.SYS, KERNEL.SYS, TYPEDEF.SYS, WINDOWS.SYS and 4×6. FON are presented in Tables 3, 4, 5, 6 and 7 respectively. All tables follow the section entitled Best Mode for Carrying Out the Invention. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates to generating stereographic images of celestial objects such as stars, Messier objects, Halley's comet, and meteors through use of dual map projections in which the object's astronomical distance from the earth affects its projected image.

BACKGROUND OF THE INVENTION

With the advent of computers, and in particular personal computers, a number of programs have been developed that map celestial objects from their normal spherical coordinates into two-dimensional coordinates using well-known map projection techniques commonly used by cartographers. Celestial objects such as stars, nebulae, and planets have their positions in the sky recorded in a spherical coordinate system similar in concept to use of latitude and longitude to record the positions of geographic locations on the earth.

In the terrestial coordinate system, the lines of longitude pass through the earth's North and South poles, while the parallel lines of latitude intersect these lines of longitude to form a spherical grid. The lines of longitude start at zero degrees and extend to 180 degrees east of the prime meridian (which passes through Greenwich, England) to encompass one hemisphere, and extend another 180 degrees west of the prime meridian to encompass the earth's other hemisphere. Thus the lines of longitude extend throughout 360 degrees of a sphere.

Similarly, in celestial coordinates there are lines that pass through the North and South poles of the celestial sphere. These lines are known as right ascension. Instead of these lines being in units of degrees, they are in units of hours, where one hour of right ascension is equal to 15 degrees. Thus to define all 360 degrees of the celestial sphere, there are 24 hours of right ascension, ranging from zero hour to twenty-three hours.

The parallels of latitude on the terrestial sphere are in units of degrees, ranging from zero degrees on the equator to 90 degrees at the North and South poles. There are thus 90 degrees of latitude north of the equator and 90 degrees of latitude south of the equator.

The corresponding lines that define the celestial sphere are call lines of declination. Like the terrestial lines of latitude, these lines of declination are in units of degrees both north and south of the celestial equator. The lines north of the celestial equator are called positive or plus (+) lines of declination while the lines south of the celestial equator are called negative or minus (−) lines of declination.

An excellent discussion of the celestial sphere and its coordinate system is presented in Guy Ottewell's *The Astronomical Companion*, pages 4–11 (published by G. Ottewell at the Department of Physics, Furman University, Greenville, S.C.).

As is well known for terrestial mapping, there are many mathematical projection techniques to translate points on a spherical surface into points on a planar surface. An in depth review of virtually all the well-known mapping techniques is presented in *Map Projections—A Working Manual*, by John P. Snyder (published by the U.S. Geological Survey, Professional Paper 1395, dated 1987). One such technique which has also found use for projecting the celestial sphere onto a planar surface is known as a stereographic projection. According to Snyder, this map projection technique has probably been known since the times of the ancient Egyptians. The technique projects all points on a hemisphere to a plane perpendicular an axis through the sphere, with the lines of projection emanating from the axis' pole opposite the plane (see *Map Projections*, above, at pages 154–163, as well as FIG. 1 herein).

Richard Berry wrote a computer program in the BASIC language called Stars. Bas (as published in the August, 1985 issue of *Astronomy* magazine, pages 66–71) which performs a stereographic map projection of celestial objects onto the planar surface of a computer monitor. The stereographic map projection technique used by Berry is used in the preferred embodiment of the present invention, although other types of map projection techniques can also be used.

The stereographic map projection technique is used in the present invention to achieve a new result; namely, to generate two corresponding but different planar projections of the same portion of the celestial sphere. One projection is for viewing by the observer's left eye while the other projection is for viewing by the observer's right eye. The difference between the two projections is a function of the celestial object's distance from the earth, so that celestial objects closer to the earth than other celestial objects are presented with a greater horizontal offset. In this way, when the two images are merged into one by the observer's eyes (and brain) the celestial objects will be perceived in three dimensions with respect to each other.

Due to the extreme distances of celestial objects from the earth, the horizontal offsets displayed actually represent views of the celestial objects as if the viewer's left and right eyes were separated from one another by up to trillions of miles, and thus the present invention is able to present a view of the heavens heretofore unobservable.

SUMMARY OF THE INVENTION

The present invention provides a method to view celestial objects in a three-dimensional manner by displaying on a digital computer monitor, or other viewing device, two images of the same region of the celestial sphere in a manner that causes objects that are closer to the earth than others in the same region to appear closer to the viewer. More particularly, the two images are displayed side-by-side so that the lefthand image is intended for viewing by only the viewer's left eye while the right-hand image is intended for viewing by only the viewer's right eye. Such side by side images are generally known as stereoscopic pairs or stereographs. Similar images of terrestrial landscapes and other scenes (including some celestial objects with rapid angular movement with respect to the earth, such as the moon and some comets—see *sky and Telescope*, April, 1988, pp.366–369) were widely photographed during the latter part of the nineteenth century and the early part of the present century.

The stereographs of terrestial objects are generally made by photographing the same scene by two cameras separated by a distance commensurate with a person's interocular distance. The two images are generally viewed with a stereoscope which contains lenses that provide eye relief to facilitate the left eye only focusing on the left photograph and the right eye only focusing on the right photograph.

The stereographic images of the present invention represent two views of the celestial sphere from the perspective of such views being separated by trillions of miles rather than a few centimeters typical for interocular distances. In this way the great distances of the stars and other celestial objects can be projected so as to generate a true three-dimensional image of the sky. The images can be merged into one three-dimensional image by means of a stereoscope or by viewing the centerline (actual or apparent) between the two images and mentally allowing this centerline to separate, resulting in a three-dimensional image in the middle of the viewer's field of view.

Since the region displayed is user selectable and can vary greatly in size and in object distances within the selected area, the projection system determines the closest celestial object within the field of view and adjusts the apparent spacial separation of the two views so that the closest object will appear to the viewer to be some minimum apparent distance to the viewer, such as an object which is within several feet from the viewer. This adjustment thereby prevents any object from appearing so close to the viewer that the viewer's eyes would be unable to merge the left and right eye images into one three-dimensional view.

The present viewing technique also allows generation of a simulated meteor shower in either two dimensions or in a stereographic pair representing three-dimensions. The apparent closeness of each meteor's path is randomly varied from meteor to meteor to more accurately simulate actual meteor paths. In addition, the duration, speed and direction of each meteor is randomly varied to better simulate an actual meteor shower.

Another feature of the viewing technique includes the display of the Messier objects. These objects were first identified by Charles Messier in the mid 1700's and represent many of the brightest star clusters, nebulae and extragalatic objects viewable in the northern hemisphere. The objects can be displayed with or without display of their corresponding Messier Number.

In addition, the viewing technique can display the coordinates of the celestial viewing area as well as the coordinates of the object closest to the celestial pole within the field of view.

A marking arrow can also be displayed to facilitate the use of the display as a teaching tool.

Inverse display of the viewing area is also available whereby the background is represented as a bright area and the celestial objects as dark objects.

The relative magnitude of the stars and other celestial objects is represented by corresponding increased size of the object.

A printout of the selected viewing area is also available in both normal background and inverse background.

OBJECTS OF THE INVENTION

It is a principal object of the present invention to provide a method for determining and displaying a three-dimensional projection of any selected portion of the celestial sphere, incorporating into the projection distance information of the celestial objects within the selected portion.

Another object of the present invention is to provide a method of displaying a three-dimensional projection of a selected portion of the celestial sphere wherein two side-by-side map projections of the selected portion are presented with the celestial objects of one projection offset in one dimension inversely proportional to the distance of each object from the earth so that when the viewer's left and right eyes merge the two projections to form a true three-dimensional image of the displayed celestial objects.

A still further object of the present invention is to provide a method of displaying a three-dimensional projection of a selected portion of the celestial sphere as described above, wherein the apparent spacial separation of the viewing positions of the two images is displayed.

A further object of the present invention is to provide a method of displaying a three-dimensional projection of a selected portion of the celestial sphere as described above, wherein the coordinates of the selected portion are displayed.

Another object of the present invention is to provide a method of displaying a three-dimensional projection of a selected portion of the celestial sphere as described above, further providing display of simulated meteor showers in a two or three-dimensional projection.

A further object of the present invention is to provide a method of displaying a three-dimensional projection of a selected portion of the celestial sphere as described above, with display of Messier objects and Halley's comet.

A still further object of the present invention is to provide a method of displaying a three-dimensional projection of a selected portion of the celestial sphere as described above, which provides means for printing the image displayed.

Other objects of the present invention will in part be obvious and will in part appear hereinafter.

BRIEF DESCRIPTION OF THE DRAWINGS

For a fuller understanding of the nature and objects of the present invention reference should be made to the accompanying detailed description and the following drawings, wherein:

FIG. 4 is a display of the MainMenu procedure forming part of the computer program use to instruct the generation of celestial images.

FIG. 5 shows a selected portion of the celestial sphere about the constellation Orion in a stereographic pair of images, illustrating the display of coordinate information and the display of a border.

FIG. 8 is another stereographic pair about the Orion constellation showing display of Comet Halley's track as well as a simulated meteor from a meteor shower.

FIG. 9 shows a stereographic pair of images about the North Celestial Pole with display of coordinate information.

FIG. 10 shows a single image display of the celestial region about the North Celestial Pole with display of coordinate information.

FIG. 11 shows a stereographic pair of images about the South Celestial Pole with display of coordinate information.

FIG. 12 shows a single image display of the celestial region about the Seven Sisters (Pleaides) with a viewing size of a first amount.

FIG. 13 shows a single image display of the celestial region about the Seven Sisters (Pleaides) with a viewing size of a second amount smaller in size than that of FIG. 12.

FIGS. 14A–14E comprise an overall flow chart of the program set forth in Table 1.

FIG. 14F is a diagram showing how FIGS. 14A–14E are to the put together.

BEST MODE FOR CARRYING OUT THE INVENTION

Figure 2:
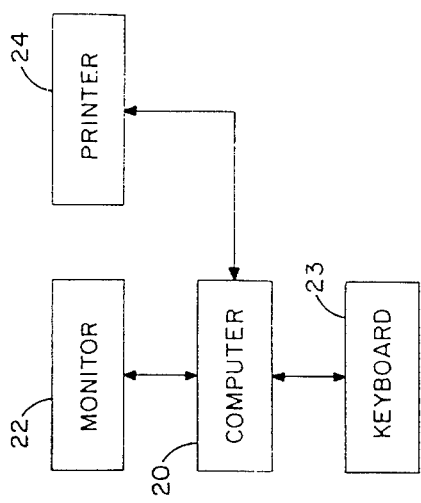
FIG. 2 shows typical computer hardware used to generate the celestial images of the present invention.

The present invention is directed to a method of generating a stereographic pair of images of a selected region of the night sky so as to accurately depict the relative distances of stars and other celestial objects in a three-dimensional manner when the pair is merged by the observer into a single image. The stereographic pair is directly analogous to the stereographic pairs commonly used in the late 1800's and early 1900's to illustrate landscapes and other objects. The same concept is employed today in the popular Viewmaster® displays which allow the observer to view two transparencies of the same object in a way that allows the images to be merged into one image that contains three-dimensional information.

The underlying concept employed by such stereographic pairs is quite straightforward; namely, take two pictures or photographs of the the same scene or object from slightly different locations which are offset from each other by approximately the same distance as a person's interocular distance (the distance between the pupils of a person's eyes— approximately 3 inches or 7.62 centimeters). In this manner the two images if separately seen by the observer's left and right eyes, mimic what the observer would "see" if the same scene was directly observed.

Of course when a person looks at the night sky the stars do not appear in three-dimensions since they are so far from the earth that they all appear to be infinitely distant. The observer's left and right eyes see no angular difference since the person's interocular distance is infinitesimal compared to the distance of the star. Indeed, the closest star to the earth after the sun is alpha centauri C (also known as Proxima Centauri), which is 1.295 parsecs from the earth. A parsec is equal to approximately 3.259 light years, where one light year is the distance light travels in one year (a parsec corresponds to the distance at which an object would have an annual parallax of one arc second—1/3600 of one degree—when observed from two opposite points on the earth's orbit about the sun). Since light travels 186,300 miles per second (approximately 300,000 kilometers per second), a light year is equal to approximately $5.9 \times 10^{12}$ miles ($9.47 \times 10^{12}$ kilometers). Thus the closest star to the earth is approximately 19.2 trillion miles (30.9 trillion kilometers) away.

Therefore in order to generate a stereographic pair of the night sky with three-dimensional information that the human eye can see, it is necessary that the parallax or angles subtended between the two images be comparable to the angles that one sees when relatively close objects are seen. For instance, if an interocular distance ("s") is assumed to be three inches (7.62 cm), then an object four meters away subtends an angle of 0.01905 radians or 1.09 degrees (based on the equation s=(r)×(theta)), where s is the subtended distance, r is the radius, and theta is the subtended angle, see FIG. 3). Similarly for a star 1.295 parsec from the earth (corresponding to the value of r) the distance between the left and right eye views to appear four meters away is:

$$s = 1.295 \times 0.01905$$

or 0.253 parsec, which is equal to approximately 485 billion miles (762 billion kilometers). It is therefore clear that the two views must represent views "seen" apart from each other by very great distances if a three-dimensional stereographic pair is to be generated.

Figure 3:
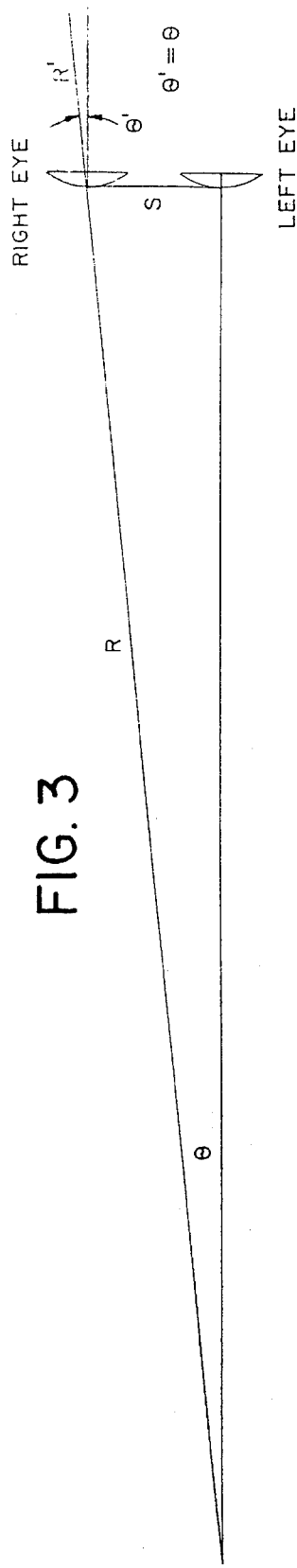
FIG. 3 shows how a stereographic pair of images is seen by a viewer so as to form a merged single image having true three-dimension perspective.

It has been experimentally found that the maximum displacement between the left and right views that the human eye can merge into a single image without the use of a stereoscope is approximately 3/8 of an inch (0.375 inch or 9.525 mm). This offset is the same as an object seen at a distance of four meters for a typical human eye focal length of 50 millimeters. As seen in FIG. 3, s is 0.07624 meter, r is 4 meters, and therefore theta is 0.01905 radian. If the eye focal length is 50 millimeters, then r' is 0.05 meter, theta' is equal to theta and thus s' is (0.05)×(0.01905)=9.525 millimeters, or 3/8 inch (0.375 inch).

From an astronomic perspective such an offset corresponds to a parsec spacing between the two views of approximately 0.253 parsec if the object is as close to the earth as Proxima Centauri. That is, the 3/8 inch offset is proportional to 4 meters in the same ratio as a 0.253 parsec spacing is to 1.295 parsecs.

Although the offset discussed above is with respect to the right eye, an equal amount of offset in the opposite direction would result in the same stereographic perspective if such an offset is applied to the image seen by the left eye and no offset presented in the right eye image.

Alternatively, if the object shown in FIG. 3 is positioned along the midpoint between the left and right eyes, geometry shows that each eye would have an offset equal to one-half that obtained in the above examples. Such offsets would then be presented to the left eye and right eye images with the same end result.

Overview of the Implementing Computer Program and Hardware

The computer program for implementing a stereographic pair of astronomic images of any selected region of the celestial sphere is presented in Table 1 which appears at the end of this specification along with Table 2 identified below. Copyright is claimed in the computer program but the copyright owner hereby authorizes facsimile reproduction of the patent document, including the copyrighted computer program.

The computer program is written in Borland International's Turbo Pascal® ver. 3.0 (Borland International, Inc., 4585 Scotts Valley Drive, Scotts Valley, Calif. 95066). The program incorporates graphic routines published by Borland International known as Turbo Graphix Toolbox™. These routines are specifically implemented in the computer program for use in Hercules™ graphics, a monochromatic graphic standard developed by Hercules Computer Technology Inc., 2550 Ninth Street, Berkeley, Calif. 94710. As implemented in the Graphix™ routines, this monographic display has a horizontal resolution of 720 pixels (points) and a vertical resolution of 350 pixels.

The computer program can be run on IBM PC's or compatible computers, such as computer 20 shown in FIG. 2, having an associated monitor 22 and keyboard 23 and an optional printer 24 for hardcopy output of the celestial images.

Figure 1:
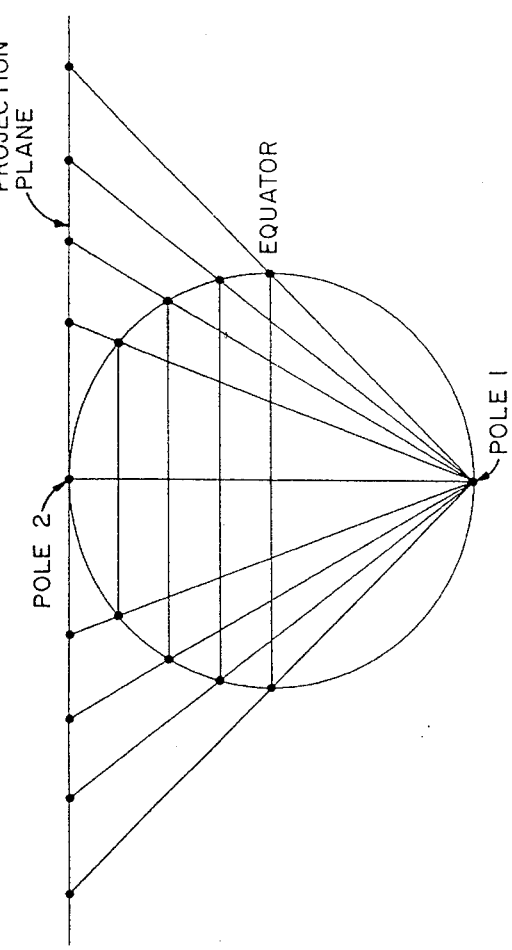
FIG. 1 is a perspective view of the manner in which a stereoscopic type map projection transforms or "maps" a portion of a spherical surface onto a planar surface.

This program projects stars and other celestial objects onto a two-dimensional image using the stereographic map projection technique as shown in FIG. 1 and as discussed in *Map Projections—A Working Manual*, by John P. Snyder and published by the U.S. Government Printing Office, Washington, D.C. (1987). The actual equations used for a non-offset image were published in *Astronomy Magazine*, August, 1985 at pages 66–76 in a program written by Richard Berry.

The data for the celestial objects is stored in a database file called allstst.dat (see Table 2). This file is based upon a celestial object database file called stars.dat used in conjunction with Berry's program. Both database files store the celestial object data in humanly readable ASCII (American Standard Code for Information Interchange) form. The allstst.dat database file was validated using the data in *Sky Catalogue* 2000.0, volume 1, edited by Alan Hirshfeld and Roger W. Sinnott, published by Sky Publishing Corp. (1982). Star distance information was obtained using the data and formulae from *Sky Catalogue* 2000.0, while Messier object distance information was obtained from *The Telescope Handbook and Star Atlas*, by Neale E. Howard; Thomas Y. Crowell Publishers (1975). Distance information concerning the orbital positions of Halley's Comet can be obtained from *Mankind's Comet*, by Guy Ottewell and Fred Schaaf, published by the Astronomical Workshop, Furman University, Greenville, S.C. (1985), although such data is not currently implemented in the allstst.dat database.

Operation of the Computer Program

The first step in operating the program is loading data stored in the celestial objects database file (allstst.dat) into the computer's random access memory (RAM) in such a manner that all pertinent information concerning the object's celestial coordinates (right ascension and declination), magnitude, and distance from the earth is extracted, manipulated, and stored in arrays (see pages 21–23 of Table 1 starting with "Main Program"). Messier object number information is also extracted. Other information such as the celestial object's name (if any) or astronomic identifying information or color information could also be extracted if such information is to be used by the program (such as to display the object's name or its color— the latter if using a color graphics standard such as the color graphics adapter— CGA— or the enhanced graphics adapter—EGA— used with IBM and IBM—compatible computers). The data read from the database file can be viewed by the user (see page 22 of Table 1). The display of such data as read by the program is presented in Table 3.

TABLE 3

| No. | RA HH:MM:SS.F | DEC DD.MM.SS | MAG | B-V | STAR | | DIST | CONSTELLATION |
|---|---|---|---|---|---|---|---|---|
| 742 | 21:42:42.0 | −18.52'00" | 4.7 | 0.88 | KAPPA | CAP | 77 | CAPRICORNUS |

Once the data is read into RAM, the user can select or accept the default values for the following parameters from a main menu: stereo viewing, right ascension, declination, viewing size, coordinate display, a border around the selected image(s)— only one image is displayed for non-stereo viewing—, Messier object display as ellipses, Halley's Comet track display, a pointing arrow, and meteor shower display. As shown in FIG. 4, the parameter selection is made by choosing the highlighted letter embodied in each parameter displayed; such as the highlighted "S" in the phrase "Stereo Viewing".

FIG. 4 shows the complete menu generated by the computer program. The right ascension coordinate information is displayed in both angular hours, minutes, and seconds, and in hours and decimal remainder. Similarly the declination is displayed in both degrees, minutes and seconds, and degrees and decimal remainder.

Once the parameter settings are made, the user instructs the program to generate the desired image by selecting the "Go" command.

Figure 6:
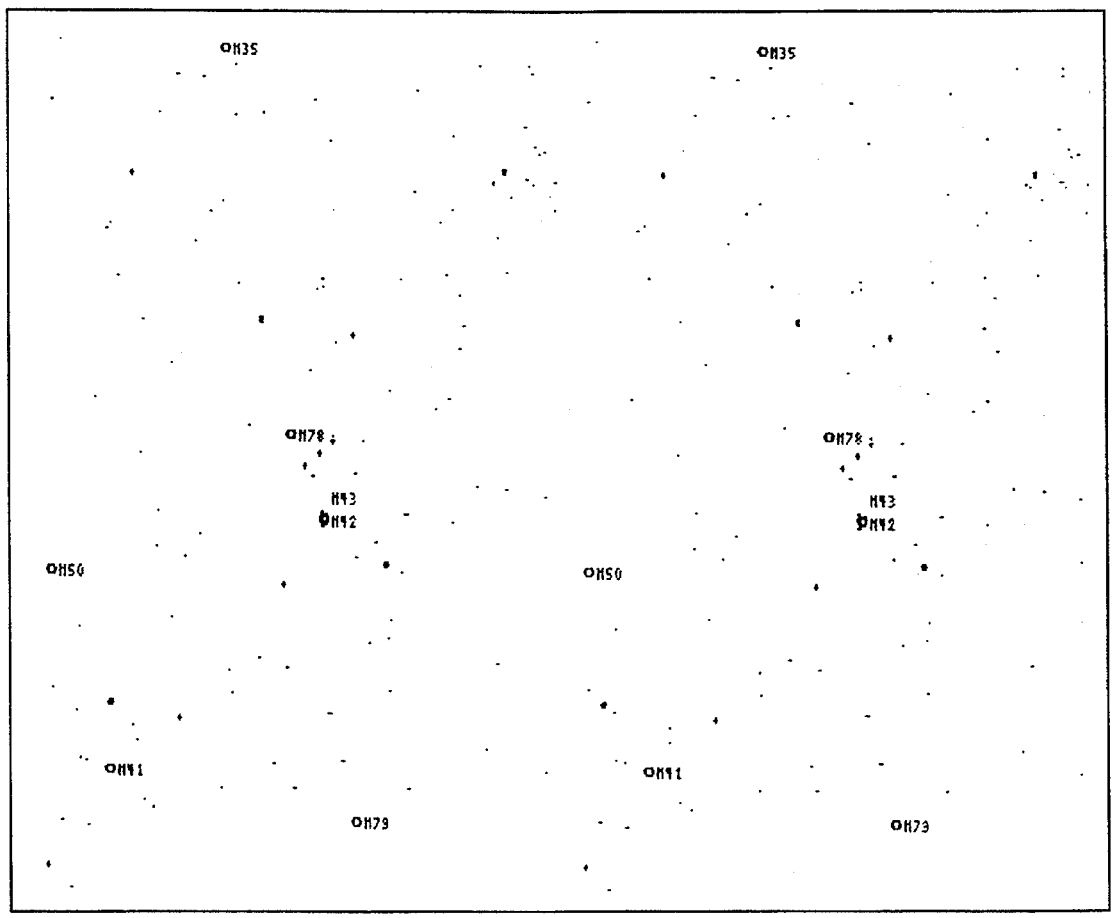
FIG. 6 illustrates a stereographic pair of the same portion of the celestial sphere as shown in FIG. 5, further including Messier object unique display, but without the display of coordinate information or a border.
Figure 7:
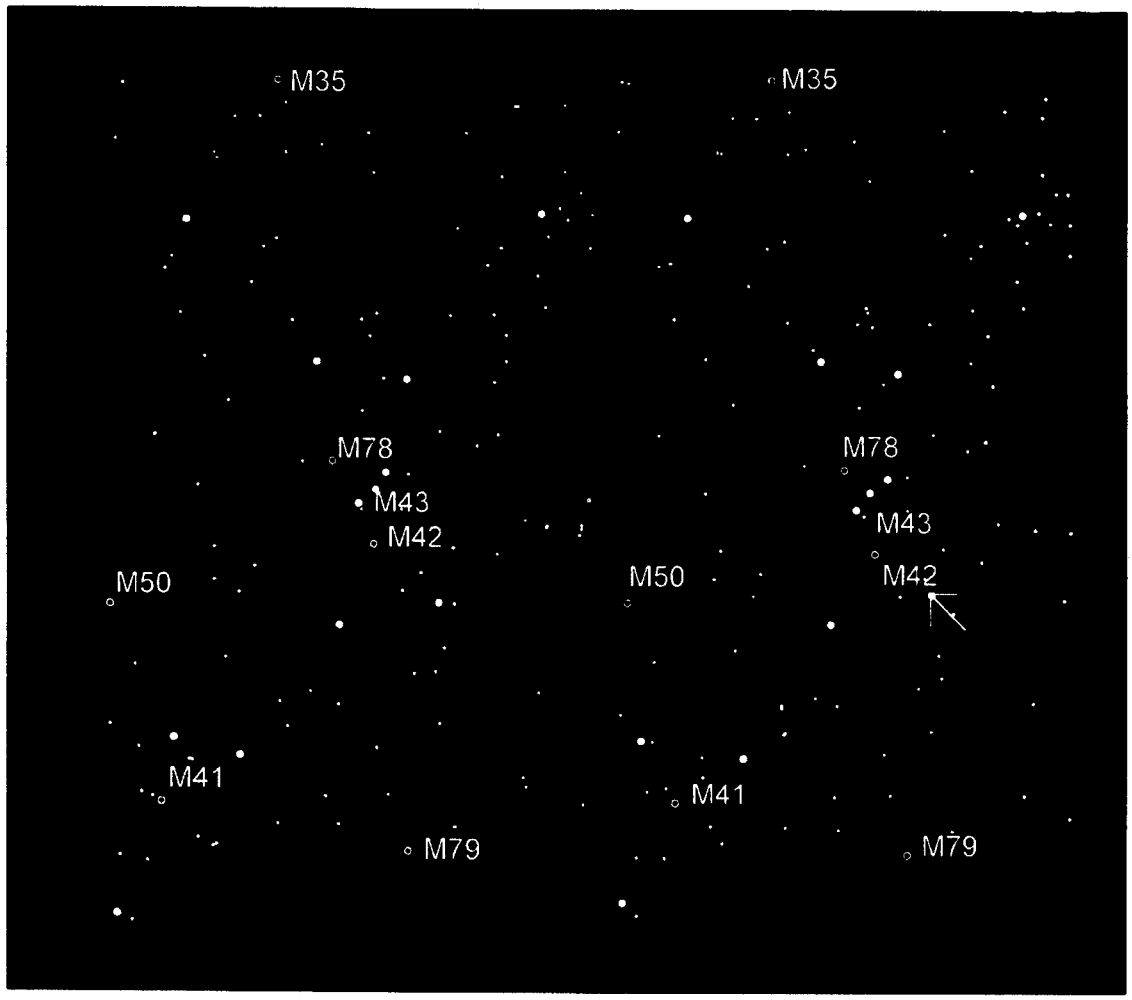
FIG. 7 shows the same stereographic pair of images as shown in FIGS. 5 and 6 but with an inverse background and also with a pointing arrow.

A typical stereographic pair of images for the region about the constellation Orion, with coordinate information display and a border is shown in FIG. 5. The same celestial region without a border and without display of coordinate information, but with display of Messier objects is shown in FIG. 6. The display of the same region in inverse background and with the display of a pointing arrow is shown in FIG. 7. FIG. 8 is a similar celestial display in normal background showing both the projection of Comet Halley's path during its most recent approach to the sun and the stereographic display of a simulated meteor.

Such images can be merged into a single three-dimensional image by having the left eye focus on the lefthand image and the right eye focus on the righthand image. This merging can be achieved by use of a stereoscope or unaided by focusing both eyes on the centerline (actual or apparent) separating the two images and then letting this centerline separate farther and farther apart until the three-dimensional image appears in the middle portion of the viewer's field of view. A small card having a width of approximately 1.75 inches (4.45 cm) and a length of approximately 3.5 inches (8.89 cm) can also be used as an aid by placing the card on an imaginary line bisecting the viewer's eyes and adjusting the card's distance from the viewer's eyes so that the left eye can only see the lefthand image and the right eye can only see the righthand image; and then letting these two images merge into one.

FIG. 9 is a display of the region about the North celestial pole showing the display of the star with the maximum declination value (Polaris) as well as other coordinate information. FIG. 10 shows the same region in a single non-stereo display. Finally, FIG. 11 shows a stereographic pair display about the South celestial pole, including the well-known Southern Cross.

The area viewed can be adjusted by the user through use of the "Viewing Size" parameter (see FIG. 4). FIGS. 12 and 13 show two stereographic pair images of the famous Seven Sisters (Pleiades) for two different viewing sizes. In this manner the user can enlarge any region of the celestial sky desired.

During any display, the user can invoke certain changes to the display without the need for reentering display parameters from the main menu. Thus inverse background is selected by depressing the "I" key while simulated meteor shower display is selected by the "M" key. Arrow selection is made with the "A" key and printout of the celestial display is selected with the "P" key. It is in this manner that the images comprising FIGS. 5 through 13 were obtained.

All of these keys with the exception of the "P" key act as toggles; that is, reselection will toggle the selected item ON or OFF. For example, if an arrow is shown it can be removed with reselection of the "A" key. It can again be shown by selecting the "A" key.

An arrow when displayed can be moved about through use of the cursor keys and the diagonal keys adjacent the cursor keys found on a standard IBM PC® or IBM PC® compatible keyboard.

Program Description

Table 1 is the complete program listing in Turbo Pascal® source code. The source code of the GRAPHIX.SYS, TYPEDEF.SYS, WINDOWS.SYS and 4×6. FON procedures forming part of Borland International's Turbo Graphix™ Toolbox, version 1, is presented in Tables 3,4,5,6 and 7 respectively. These procedures are copyrighted by Borland International. The overall program named "allstars_stereo" (file ALLSTST.PAS, see Table 1) is copyrighted by the applicant (see notice above regarding facsimile reproduction of the patent document). FIGS. 14A–14E form an overall flow chart of Table 1.

The first portion of the listing contains the program name and a copyright notice.

Figure 14A:
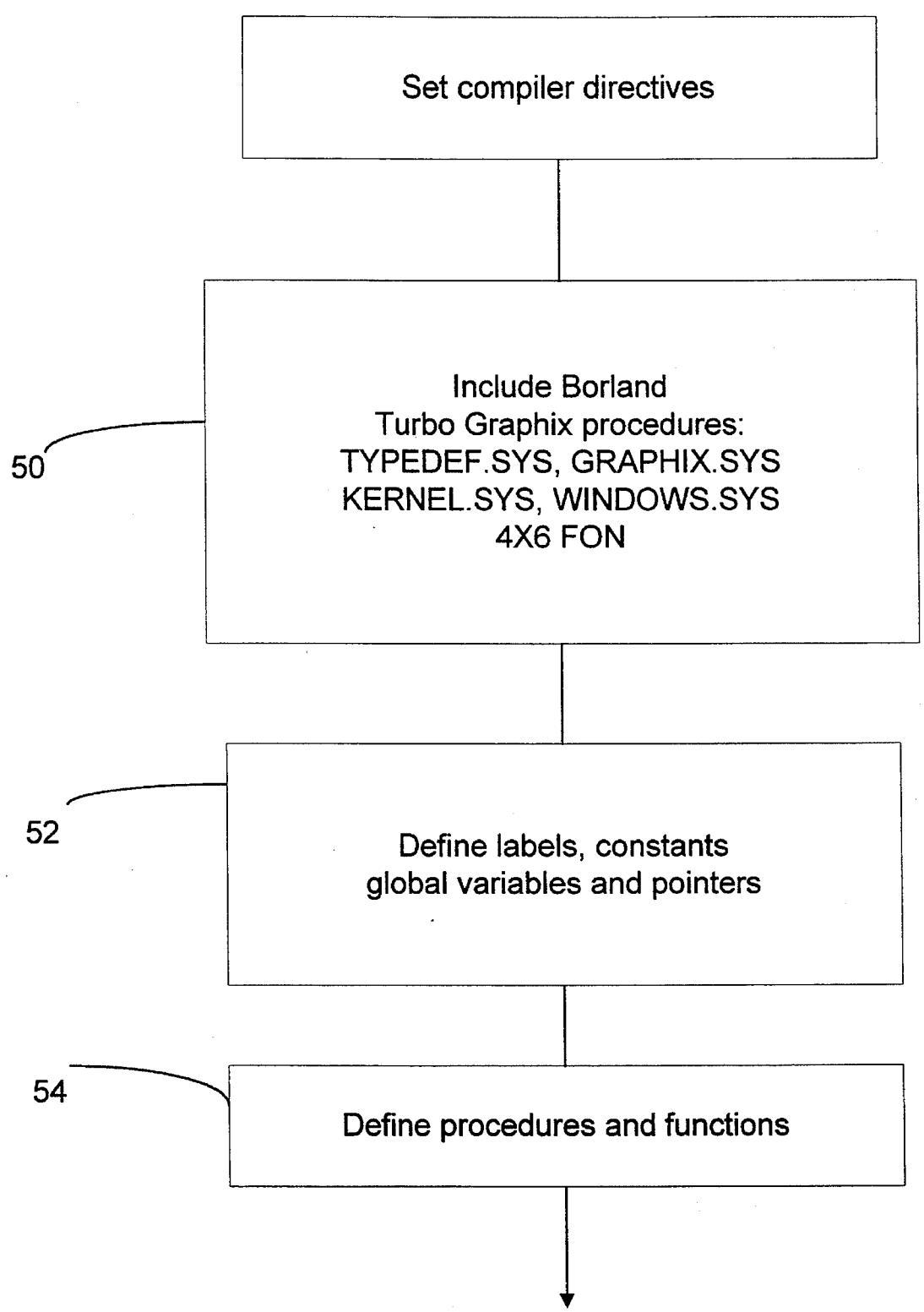

The next section contains the compiler directives which lander Turbo Pascal® instructs the compiler to perform or not perform certain functions (step 50, FIG. 14A). The V- compiler directive allows passing of actual parameters which do not match the length of formal parameters. The C+ directive controls control character interpretation, including program termination at a Read or Readln statement if a Control–C is encountered. The U+ directive prevents user interruption with a Control–C during program execution. The R– directive instructs the compiler not to perform run-time index checks while the K+ directive instructs the compiler to generate a stack check code. Other compiler directives appear in the listing. Their functions are explained in the Turbo Pascal® version 3.0 Reference Manual.

The LABEL, CONST, TYPE, and VAR sections (step 52, FIG. 14A) which follow the compiler directives define various labels (location in the program), constants, user defined types, and variables used in the main portion of the program. The types identified as "StarNumType" and "HalleyType" are used to define pointer variables named "StarDistance" and "HalleyPresent" respectively. These pointer variables are declared in order to use the Heap portion of memory for data storage since the 64K (64 thousand byte) data storage area allowed under Turbo Pascal®version 3.0 is insufficient for this program.

Various procedures and functions are then defined in the program (steps 54 and 55, FIGS. 14A–14B) Each procedure and function performs a specific task. Each procedure is invoked from either the main program or by another procedure or function. The purpose of each procedure and function is presented in comment statements which accompany each procedure and function. Thus the procedure "spaceremove" removes leading spaces in a variable named "testline" and returns the passed parameter to the calling portion of the program without leading spaces. The procedure "Indat" has its own "update log".

Some of these procedures and functions were obtained from other programs listed in various Borland International publications or toolkits, such as the "Select", "ConstStr", "Say", "IOCheck", and "ErrorMessage". The "Title", "MainMenu", and "ArrowDraw" procedures were based upon published Borland International listings, but modified to accomplish a particular message and format. The "rh_display", "dec_display", "Indat", and "Meteor_Show" procedures are new and original.

Figure 14C:
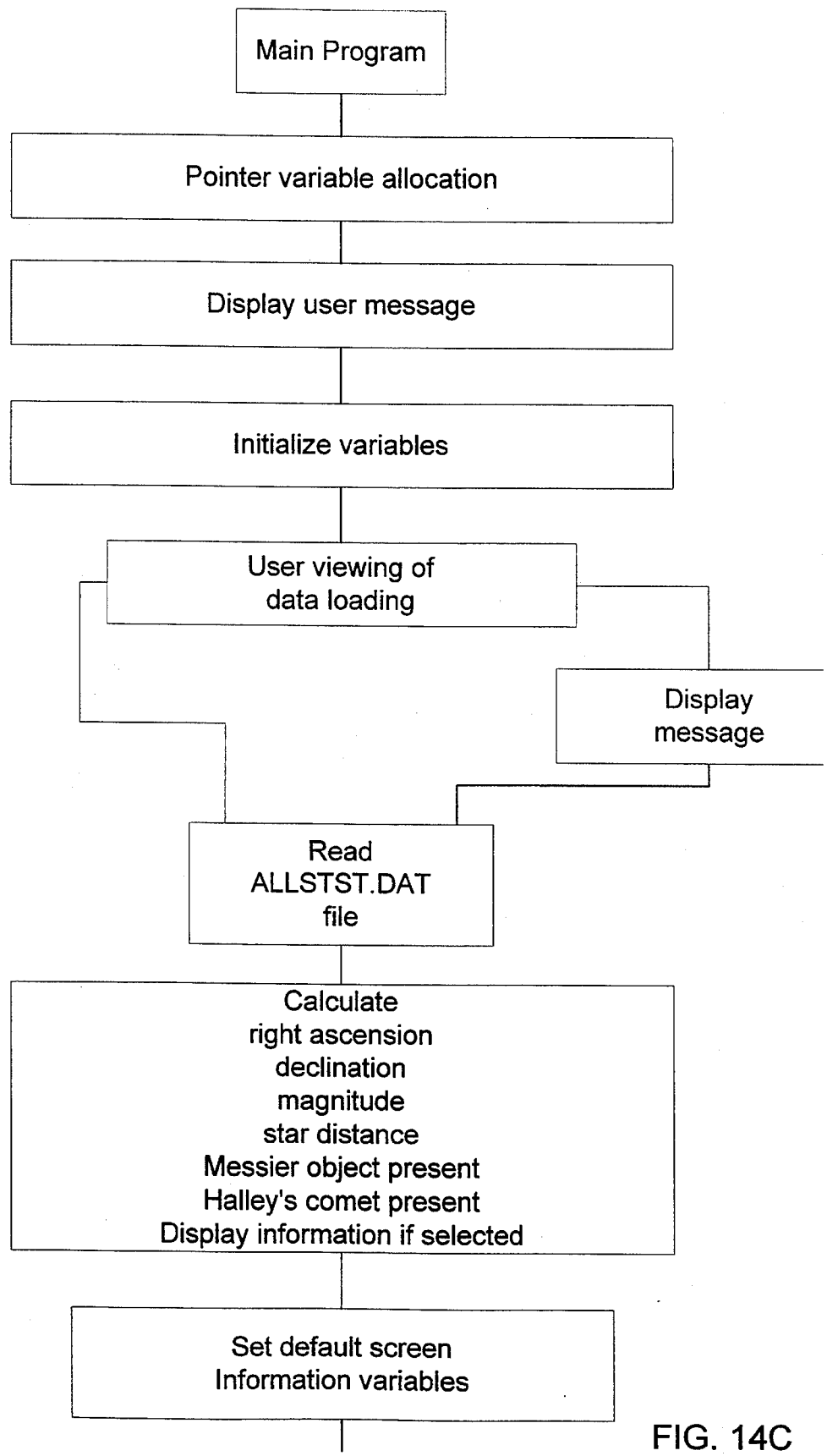
Figure 14D:
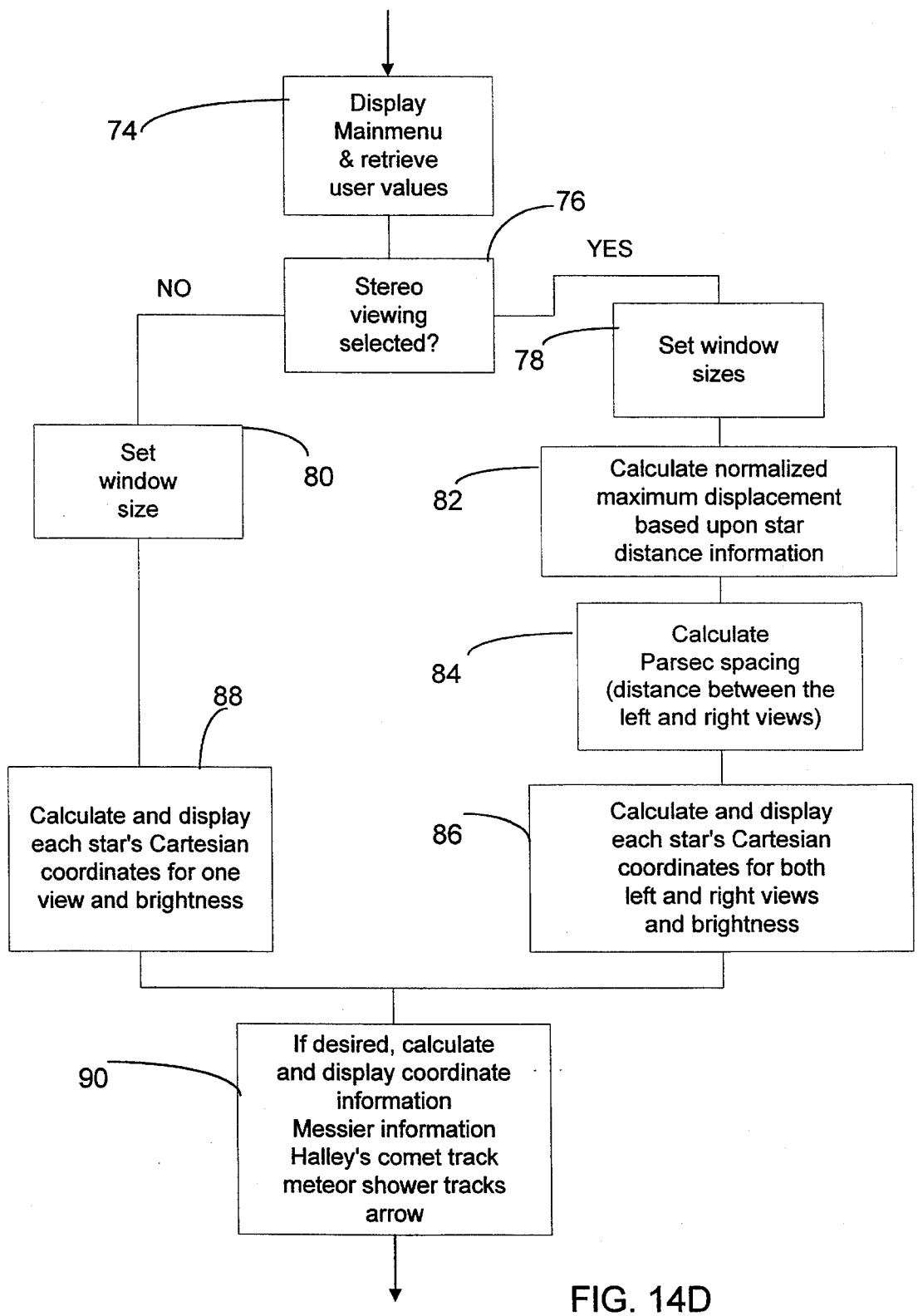

The "Main Program" follows (step 56, FIG. 14D). This portion of the program directs the entire set of events which are executed by the program. First the pointer variables "StarDistance" and "HalleyPresent" are allocated (step 56, FIG. 14C), then a message is presented on the screen (step 6D FIG. 14C), and then various variables are initialized (step 62, FIG. 14C).

The program then asks the user if retrieved data is to be displayed as it is retrieved (step 64, FIG. 14C), and if it is to be displayed, the data is shown in a particular format (see Table 3 and steps 66 and 70 FIG. 14C). The retrieved data is then extracted from the file called "allstst.dat" which contains coordinate information for all the displayable celestial objects, their distances from the earth, as well as other data including the Messier Number for the Messier Objects (step 68, FIG 14C). Other data, such as star names and associated constellations is within the database but is not presently used by the program.

Initial default values for an initial celestial display are then defined(step 72, FIG. 14C). The MainMenu procedure is then invoked (step 74, FIG. 14D) which displays default or selected values for the stereo viewing option, right ascension, declination, viewing size, coordinate display, border display, Messier object display, Halley's Comet display, arrow drawing and simulated meteor shower display. Once the desired values are selected (or the defaults accepted) by the user, actual display is invoked with the "G" letter, standing for "GO".

If stereo viewing is selected (step 76, FIG. 14D), then the boolean variable "stereo" is true and the horizontal and vertical testing sizes for the screen are respectively 360 and 340 so as to be able to display two images on a monochromatic display with Hercules™ monochrome display capability (step 78, FIG. 14D). Otherwise the horizontal testing size is 720 and a slightly larger vertical size of 348 is selected (step 80, FIG. 14D). The smaller vertical size for stereo viewing is to allow an upper screen window for display of parsec spacing between the two views (see FIGS. 5–9, 11).

The actual plotting of celestial objects is invoked after the comment statement "plot star on the screen" step 78–88, FIG. 14D. After several variables are defined which are necessary to map celestial coordinates into a planar display using the stereographic map projection technique (variables lam0, phi0, a and b), a for— next loop equal to the total number of celestial objects in file ailstst.dat (defined by variable "num") is executed which determines for each object its planar projection as defined by variables "x" and "y" for the horizontal and vertical coordinates respectively (step 88 or 86 for mono or stereo viewing, see FIG. 14D). If stereo viewing is selected and if the righthand display is being generated, then the value of "x" is offset based upon the object's distance from the earth (step 86, FIG. 14D). This offset value is normalized for all objects within the viewing area by variable (step 82, FIG. 14D), which in turn is equal to the maximum horizontal displacement defined by variable "MaxDispX" times the value of "SD_Near", which is in units of parsecs This latter variable is determined by the closest object displayed in the lefthand display. Thus the horizontal offset for each object displayed in the righthand display is minus the value of "MaxDispXNormalized" divided by "StarDistance0".

If coordinate information is to be displayed, then the "Coordinate" boolean variable is true and various branches are invoked to determine the maximum and minimum right ascension values displayed as well as the screen locations where the objects having these values are positioned (step 90, FIG. 14D). Variables "rh_high" and "rh_high_val" respectively define the horizontal screen location and the corresponding right ascension value for the object with the highest right ascension value. Similarly, "rh_low" and "rh_low_val" define the corresponding horizontal screen location and right ascension value for the object with the lowest right ascension value.

In addition, the horizontal location and right ascension value for the mid right ascension value of the displayed area is calculated and displayed (variables "middle_val" and "rh_middle_val" respectively).

Since the displayed region of the celestial sphere may be about a celestial pole, the high and low right ascension values may have different values for objects displayed above and below the celestial pole. When this occasion occurs, a second set of high and low right ascension values are determined along with their horizontal screen locations as defined by "rh_high2" and "rh_high_val2" (for the screen and right ascension high values respectively) and by "rh_low2" and "rh_low_val2" (for the screen and right ascension low values respectively). These right ascension values are displayed along the top of the display.

For declination display, upper and lower screen declination values are determined as well as a maximum (for northern celestial sphere displays) or minimum (for southern celestial sphere displays) declination value associated with the celestial object closest to the respective northern or southern celestial pole(step 90, FIG. 14D). Corresponding vertical screen locations for these celestial objects are also stored so as to display the declination coordinate information at the proper vertical screen height associated with the celestial object.

Thus a distinction is made between the uppermost and lowermost vertical position objects (and their corresponding declination values) and the highest and lowest declination value objects. The object with the highest-most vertical screen location has screen vertical location "dec_top" and a declination value "dec_top_val". Similarly, the object with the lowest-most vertical screen location has screen vertical location "dec_bottom" and a declination value "dec_bottom_val". The object with the highest declination value has vertical screen location "dec_high" and declination value "dec_high_val" while the object with the lowest declination value has vertical screen location "dec_low" and declination value "dec_low_val".

The magnitude of the object determines the number of pixels displayed for the object. Variable "ma" represents the object's magnitude.

If Messier objects are to be uniquely displayed, the objects are shown as small ellipses using the "drawcircle" procedure and their Messier number is displayed through use of variable, see step 90, FIG. 14D "M_no[j]" (an array variable).

Figure 14E:
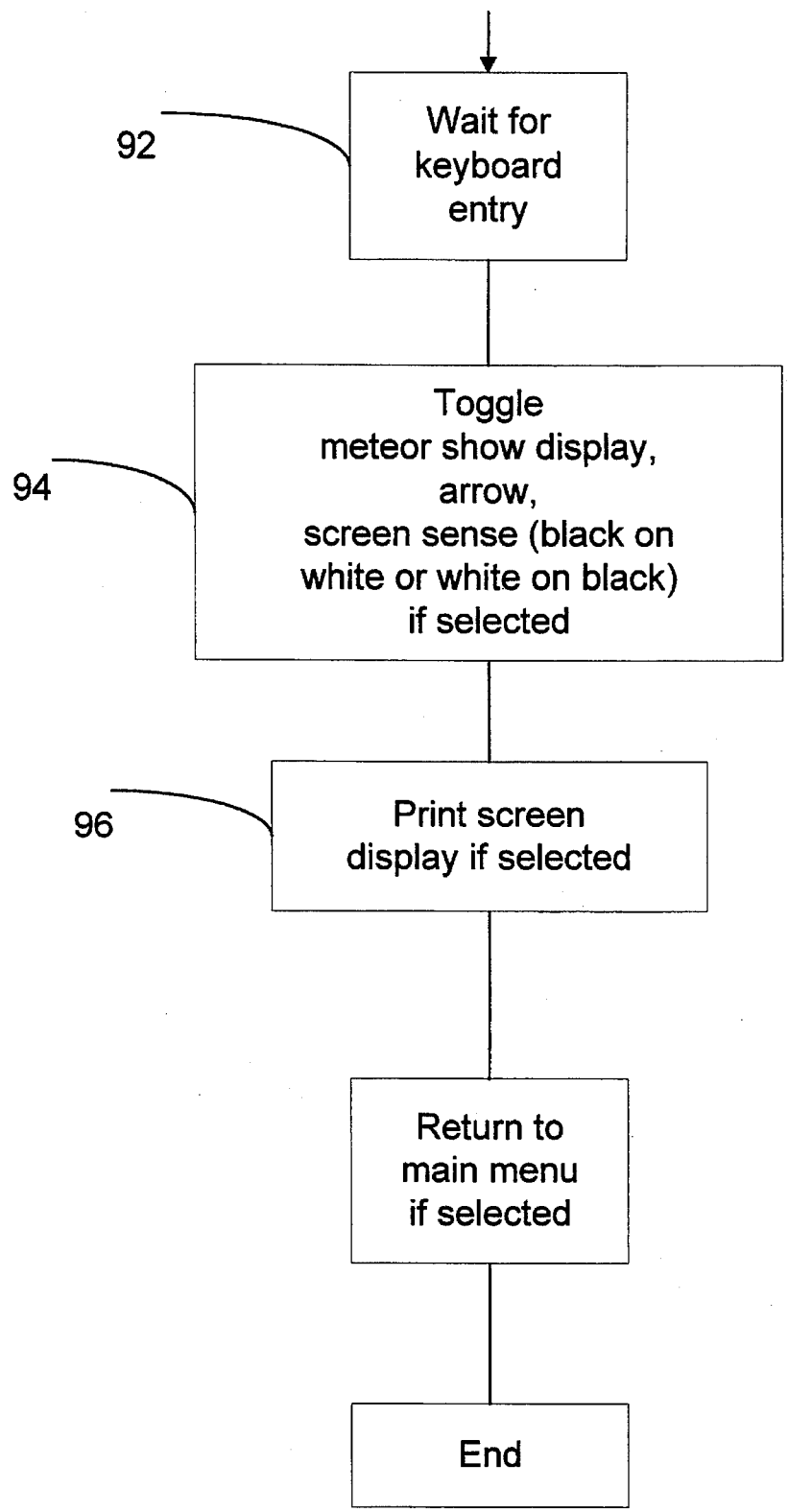

After the celestial objects are displayed the user can select inverse display (white background with black objects) through use of the "I" key (steps 92 and 94, FIG. 14E). This key acts as a toggle so that if it is depressed again, normal black background and white objects are displayed.

The "A" key also acts as a toggle so as to select or deselect the display of an arrow on the screen (steps 92 and 94, FIG. 14E). If displayed, the arrow can be moved about the screen through use of the cursor keys and the adjacent diagonal keys (Home, PgUp, End, and PgDn keys) (see "Arrow" procedure in Table 1).

The "M" key is a toggle for the display of a simulated meteor shower (steps 92 and 94, FIG. 14E). If stereo viewing is selected, the simulated shower contains offset information so as to appear three-dimensional. The repetition rate, length, direction, and speed of the simulated meteors are randomly selected by the program (see "Meteor_Shower" procedure in Table 1).

Selection of the "P" key when the celestial display is present on the screen outputs the screen information to a printer (step 92 and 96, FIG. 14E). The Epson MX, RX and FX series graphic printers by Epson America, Inc. of Torrance Calif. (or compatible printers thereto), are supported by the "hardcopy" procedure forming part of the Turbo Graphix™ toolbox.

Selection of the "Return", "Esc", or "Q" key returns the user to the "MainMenu" procedure.

The present invention thereby provides a method and system for generating stereographic three-dimensional displays of celestial objects. Although described in part by a computer program written in Turbo Pascal® for use on an IBM PC® or compatible personal computer, it is apparent that the concepts described can be readily adapted to other computer languages and other computer systems.

From the foregoing description, it is submitted that the objects set forth above and those made apparent from the description are efficiently attained and, since changes may be made in carrying out the methodology of the invention, including the computer program or other instructions used, it is intended that all matter contained in the above description or shown in the accompanying drawings shall be interpreted as illustrative, and not in a limiting sense.

It is submitted that the following claims are intended to cover all the generic and specific features of the invention herein described and all statements of the scope of the invention, which as a matter of language, might be said to fall therebetween.

Table 1

```
program allstars_stereo;
                             Copyright 1988 Fressola
( compiler directives follow }
{$V-,C+,U-,R-,K+)
{$I ..\graphix\typedef.sys}   (Hercules Graphics System -Turbo Graphix-}
{$I ..\graphix\graphix.sys}
{$I ..\graphix\kernel.sys}
{$I ..\graphix\windows.sys}
label  label4, label8 ;
const
  max = 2000;
  MaxWorldX: real=1000.0;
  MaxWorldY: real=1000.0;
type
  workstring = string[10];
  str80 = string[80];
  Anystr = string[255];
  string2 = string[2];
  string3 = string[3];
  string4 = string[4]; (* for use with M_no array for Messier numbers *)
(* character set type *)
  CharlSet= set of Char;
  StarNumType = array[1..2000] of integer;
  Buffer = string[200];
```

```
HalleyType = array[1..2000] of Boolean; (* 30 Sep 87 *)
var
    ard1, radian, h2rad, sx, sy, yht, centx, centy,
    ra0, dec0, wid0, r, lam0, phi0, dlam, phi, ma,
    a, b, c, d, e, f, k0, x, y, rh, rm, rs, dd, dm, ds,
    ranew, rh_high, rh_high_val,
    rh_low, rh_low_val, middle_val, rh_middle_val,
    dec_top, dec_top_val, dec_bottom, dec_bottom_val,
    dec_high, dec_high_val, dec_low, dec_low_val, ra_hour,
    xdec, xwid, xra, WIDTEST, Parsec_Spacing,
    rh_high2, rh_high_val2, rh_low2, rh_low_val2                : real;
    j, j1, stp, msn, lol, upl, mss, ct, k, i, result, num, offset,
    MaxDispX, MaxDispXNormalized, SD_Near,
    Bottom, endloop, ia, ib, Pass,
    i_m,
    firstpass, invertsense                                       : integer;
    dsgn, (*bpdefault,*) lindefault, k1, answer,
    xborder, (*xbeep,*) Messierdefault, xMessier,
    Coordinatedefault, xCoordinate, test,(*test is for stopping a program*)
    ContinueProgram, xArrow, ArrowDefault,
    dummy, xMeteor_Shower, Meteor_ShowerDefault, QuitNow,       : char;
    HalleyDefault, kpress1, ch
    mes1, radefault1, dec_deg, xStereo                          : string[3];
    line : string[80];
    radefault, StarDistance1
    decdefault, widdefault : string[6];                         : string[5];
    ra_hr, ra_min, ra_sec, dec_min, dec_sec,
```

```
    rh1, rm1, rs1, dd1, dm1, ds1, radefault2     : string[2];
    ma1                                          : string [4];
    toptext1, toptextr : string[30];
    Parsec : str80;
    Parsec_String      : AnyStr;
    xstr, ystr         : workstring;
    lin, (*bp,*) Messier, Coordinate, decimal, MoveArrowEnd, arrow,
    stereo, IOErr, Meteor_Shower, HalleyDraw     : boolean;
    ra, dec, mag : array [1..2000] of real;
    mes : array [1..2000] of boolean;
    M_no : array [1..110] of string4;
    fi : text;
    StarDistance : ^StarNumType;
    HalleyPresent : ^HalleyType;
{             P R O C E D U R E S  }
procedure spaceremove(var testline : workstring);
{ to remove leading spaces from the incoming string variable }
var i: integer;
begin
    for i := 1 to 4 do
    if testline[i] = ' '
       then testline := copy(testline,i+1,length(testline) - i);
end;
procedure Beep;
{ Beep sounds the terminal bell or beeper }
begin
    Write(^G);
```

```
end;

procedure Select(Term : CharlSet;var TC : Char);
{ to allow selection of specified characters }
var
    Ch : Char;
begin
    repeat
        Read(Kbd,Ch);
        TC := upcase(Ch);
        if not (TC in Term) then
            Beep;
    until TC in Term;
end;

procedure rh_display (rh_high_val, rh_high : real; TopDisplay: boolean);
{ to display right ascension coordinate information on celestial display(s) }
var
    ranew, minuter, secondr        : real;
    houri, minutei, secondi : integer;
    hour, minute, second    : string [2];
begin
    ranew := rh_high_val/h2rad;
    houri := trunc(ranew);
    str(houri,hour);
    if houri < 10 then hour := '0' + hour;
    minuter := (ranew - int(ranew))*60;
    minutei := trunc(minuter);
```

-33-

```
        str(minutei,minute);
        if minutei < 10 then minute := '0' + minute;
        secondr := (minuter - int(minuter))*60;
        secondi := trunc(secondr);
        str(secondi,second);
        if secondi < 10 then second := '0' + second;
        if TopDisplay then
           drawtextw(rh_high,3,1,hour + ':' + minute + ':' + second)
        else
           drawtextw(rh_high,Bottom - 4,1,hour + ':' + minute + ':' + second);
end;     (* procedure rh_display *)
procedure convert_hms (xra : real; var hour : string3;
                       var minute, second : string2);
{ to convert from decimal hour and fraction to hour, minute, second
  type display for MainMenu procedure }
var
   minuter, secondr      : real;
   houri, minutei, secondi : integer;
begin
   houri := trunc(xra);
   str(houri:3,hour); spaceremove(hour);
   minuter := frac(xra)*60;
   minutei := abs(trunc(minuter));
   str(minutei:2,minute); spaceremove(minute);
   if minutei < 10 then minute := '0' + minute;
   secondr := (minuter - int(minuter))*60;
   secondi := abs(trunc(secondr));
```

```
                                                                    407-001 str(secondi:2,second); spaceremove(second);
  if secondi < 10 then second := '0' + second;
end;       (* procedure convert_hms *)
procedure dec_display (dec_top_val, dec_top : real);
( to display declination coordinate information on celestial display(s) )
var
  decnew, minuter   : real;
  degreei, minutei  : integer;
  degree            : string [3];
  minute            : string [2];
begin
  decnew := dec_top_val/radian;
  degreei := trunc(decnew);
  str(degreei,degree);
  minuter := frac(decnew)*60;
  minutei := abs(trunc(minuter));
  str(minutei,minute);
  if minutei < 10 then minute := '0' + minute;
  drawtextw(5,dec_top,1,degree + ':' + minute + #$27);
end;       (* procedure dec_display *)
function ConstStr(C : Char; N : Integer) : Str80;
( to fill character C for N times )
var
  s : string[80];
begin
  if N < 0 then
    N := 0;
```

-35-

```
            S[0] := Chr(N);
            FillChar(S[1],N,C);
            ConstStr := S;
          end;

procedure InputStr(var S    : workstring;
                               L,X,Y : Integer;
                               Term  : CharSet;
                           var TC    : Char;
                               MinusOK: Boolean);
        { input procedure for right ascension, declination, and viewing area
          information.  uses space or colon characters for colon in hr:min:sec
          style input }
        label Skip;
        const
          UnderScore = '_';
        var
          P : Integer;
          Ch : Char;
        begin
          GotoXY(X + 1,Y + 1); Write(S,ConstStr(UnderScore,L - Length(S)));
          P := 0;
          repeat
            GotoXY(X + P + 1,Y + 1); Read(Kbd,Ch);
            case Ch of
              #43,#45,#46,#48..#58 : if P < L then      (*keys +, -, ., 0-9, and : *)
                begin
```

```
            if Length(S) = L then
                Delete(S,L,1);
            P := P + 1;
            if (MinusOK = false) and (Ch = #45) then
                begin
                    beep;
                    P := P - 1;
                    GoTo Skip
                end;
            Insert(Ch,S,P);
            Write(Copy(S,P,L));
            end
        else Beep;
Skip:
#32 : if P < L then    (*key space to be replaced by a : .*)
            begin
            if Length(S) = L then
                Delete(S,L,1);
            P := P + 1;
            Insert(#58,S,P);
            Write(Copy(S,P,L))
            end
        else Beep;
^S      : if P > 0 then
            P := P - 1
        else Beep;
^D      : if P < Length(S) then
            P := P + 1
```

-37-

407-001

```
                      else Beep;
        ^A          : P := 0;
        ^F          : P := Length(S);
        ^G          : if P < Length(S) then
                        begin
                          Delete(S,P + 1,1);
                          Write(Copy(S,P + 1,L),UnderScore);
                        end;
        ^H,#127     : if P > 0 then
                        begin
                          Delete(S,P,1);
                          Write(^H,Copy(S,P,L),UnderScore);
                          P := P - 1;
                        end
                      else Beep;
        ^Y          : begin
                        Write(ConstStr(UnderScore,Length(S) - P));
                        Delete(S,P + 1,L);
                      end;
      else
        if not (Ch in Term) then Beep;
      end; {of case}
    until Ch in Term;
    P := Length(S);
    GotoXY(X + P + 1,Y + 1);
    Write('' :L - P);
    TC := Ch;
```

-38-

```
end;   (* of procedure InputStr *)
procedure Indat(var Out1:real; Max:integer; MinusOK:boolean; L,X,Y:integer;
                xdec:real);
( to restrict input data by numerical value and sign )
type
   Str80 = string[80];
   workstring = string[10];
   Anystr = string[255];
   (*character set type*)
   CharSet= set of Char;
var
   DecDeg, DecMin, DecSec : real;
   locate1, locate2, locate3, locate4,
   locate5, result                        : integer;
   s, dec1, dec2, dec3 :anystr;   (*xdec is now brought in by
                                     the procedure 11/27/86*)
   decdefault, EndString : workstring;
   TC : char;
   error1 : boolean;
{Procedure Indat Main Routine}
begin
repeat
(*--------------- Initialization ------------------------------------*)
   error1:= false;
   decdefault := '';
   dec1 := '';
   dec2 := '';
```

407-001

```
dec3 := '';
locate1 := 0;
locate2 := 0;
locate3 := 0;
locate4 := 0;
locate5 := 0;
DecDeg := 0;
DecMin := 0;
DecSec := 0;
(*    End of Initialization    *)

inputstr(decdefault,L,x,y,[^M],tc,MinusOK);
if decdefault = '' then Out1 := xdec
else begin
   locate5 := pos('.',decdefault);
   if locate5 = 0 then begin
   locate1 := pos('-',decdefault);
   if locate1 = 1 then
      if (decdefault[2] = '-') or (decdefault[2] = ':') or (decdefault[2] = '+')
         then error1 := true;
   if locate1 > 1 then error1 := true; (situation where the - sign is
                                        embedded in the number)

locate4 := pos('+',decdefault);
   if locate4 = 1 then
   begin
      if (decdefault[2] = '-') or (decdefault[2] = ':') or (decdefault[2] = '+')
         then error1 := true;
```

−40−

```
        decdefault := copy(decdefault,2,length(decdefault))
    end;
if locate4 > 1 then error1 := true; {situation where the + sign is
                                     embedded in the number}
if (locate1 > 0) and (locate4 > 0) then error1 := true;
locate2 := pos(':',decdefault);
if locate2 = 1 then error1 := true;
if locate2 > 1 then
    begin
    EndString := copy(decdefault,locate2+1,10);  (* a new string that starts
                                                    from 1 + the : position *)
    locate3 := pos(':',EndString);
    if locate3 = 1 then error1 := true
    end;  (* if locate2 > 1 branch *)
if error1 = false then
    begin
    if locate2 > 1 then
        begin
        dec1 := copy(decdefault,1,locate2-1);
        val (dec1, DecDeg, result);
        if abs(DecDeg) > Max then error1 := true;
        if abs(DecDeg) < Max then
            begin
            (note locate 2 if not zero here must also be > 1
             because error1 is false )
            begin
            if locate3 = 0 then
                dec2 := copy(decdefault,locate2 + 1,10)
```

```
      else
        dec2 := copy(decdefault,locate2 + 1,locate3 - 1);
        val (dec2,DecMin,result);
      if locate3 > 1 then
      begin
        dec3 := copy(Endstring,locate3 + 1,5);
        val (dec3,DecSec,result);
      end;
      if (DecMin > 59) or (DecSec > 59) then error1 := true;
    end  (*if abs(DecDeg) < Max branch*)
    else error1 := true   (* since DecDeg here is >= Max, and ':' has
                             been found, then there must be an error *)
  end (*if locate2 > 1 branch *)
  else begin (* locate2 not > 1 branch *)
    dec1 := copy(decdefault,1,length(decdefault));
    val (dec1,DecDeg,result);
    if abs(DecDeg) > Max then error1 := true
  end; (* locate2 not > 1 branch  *)
end; (*if error1 = false branch*)
if DecDeg >= 0 then Out1 := DecDeg + DecMin/60 + DecSec/3600
else Out1 := DecDeg - DecMin/60 - DecSec/3600; (* if DecDeg is
                                                  less than zero, then the
                                                  values of DecMin and DecSec
                                                  must be subtracted from
                                                  DecDeg *)

end (*locate5 = 0 branch *)
(* --------------------- Decimal Evaluation --------------------------- *)
```

```
else begin (* locate5 here is > 0 which means a decimal "." has been found *)
    locate1 := pos('-',decdefault);
    if locate1 = 1 then
        if (decdefault[2] = '-') or (decdefault[2] = ':') or (decdefault[2] = '+')
            then error1 := true;
    if locate1 > 1 then error1 := true; (situation where the - sign is
                                         embedded in the number)
    locate4 := pos('+',decdefault);
    if locate4 = 1 then
    begin
        if (decdefault[2] = '-') or (decdefault[2] = ':') or (decdefault[2] = '+')
            then error1 := true;
        decdefault := copy(decdefault,2,length(decdefault))
    end;
    if locate4 > 1 then error1 := true; (situation where the + sign is
                                         embedded in the number)
    if (locate1 > 0) and (locate4 > 0) then error1 := true;
    locate2 := pos(':',decdefault);
    if locate2 <> 0 then error1 := true;
    val (decdefault,Out1,result);
    if abs(Out1) > Max then error1 := true;
    gotoxy(1,18);
end  (* end of locate5 > 0 else branch, i.e. a decimal "." was found *)
end  (*if decdefault = '' else branch*)
until error1 = false;
end;  (* of procedure indat *)
procedure ErrorNew(Msg : str80);
```

407-001

```
{ write error message on line 24 and wait for a key }
var ch : char;
begin
    GoToXY(1,24); ClrEol;
    Write(^G,Msg,' Hit any key to continue');
    Read(Kbd,Ch)
end; (* procedure ErrorNew *)
procedure Say(S: Buffer);
{ displays data with highlighting of selected characters using the !
  character }
Var
    I: Integer;
Begin
    I:=1;
    While I<=Length(S) Do
    Begin
        If Ord(S[I])<32 Then Write('^',Chr(Ord(S[I])+64))
        Else If S[I]<>'%' Then Write(S[I])
        Else If S[I+1]='@' Then
        Begin
            WriteLn;
            I:=I+1;
        End
        Else If S[I+1]='!' Then
        Begin
            HighVideo;        { If your screen doesn't have high/low video, }
            Write(S[I+2]);    { replace these 3 lines with: }
```

```
          LowVideo;                  (       Write(S[I+2],')');
          I:=I+2;
        End
      Else Write('%');
          I:=I+1;
  End; { While I<=Length(S) }
End; { Say }
procedure IOCheck;
{ Check for I/O error; print message if needed }
var
  IOCode : integer;
begin
  Iocode := IOResult;
  IOErr := (IOCode <> 0);
  if IOErr then begin
    case IOCode of
      $01 : ErrorNew('File does not exist.');
      $02 : ErrorNew('File not open for input.');
      $03 : ErrorNew('File not open for output.');
      $04 : ErrorNew('File not open.');
      $10 : ErrorNew('Error in numeric format.');
      $20 : ErrorNew('Operation not allowed on logical device.');
      $21 : ErrorNew('Not allowed in direct mode.');
      $22 : ErrorNew('Assign to standard files not allowed.');
      $90 : ErrorNew('Record length mismatch.');
      $91 : ErrorNew('Seek beyond end of file.');
      $99 : ErrorNew('Unexpected end of file.');
```

```
        $F0 : ErrorNew('Disk write error.');
        $F1 : ErrorNew('Directory is full.');
        $F2 : ErrorNew('File size overflow.');
        $F3 : ErrorNew('Too many open files.');
        $FF : ErrorNew('File disappeared.');
        else begin
             ErrorNew('Unknown I/O error:    ');
             Writeln(IOCode:3);
             end;    (* else *)
        end;   (* case *)
   ClrScr;
   If IOCode = 1 then
   begin
       GotoXY(25,7);
       Writeln('Please check your directory for file ALLSTST.DAT');
       end;  (* if IOCode *)
   GotoXY(25,10);
   Say('%!H a p p y    %!S t a r    %!G a z i n g');
   Halt;
   end;
   end;  (* procedure IOCheck *)
procedure ErrorMessage(Message: Buffer);
( display a desired error message )
   Var
       Ch: Char;
   Begin
       WriteLn(Message);
```

```
                                                                     407-001

While KeyPressed Do Read(Kbd,Ch);  ( Flush input buffer )
    Write('Hit any key to continue or <ESC> to abort: ');
    Read(Kbd,Ch);
    WriteLn;
    If Ch=^[ Then Halt;
  End;
procedure Title;
( to print title message on each menu display )

Begin
    ClrScr;
    HighVideo;
    WriteLn('     A L L S T A R    A S T R O N O M I C    I M A G I N G    S
Y S T E M');
    WriteLn('                         W I T H    S T E R E O    V I E W I N G');
    LowVideo;
  End;  (* Title procedure *)
procedure MainMenu;
( main menu for user input, celestial display, and exiting program )
  Var
    Command: Char;
    ReDraw: Boolean;
  Begin
    ReDraw:=True;
    Repeat
      If ReDraw Then
        Begin
```

-47-

```
Title;
Say('%@%!Stereo Viewing : ');
WriteLn(xStereo);
Say('%@%!Right Ascension : ');
convert_hms(xra, ra_hr, ra_min, ra_sec);
write(ra_hr + ':'+ ra_min + ':'+ ra_sec);
WriteLn(' OR ',xra:2:4);
Say('%@%!Declination       : ');
convert_hms(xdec, dec_deg, dec_min, dec_sec);
write(dec_deg + ':'+ dec_min + ':'+ dec_sec);
WriteLn(' OR ',xdec:2:4);
Say('%@%!Viewing Size      : ');
WriteLn(xwid:3:2); clreol;
Say('%@%!Coordinates : ');
WriteLn(Coordinatedefault); clreol;
Say('%@%!Border : ');
WriteLn(lindefault); clreol;
Say('%@M%lessier Objects : ');
WriteLn(Messierdefault); clreol;
Say('%@%!Halley''s Comet Track : ');
WriteLn(HalleyDefault);
Say('%@%!Arrow : ');
WriteLn(Arrowdefault); clreol;
Say('%@%!Meteor Shower : ');
WriteLn(Meteor_ShowerDefault); clreol;
Say('%@%!Go           %!Quit                    ');
End; ( If ReDraw )
```

```
Read(Kbd,Command);
ReDraw:=True;
Case Upcase(Command) Of
    'S': Begin
            if xStereo = 'YES' then xStereo := 'NO'
                else xStereo := 'YES';       (* 12 Oct 1987 *)
         end; (* S case *)
    'R': Begin
            indat(ra0,24,false,9,18,5,xra); (*see indat (dec0. . .)
                                               for format *)
            xra := ra0; (* so that screen update is correct *)
         end; (* R case *)
    'D': Begin
            indat(dec0,90,true,9,18,7,xdec); (*format dec0,Max,
                                        MinusOK,L,X,Y, xdec
                                        for default value of Out1 *)
            str(dec0:9,decdefault); (*to get a value for decdefault *)
            xdec := dec0; (* so that screen update is correct *)
         end; (* D case *)
    'V': Begin
            indat(wid0,360,false,6,18,9,xwid); (*see above for format *)
            xwid := wid0;
         end; (* W case *)
    'C': Begin
            if Coordinatedefault = 'Y' then Coordinatedefault := 'N'
                else
                    Coordinatedefault := 'Y';
```

-49-

```
         end; (* C case *)
'B': Begin
        if lindefault = 'Y' then lindefault := 'N'
        else
           lindefault := 'Y';
     end; (* B case *)
'E': Begin
        if Messierdefault = 'Y' then Messierdefault := 'N'
        else
           Messierdefault := 'Y';
     end; (* M case *)
'A': Begin
        if Arrowdefault = 'Y' then Arrowdefault := 'N'
        else
           Arrowdefault := 'Y';
     end; (* A case *)
'M': Begin
        if Meteor_ShowerDefault = 'Y' then
           Meteor_ShowerDefault := 'N'
        else
           Meteor_ShowerDefault := 'Y';
     end; (* E case *)
'H': Begin
        if HalleyDefault = 'Y' then
           HalleyDefault := 'N'
        else
           HalleyDefault := 'Y';
```

```
          end; (* H case *)
    'Q': Begin
          Gotoxy(24,24);
          Say('Are you sure? (y/n) : ');
          Select(['Y','N'],QuitNow);
          if QuitNow = 'Y' then
            begin
              ClrScr;
              Gotoxy(25,10);
              Say('%!H a p p y    %!S t a r    %!G a z i n g');
              Halt;
            end; (* if statement *)
          end; (* Q case *)
      Else ReDraw:=False;
    End; { Case Command }
  Until Upcase(Command)='G';
End; { MainMenu } procedure ArrowDraw(var Arrow : boolean; var invertsense : integer);
{ draws arrow on celestial display.  arrow movable by cursor keys and
  the diagonal keys, (Home, PgUp, End, and PgDn }
Var
   MoveArrow : char;
Begin
   CopyScreen; (*save screen image so arrow can be moved around from window
                 without losing any part of the screen *)
   SetBreakoff;  (* no error condition when an edge hit by the arrow *)
```

```
SetMessageOff;  (* don't display an error message when edge hit by the arrow *)
SelectWorld(3);
SelectWindow(3);
if invertsense = 1 then setcolorblack else setcolorwhite;
DrawLine(1,1,1,8);    (* these lines are to form an arrow *)
DrawLine(1,1,6,1);
DrawLine(1,8,8,1);
repeat
  read(Kbd,MoveArrow);
  if (MoveArrow = 'P') or (MoveArrow = 'p') then
       HardCopy(false,1);
  if (MoveArrow = 'I') or (MoveArrow = 'i') then
  begin
       swapscreen;
       invertscreen;    (* this screen will be the background screen *)
       swapscreen;
       invertscreen;    (* to invert screen while in the Arrow routine *)
       if invertsense = 1 then invertsense := 0 else invertsense := 1;
       if invertsense = 1 then setColorBlack else setColorWhite;
  end;
  if (MoveArrow = #27) and Keypressed then (*checking for extended
                                                return codes *)
  begin
     read(Kbd,MoveArrow);
     case ord(MoveArrow) of
        72 : MoveVer(-4,true);
        75 : MoveHor(-1,true);
```

```
            77 : MoveHor(1,true);
            80 : MoveVer(4,true);
            71 : begin              (* Home key *)
                   MoveVer(-4,true);
                   MoveHor(-1,true);
                 end;
            73 : begin              (* PgUp key *)
                   MoveVer(-4,true);
                   MoveHor(1,true);
                 end;
            79 : begin              (* End key *)
                   MoveVer(4,true);
                   MoveHor(-1,true);
                 end;
            81 : begin              (* PgDn key *)
                   MoveVer(4,true);
                   MoveHor(1,true);
                   MoveArrow := ' ';  (* to prevent exit since ord(Q) is 81 *)
                 end;
          end; (* of case statement *)
        end;  (* MoveArrow = #27 *)
      until MoveArrow in ['A','a','Q','q',^M,^[];
      SwapScreen;
      SetBreakOn;
      SetMessageOn;
      Arrow := false;       (* reset for possible later invocation  13 Dec 87 *)
      SelectWorld(1);       (* get back to first window for continuation of *)
```

```
                                                                    407-001

SelectWindow(1);           (* display routines *)
    end; (* ArrowDraw *)
    Procedure Meteor_Show(stereo : boolean);
    ( displays simulated meteor shower in single or stereographic pairs
      repetition rate, meteor speed, meteor direction, and meteor length
      randomly varied from meteor to meteor )
    Label label6, label7;
    Var
    number_points_m, meteor_delay, Next_Meteor_time,
    Fade_Time, Meteor_Stereo_Spacing, i                    : integer;
    Meteor_Offset, Meteor_Point_Offset, xm, ym,
    delta_xm, delta_ym                                     : real;
    Meteor_Points : Array [1..2,1..219] of real;
    Begin
    randomize;
    if stereo then
    begin
    definewindow(1,0,8,XMaxGlb,YMaxGlb);  (* for one star window *)
    defineworld(1,0,Bottom,720,0);
    SelectWorld(1);
    SelectWindow(1);
    end; (* if stereo *)
    CopyScreen; (* to save screen before each meteor *)
    number_points_m := 20 + random(150); (* number of points to plot for *)
                                          (* one meteor *)
    meteor_delay := random(2);   (* delay for plotting points for one *)
                                 (* meteor *)

-54-
```

```
Next_Meteor_Time := random(2000);
Fade_Time := random(200);
if Stereo then
    begin
        Meteor_Offset := 360;
        xm := 360 * random; (* so that meteors generated in left *)
                                                        (* screen *)
        Meteor_Stereo_Spacing := 15 + random(20); (* amount of maximum stereo *)
                                                  (* effect for last point of *)
                                                  (* meteor *)
        Meteor_Point_Offset := Meteor_Stereo_Spacing / Number_Points_M;(*point *)
                            (* offset for each plotted point on right screen *)
    end else
        xm := 720 * random;
ym := Bottom * random;
delta_xm := 2 * random - (2 * random);
delta_ym := random - random;
delay(Next_Meteor_Time); (* delay for the next meteor *)
for i := 1 to number_points_m do
    begin
        if (stereo) and ((xm >= 360) or (xm + Meteor_Offset <= 360))
            then GoTo label6;
                (* so that meteor does not extend into right screen *)
                (* exiting the for loop *)
        drawpoint(xm,ym);
        if stereo then
            begin
```

```
                drawpoint(xm + Meteor_Offset,ym);
                Meteor_Offset := Meteor_Offset - Meteor_Point_Offset;
            end else (* if Stereo *)
            delay(meteor_delay); (* delay next point for non-stereo only *)
            Meteor_Points[1][i] := xm;  (* to store values of xm & ym for all *)
            Meteor_Points[2][i] := ym;  (* displayed points of each meteor *)
            xm := xm + delta_xm;
            ym := ym + delta_ym;
        end; (* for loop *)
label6:
        delay(Fade_Time);
        SetColorBlack;
        if Stereo then Meteor_Offset := 360; (* reset starting value *)
        for i := 1 to number_points_m do
        begin
            if (stereo) and ((xm >= 360) or (xm + Meteor_Offset <= 360))
            then GoTo label7;
                            (* so that meteor does not extend into right screem *)
                            (* exiting the for loop *)
            drawpoint(Meteor_Points [1][i], Meteor_Points[2][i]);
            if Stereo then
            begin
                drawpoint(Meteor_Points [1][i] + Meteor_Offset, Meteor_Points[2][i]);
                Meteor_Offset := Meteor_Offset - Meteor_Point_Offset;
            end; (* if Stereo *)
        end; (* for number_points_m loop second time *)
label7:
```

```
    SwapScreen;
    SetColorWhite;
    if Stereo then SelectWorld(2); (* so that world setting back to Stereo*)
                                    (* setting *)
end; (* Meteor_Show *)

{   M A I N   P R O G R A M   }
begin
New(StarDistance);
New(HalleyPresent);
(* star array loading routine *)
clrscr;
gotoxy(1,5);
writeln ('             A L L S T A R S  .  P A S');

(*------------- initialization for star displaying ----------------*)
xStereo := 'NO';    (* set default stereo word to false   11 Mar. 1987 *)
radian := pi/180;
h2rad := pi/12;    (*radian * (360/24) *)
yht := 0.74;       (*for Hercules emulation*)
offset := 44;
Pass := 1;   (* this is the pass variable used for printing *)
firstpass := 1;    (* used to choose between InitGraphic and EnterGraphic *)
invertsense := 0;  (* used to know invertscreen mode, false = normal *)
gotoxy(1,7);
writeln ('       Do you want to see the data loading? (y/n) ');
select (['Y','N'], answer);
```

407-001

-57-

```
gotoxy(1,10);
writeln ('        Loading data into memory from file allstst.dat');
writeln ('        Includes Messier Objects, Comet Halley and Bright Stars');
writeln ('        Currently there are 1946 items in file allstst.dat');
writeln ('        Loading data takes from about one minute');
writeln ('        to several minutes, depending on computer hardware');
writeln ('        Table now can hold 2000 celestial objects');
if answer = 'Y' then
begin
    writeln (' No.       RA          DEC');
    writeln ('           HH:MM:SS    DD.MM.SS    MAG     B-V     STAR        DIST    CONSTELLATION');
end;
gotoxy(1,14);
{$I-}   (* turn off I/O error checking *)
assign (fi, 'allstst.dat');
IOCheck;    (* call IOCheck procedure *)
reset (fi);
IOCheck;    (* same *)
{$I+}   (* enable I/O checking again *)
k :=0;
gotoxy(1,17);
( extract data from allstst.dat file )
while not eof(fi) do
begin
    readln(fi,line);
    if line[1] <> '*' then
```

```
begin
  rh1 := copy(line,2,2);
  spaceremove (rh1);
  val (rh1, rh, result);
  rm1 := copy(line,5,2);
  spaceremove(rm1);
  val (rm1, rm, result);
  rs1 := copy(line,8,2);
  spaceremove(rs1);
  val (rs1, rs, result);
  dsgn := copy (line,13,1);
  dd1 := copy(line,14,2);
  spaceremove(dd1);
  val (dd1, dd, result);
  dm1 := copy (line,17,2);
  spaceremove(dm1);
  val (dm1, dm, result);
  ds1 := copy (line,20,2);
  spaceremove(ds1);
  val (ds1, ds, result);
  ma1 := copy (line,24,4);
  spaceremove(ma1);
  val (ma1, ma, result);
  mes1 := copy (line,45,3);
  if mes1 = 'MES' then
  begin
    mes[k] := true;
```

```
          M_no[k] := copy (line,36,4);      (* the Messier number *)
          HalleyPresent^[k] := false;   (* since mes[k] is true *)
     end
     else begin
          mes[k] := false;
          if mes1 = 'HLY' then HalleyPresent^[k] := true
          else HalleyPresent^[k] := false;
     end; (* else begin *)
     StarDistance1 := copy (line,50,5);  (*made 5 since some Messiers > 4 *)
     if (ord(StarDistance1[1]) > 48) and (ord(StarDistance1[1]) < 58)
     then val (StarDistance1,StarDistance^[k],result) (*dist. into array*)
     else StarDistance^[k] := 32000;      (* no distance info, so set at *)
                                          (*max integer- almost- *)

r := rh + rm/60 + rs/3600;
     d := dd + dm/60 + ds/3600;
     if dsgn = '-' then d := -d;
     ra[k] := r * h2rad;
     dec[k] := d * radian;
     mag[k] := ma;
     if answer = 'y' then
     begin
          gotoxy(1,18);
          write (k:4,' ',line);
          clreol;
     end;
     k := k + 1;
end;
```

```
end;
num := k-1;
gotoxy(1,16);
(*-------------initial default values-------------*)
           (* following coordinates are to set default screen on the
              constellation Orion, Sirius and Taurus *)
xra := 5.7;    (*real variable *)
ra0 := 5.7;    (* so that real value is the default value for new display *)
               (* above entered 26 Sep 87 *)
xdec := -2.0;  (* made a real variable 11/27/86 *)
dec0 := -2.0;  (* so that real value is the default value for new display *)
               (* above entered 26 Sep 87 *)
lindefault := 'Y'; (* see above for ra0 and dec0 *)
Messierdefault := 'N';
Coordinatedefault := 'Y'; (* see above for ra0 and dec0 *)
Arrowdefault := 'N';
Meteor_ShowerDefault := 'N';
HalleyDefault := 'Y';
xwid := 40;
wid0 := 40;   (* see above re: ra0 and dec0   26 Sep 87 *)
(* -------------- return location for MainMenu procedure -------------*)
label4:
clrscr;
(* for test display of right ascension on display screen *)
rh_high := 1000;
rh_low := -1;
dec_top := 500;
```

```
dec_bottom := -1;
dec_high_val := -90 * radian;
dec_low_val := 90 * radian;
MaxDispX := 30;                  (* maximum displacement of star for minimum distance *)
                                 (* from viewer.  Approximately 3/8 inch *)
SD_Near := 10000;                (* initial value of star distance monitoring variable *)
rh_high2 := 1000;                (* 4 April 1987 *)
rh_low2 := -1;   (* 6 May 1987 *)
rh_low_val2 := 90 * radian;  (* 6 May 1987 *)
MainMenu;
invertsense := 0; (* reset to normal black background *)
SetColorWhite;
if xStereo = 'YES' then stereo := true
   else stereo := false;            (* 12 Oct 1987 *)
if stereo then
begin
   sx := 360;                    (* to alter star display area *)
   sy := 340;                    (* if stereo viewing is desired *)
   Bottom := 340;                (* to adjust bottom of window *)
   endloop := 2;    (* for for-next loop to display the stereo image *)
end
else begin          (* one image per screen display *)
   sx := 720;
   sy := 348;
   Bottom := 348;
   endloop := 1    (* only one iteration of the for-next j1 loop *)
end;
```

```
                                                                  407-001 centx := sx/2;          (* put this variable here when stereo moved    11 Mar. 1987 *)
centy := sy/2;
xwid := wid0;
{ no longer use beep with display of celestial objects, but can uncomment if
  desired
xbeep := bpdefault;
if bpdefault = 'y' then bp := true
   else bp := false;
}
if lindefault = 'y' then lin := true
   else lin := false;
if Messierdefault = 'y' then Messier := true
   else Messier := false;
if Coordinatedefault = 'y' then Coordinate := true
   else Coordinate := false;
if ArrowDefault = 'y'then Arrow := true
   else Arrow:= false;
if Meteor_ShowerDefault = 'Y' then Meteor_Shower := true
   else Meteor_Shower := false;
if HalleyDefault = 'Y' then HalleyDraw := true
   else HalleyDraw := false;
r := sx * 53/wid0;
(   TEST FOR CORRECT VALUE OF WID0   12/13/86
WRITELN('ENTER WIDTEST VALUE : '); READLN(WIDTEST);
R := SX * WIDTEST/WID0;  (*NEW VALUE FOR TESTING *)
}
lam0 := h2rad * ra0;
```

-63-

```
phi0 := radian * dec0;
(*----- plot celestial object on the screen ------------------------------
*)
if firstpass = 1 then    (* does not work with a boolean firstpass *)
  initgraphic
else EnterGraphic;
firstpass := 2;              (* to make sure all subsequent plots use EnterGraphic *)
                             (* routine *)
(* THE FOLLOWING IS FOR STEREOGRAPHIC CELESTIAL OBJECT WINDOW DISPLAY *)
if stereo then
begin
  definewindow(1,0,8,trunc(XMaxGlb/2),YMaxGlb);
  defineworld(1,0,Bottom,720/2,0);  (* y coordinate reduced by 8 for top text *)
  DefineWindow(2,trunc(XMaxGlb/2 + 1),8,XMaxGlb,YMaxGlb);
  DefineWorld(2,0,Bottom,720/2,0);  (* y coordinate reduced by 8 for top text
*)
  DefineWindow(4,0,0,XMaxGlb,8);
  Defineworld(4,1,20,720,0);
end   (* if stereo true *)
else begin
  definewindow(1,0,0,XMaxGlb,YMaxGlb);  (* for one star window *)
  defineworld(1,0,Bottom,720,0)
end; (* if stereo false *)
DefineWindow(3,trunc(XMaxGlb/1.8),trunc(YMaxGlb/2),trunc(XMaxGlb/1.8 + 1),
             trunc(YMaxGlb/2 + 8));  (* for the arrow *)
DefineWorld(3,1,8,8,1);
(* THE FOLLOWING DO LOOP IS FOR STEREOGRAPHIC PAIR DISPLAYS *)
```

```
for j1 := 1 to endloop do
begin
if j1 = 2 then
begin
MaxDispXNormalized := MaxDispX * SD_Near;
Parsec_Spacing := 0.01905 * MaxDispX   (*this is the apparent spacing of*)
                  /30 * SD_Near;       (*the viewer's eyes. For 1 parsec distance*)
                                       (*the spacing is 0.01905 parsec if MaxDispX*)
                                       (*is 30 pixels, which is approximately 3/8 *)
                                       (*inch. MaxDispX can be varied to meet the*)
                                       (*user's ability to merge the two images. *)
                                       (*Parsec_Spacing is automatically adjusted *)
                                       (*due to division by 30. *)

str(Parsec_Spacing:6:2,Parsec);
Parsec_String := 'Viewed at ' + Parsec + ' parsecs';
end;  (* if j1 = 2 statement *)
selectworld(j1);
selectwindow(j1);
setaspect(1);
if lin then drawborder;
(*----------- use a for - next loop to plot celestial objects -------------
---*)
a := sin(phi0);  (* moved a and b out of the for j loop 6 May 1987 *)
b := cos(phi0);
for j := 1 to num do
begin
dlam := ra[j] - lam0;
```

```
phi := dec[j];
ma := mag[j];
c := sin(phi);
d := cos(phi);
e := sin(dlam);
f := cos(dlam);
k0 := 2/(1 + a *c +b *d *f);
x := r * k0 * d * e;
y := r * k0 * (b * c - a * d * f);
if j1 = 1 then
    x := -x + centx
else  (* j1 = 2 *)
    x := -x + centx - MaxDispXNormalized/StarDistance^[j];
y := -y * yht + centy;
if (x < sx) and (x > 0) and (y < sy) and (y > 0) then
begin
if stereo and (j1=1) and
(StarDistance^[j] < SD_Near) then SD_Near := StarDistance^[j];
if Coordinate then
begin
if x < rh_high then
begin
    rh_high := x;
    rh_high_val := ra[j];
end;
if x > rh_low then
    begin
```

```
        rh_low := x;
        rh_low_val := ra[j];
     end;
     if y > dec_bottom then
        begin
           dec_bottom := y;
           dec_bottom_val := dec[j];
        end;
     if y < dec_top then
        begin
           dec_top := y;
           dec_top_val := dec[j];
        end;
     if dec[j] > dec_high_val then
        begin
           dec_high := y;
           dec_high_val := dec[j]
        end;
     if dec[j] < dec_low_val then
        begin
           dec_low := y;
           dec_low_val := dec[j]
        end; (* Coordinate true if then *)
     if mes[j] and Messier then
        begin
           drawcircle (x,y,0.03);
```

```
if M_no[j] = 'M43 ' then drawtextw(x + 6, y - 8,1,M_no[j])
  else
  drawtextw(x + 6,y,1,M_no[j]);
end
else begin
if HalleyDraw and HalleyPresent^[j] then drawpoint(x,y);
(* to draw Halley's track if so requested *)
if not HalleyPresent^[j] then
begin
  drawpoint(x,y);
  if ma < 4 then drawpoint(x+1,y);
  if ma < 3 then drawpoint(x-1,y);
  if ma < 2.3 then
  begin
    drawpoint(x,y+1);
    drawpoint(x,y-1);
  end;
  if ma < 1.5 then
  begin
    drawpoint(x+1,y+1);
    drawpoint(x+1,y-1);
    drawpoint(x-1,y+1);
    drawpoint(x-1,y-1);
  end;
  if ma < 0.5 then
  begin
    drawpoint(x-2,y);
```

```
        drawpoint(x+2,y);
    end;
  if ma > 5 then ma := 5.0;
( can be uncommented if sound is desired for celestial object display
  if bp then
    begin
      sound(512 - 64 * trunc(ma));
      delay(250);
      nosound;
    end;
}
    end;        (* if not HalleyDraw *)
   end;         (* if then mes[k] block *)
  end;          (* if then x < sx etc. block *)
 end;           (* for - next block *)
if Coordinate then
 begin
  if ((dec_high_val > dec_top_val) and (dec_high_val > 85 * radian)) or
     ((dec_low_val < dec_bottom_val) and (dec_low_val < -85 * radian)) then
   begin
    rh_high := 1000;    (* to reset values of rh_high and rh_low *)
    rh_low := -1;
    for j := 1 to num do
     begin
      dlam := ra[j] - lam0;
      phi := dec[j];
      c := sin(phi);
```

```
d := cos(phi);
e:= sin(dlam);
f := cos(dlam);
k0 := 2/(1 + a *c +b *d *f);
x := r * k0 * d * e;
y := r * k0 * (b * c - a * d * f);
x := -x + centx;
y := -y * yht + centy;
if (x < sx) and (x > 0) and (y < sy) and (y > 0) then
begin
  if ((y < dec_high) and (dec_high_val > 0)) or
  ((y < dec_low)  and (dec_low_val < 0)) then
  begin    (* here the value of y is less than the value of 'y' corr-
              esponding to the highest declination value, i.e. dec_high_val *)
    if x < rh_high2 then
    begin
      rh_high2 := x;
      rh_high_val2 := ra[j];   (* this is actually the low rh value *)
    end;                       (* on the lhs of the screen *)
    if x > rh_low2 then
    begin
      rh_low2 := x;
      rh_low_val2 := ra[j];    (* this is actually the high rh value *)
    end;                       (* on the rhs of the screen *)
  end   (* if y < dec_high *)
  else begin  (* here y > dec_high *)
    if x < rh_high then
```

-70-

```
            begin
                rh_high := x;
                rh_high_val := ra[j];
            end;
            if x > rh_low then
            begin
                rh_low := x;
                rh_low_val := ra[j];
            end;
        end;      (* else y < dec_high etc. branch *)
    end;          (* if x < sx etc branch *)
end;              (* for next loop *)
end;              (* dec_high_val > dec_top_val *)
rh_display (rh_high_val, rh_high, false);
if rh_low_val <> rh_high_val then
    rh_display (rh_low_val, rh_low - offset, false);
if ((dec_low_val >= (dec_bottom_val-1)) or (dec_low_val > 0)) then
begin  (* calculate middle value only if view is not about -90 dec *)
    if rh_high_val >rh_low_val then
    begin
        rh_middle_val := (rh_high_val - rh_low_val)/2 + rh_low_val;
        rh_display (rh_middle_val, (rh_low - rh_high)/2 + rh_high - 20, false)
    end
    else begin
        middle_val := (24 * h2rad - rh_low_val + rh_high_val)/2;
        if rh_low_val + middle_val > 24 * h2rad then rh_middle_val := rh_high_val-
            middle_val
```

```
      else
        rh_middle_val := rh_low_val + middle_val;
      end;
      rh_display(rh_middle_val , (rh_low - rh_high)/2 + rh_high - 20, false);
      drawtextw((rh_low - rh_high)/2 + rh_high, Bottom - 12,1,'|');
    end; (* dec_low_val branch *)
    if rh_high2 > offset then
      rh_display(rh_high_val2, rh_high2, true) (* no offset needed *)
    else
      rh_display(rh_high_val2, offset, true); (* display at offset *)
    if rh_low_val2 <> rh_high_val2 then
      rh_display(rh_low_val2, rh_low2 - offset, true);    (* subtracted offset *)
    dec_display (dec_top_val, dec_top + 3);
    dec_display (dec_bottom_val, dec_bottom - 12);
    if abs(dec_top - dec_high) > 10 then
      dec_display (dec_high_val, dec_high);
    if abs(dec_bottom - dec_low) >19 then
      dec_display (dec_low_val, dec_low);
  end;  (* Coordinate true if then *)
  sound (880); (*moved with second window for arrow 12/7/86 from just
                    below label3 *)
  delay(100);
  nosound;
end; (* for-next j1 loop for two window display of stars *)
if stereo and Coordinate then
begin
  SelectWorld(4);
```

```
    SelectWindow(4);
    DrawText(120,3,1,Parsec_String);
    DrawText(480,3,1,Parsec_String);
    DrawBorder;
  end;    (* if stereo *)
(*-------------------- celestial screen routines --------------------------*)
Label8:
  if Meteor_Shower then Meteor_Show(stereo);
  if Arrow then ArrowDraw(Arrow, invertsense);
(*---- when done, wait for keystroke, N = new Q = quit  P = print -----
   also I = invertscreen, ^M (Return) and ^[ (ESC) for Main Screen ------ *)
  kpress1 := ' ';  (* initialize and reset kpress1 *)
  if keypressed then read(Kbd,kpress1);
  if (Upcase(kpress1) in ['N','Q',^M,^[]) then
                           (* do not want to leavegraphic if a multi-code *)
                           (* has been struck *)
    begin
      leavegraphic;
      goto label4;
    end;    (* upcase(kpress1) *)
  case Upcase(kpress1) of
    'I': begin
           if invertsense = 0               (* normal black background *)
             then invertsense := 1
             else invertsense := 0;
           invertscreen;
         end;
```

```
'P': begin        (* for printing the screen *)
      hardcopy(false,1);
      Pass := 2;
    end;
'A': Arrow := true;
'M': begin
      if Meteor_Shower = true
      then Meteor_Shower := false
      else
       Meteor_Shower := true;
     end; (* kpress1 = M *)
end; (* case statement *)
Goto label8;
end.
```

407-001

Table 2

```
** Distance data inserted as seventh field of each record. Distance in
** parsecs.
** Data altered with respect to STARS.DAT shown with and "@" at the end
** of the record.
** Unknown objects (e.g. star asterisms set to distance 9999).
** Galaxies set to distance 32000.
** The predecessor of this file is based upon the orignal STARS.DAT file from
** the Astronomy Magazine program STARS.BAS. Two additional sets of data have
** been added to the beginning of this data file and the format of the data
** has been changed slightly to give a degrees, minutes, seconds format and
** to give a longer narrative description. These additional sets of data were
** provided by John Williams/Arlin Collins, January 1986.
** Data 1 - The Messier Objects
** Data 2 - Halleys Comet - epoch 2000 from Yeomans
** Data 3 - The original STARS.DAT file from Astronomy Magazine
*************************************************************************
5:33:36.0  +22.00'24"    9.0  000.0 M1   MES   279   DIFFUSE NE TAURUS
21:32:36.0 -00.58'48"    7.0  000.0 M2   MES 15767 GLOB CLUST AQUARIUS
13:41:00.0 +28.32'47"    7.0  000.0 M3   MES 13803 GLOB CLUST CANES VEN
16:22:36.0 -26.27'23"    6.0  000.0 M4   MES  2300 GLOB CLUST SCORPIO
15:17:36.0 +02.12'36"    6.0  000.0 M5   MES  8282 GLOB CLUST SERP CAPU
17:38:12.0 -32.12'35"    6.0  000.0 M6   MES   567 DIFFUSE NE SAGITTAR
17:52:36.0 -34.48'47"    5.0  000.0 M7   MES   380 OPEN CLUST SCORPIO
18:02:36.0 -24.20'47"    9.9  000.0 M8   MES   767 DIFFUSE NE SAGITTAR
17:17:12.0 -18.29'47"    8.0  000.0 M9   MES  7975 GLOB CLUST OPHIUCHUS
16:56:00.0 -04.04'12"    7.0  000.0 M10  MES  4969 GLOB CLUST OPHIUCHUS
```

407-001

| | | | | | | |
|---|---|---|---|---|---|---|
| 18:49:48.0 | -06.18'00" | 6.0 | 000.0 | M11 | MES | 1733 OPEN CLUST SCUTUM |
| 16:46:00.0 | -01.54'12" | 7.0 | 000.0 | M12 | MES | 5767 GLOB CLUST OPHIUCHUS |
| 16:41:00.0 | +36.30'47" | 6.0 | 000.0 | M13 | MES | 6810 GLOB CLUST HERCULES |
| 17:36:00.0 | -03.14'48" | 9.0 | 000.0 | M14 | MES | 7178 GLOB CLUST OPHIUCHUS |
| 21:32:48.0 | +12.02'12" | 7.0 | 000.0 | M15 | MES | 15031GLOB CLUST PEGASUS |
| 18:17:36.0 | -13.47'48" | 7.0 | 000.0 | M16 | MES | 1656 OPEN CLUST SERP CAUD |
| 18:18:48.0 | -16.11'11" | 7.0 | 000.0 | M17 | MES | 997 DIFFUSE NE SAGITTAR |
| 18:18:12.0 | -17.08'24" | 7.0 | 000.0 | M18 | MES | 1902 OPEN CLUST SAGITTAR |
| 17:01:24.0 | -26.13'35" | 8.0 | 000.0 | M19 | MES | 6810 GLOB CLUST OPHIUCHUS |
| 18:00:24.0 | -23.02'11" | 9.9 | 000.0 | M20 | MES | 675 DIFFUSE NE SAGITTAR |
| 18:03:12.0 | -22.30'00" | 7.0 | 000.0 | M21 | MES | 908 OPEN CLUST SAGITTAR |
| 18:34:48.0 | -23.57'47" | 6.0 | 000.0 | M22 | MES | 3006 GLOB CLUST SAGITTAR |
| 17:55:24.0 | -19.01'35" | 7.0 | 000.0 | M23 | MES | 1377 OPEN CLUST SAGITTAR |
| 18:17:24.0 | -18.26'00" | 5.0 | 000.0 | M24 | MES | 5000 OPEN CLUST SAGITTAR |
| 18:30:24.0 | -19.16'11" | 6.0 | 000.0 | M25 | MES | 549 OPEN CLUST SAGITTAR |
| 18:44:48.0 | -09.26'12" | 8.0 | 000.0 | M26 | MES | 3896 OPEN CLUST SCUTUM |
| 19:58:00.0 | +22.38'00" | 8.0 | 000.0 | M27 | MES | 299 PLANETARY VULPECULA |
| 18:23:12.0 | -24.53'23" | 8.0 | 000.0 | M28 | MES | 4601 GLOB CLUST SAGITTAR |
| 20:23:12.0 | +38.25'11" | 7.0 | 000.0 | M29 | MES | 948 OPEN CLUST CYGNUS |
| 21:39:48.0 | -23.20'00" | 8.0 | 000.0 | M30 | MES | 12883GLOB CLUST CAPRICORN |
| 0:41:00.0 | +41.07'00" | 4.0 | 000.0 | M31 | MES | 32000SPIRAL GAL ANDROMEDA |
| 0:41:00.0 | +40.43'35" | 9.0 | 000.0 | M32 | MES | 32000ELLIPTICAL ANDROMEDA |
| 1:32:36.0 | +30.30'23" | 6.0 | 000.0 | M33 | MES | 32000SPIRAL GAL TRIANGULM |
| 2:40:24.0 | +42.39'24" | 6.0 | 000.0 | M34 | MES | 439 OPEN CLUST PERSEUS |
| 6:07:36.0 | +24.20'35" | 6.0 | 000.0 | M35 | MES | 788 OPEN CLUST GEMINI |
| 5:33:48.0 | +34.08'35" | 6.0 | 000.0 | M36 | MES | 1160 OPEN CLUST AURIGA |
| 5:50:24.0 | +32.33'11" | 6.0 | 000.0 | M37 | MES | 1442 OPEN CLUST AURIGA |

-76-

407-001

| | | | | | | |
|---|---|---|---|---|---|---|
| 5:27:00.0 | +35.49'47" | 7.0 | 000.0 | M38 | MES | 1098 OPEN CLUST AURIGA |
| 21:32:00.0 | +48.18'47" | 5.0 | 000.0 | M39 | MES | 250 OPEN CLUST CYGNUS |
| 12:13:12.0 | +58.03'00" | 9.0 | 000.0 | M40 | MES | 9999 DOUBLE STA URSA MAJO |
| 6:46:00.0 | -20.44'35" | 6.0 | 000.0 | M41 | MES | 758 OPEN CLUST CANIS MA |
| 5:34:48.0 | -05.24'00" | 9.9 | 000.0 | M42 | MES | 299 DIFFUSE NE ORION |
| 5:34:48.0 | -05.17'48" | 9.9 | 000.0 | M43 | MES | 299 DIFFUSE NE ORION |
| 8:38:12.0 | +19.48'00" | 4.0 | 000.0 | M44 | MES | 157 OPEN CLUST CANCER |
| 3:45:24.0 | +24.02'11" | 2.0 | 000.0 | M45 | MES | 126 OPEN CLUST TAURUS |
| 7:41:00.0 | -14.45'12" | 7.0 | 000.0 | M46 | MES | 1813 OPEN CLUST PUPPIS |
| 7:20:24.0 | -14.13'12" | 5.0 | 000.0 | M47 | MES | 9999 OPEN CLUST PUPPIS |
| 8:06:36.0 | -05.22'48" | 6.0 | 000.0 | M48 | MES | 9999 OPEN CLUST HYDRA |
| 12:28:12.0 | +08.09'36" | 9.0 | 000.0 | M49 | MES | 32000ELLIPTICAL VIRGO |
| 7:02:36.0 | -08.18'36" | 6.0 | 000.0 | M50 | MES | 798 OPEN CLUST MONOCEROS |
| 13:29:48.0 | +47.21'11" | 9.0 | 000.0 | M51 | MES | 32000SPIRAL GAL CANES VEN |
| 23:23:12.0 | +61.26'23" | 8.0 | 000.0 | M52 | MES | 1166 OPEN CLUST CASSIOPEI |
| 13:12:36.0 | +18.20'35" | 8.0 | 000.0 | M53 | MES | 19939GLOB CLUST COMA BERE |
| 18:53:12.0 | -30.31'11" | 8.0 | 000.0 | M54 | MES | 15031GLOB CLUST SAGITTAR |
| 19:38:12.0 | -31.00'47" | 6.0 | 000.0 | M55 | MES | 5767 GLOB CLUST SAGITTAR |
| 19:16:00.0 | +30.07'00" | 9.0 | 000.0 | M56 | MES | 13804GLOB CLUST LYRA |
| 18:53:12.0 | +33.00'47" | 9.0 | 000.0 | M57 | MES | 660 PLANETARY LYRA |
| 12:35:00.0 | +11.58'00" | 10.0 | 000.0 | M58 | MES | 32000SPIRAL GAL VIRGO |
| 12:41:00.0 | +11.48'00" | 10.0 | 000.0 | M59 | MES | 32000ELLIPTICAL VIRGO |
| 12:42:36.0 | +11.43'24" | 10.0 | 000.0 | M60 | MES | 32000ELLIPTICAL VIRGO |
| 12:20:24.0 | +04.38'00" | 10.0 | 000.0 | M61 | MES | 32000SPIRAL GAL VIRGO |
| 16:59:48.0 | -30.05'47" | 7.0 | 000.0 | M62 | MES | 6810 GLOB CLUST OPHIUCHUS |
| 13:15:24.0 | +42.11'11" | 9.0 | 000.0 | M63 | MES | 32000SPIRAL GAL CANES VEN |
| 12:55:24.0 | +21.41'11" | 8.0 | 000.0 | M64 | MES | 32000SPIRAL GAL COMA BERE |

| | | | | | |
|---|---|---|---|---|---|
| 11:17:36.0 | +13.17'48" | 10.0 | 000.0 | M65 | MES 32000SPIRAL GAL LEO |
| 11:19:48.0 | +13.10'12" | 9.0 | 000.0 | M66 | MES 32000SPIRAL GAL LEO |
| 8:49:24.0 | +11.55'00" | 7.0 | 000.0 | M67 | MES 828 OPEN CLUST CANCER |
| 12:38:12.0 | -26.36'23" | 9.0 | 000.0 | M68 | MES 11472GLOB CLUST HYDRA |
| 18:29:48.0 | -32.22'47" | 8.0 | 000.0 | M69 | MES 7178 GLOB CLUST SAGITTAR |
| 18:41:00.0 | -32.20'11" | 8.0 | 000.0 | M70 | MES 19939GLOB CLUST SAGITTAR |
| 19:52:12.0 | +18.36'23" | 8.0 | 000.0 | M71 | MES 5491 GLOB CLUST SAGITTA |
| 20:52:36.0 | -12.39'24" | 9.0 | 000.0 | M72 | MES 18160GLOB CLUST AQUARIUS |
| 20:57:36.0 | -12.45'00" | 9.9 | 000.0 | M73 | MES 9999 (FOUR STAR AQUARIUS |
| 1:35:24.0 | +15.38'12" | 10.0 | 000.0 | M74 | MES 32000SPIRAL GAL PISCES |
| 20:04:48.0 | -22.01'23" | 9.0 | 000.0 | M75 | MES 23926GLOB CLUST SAGITTAR |
| 1:40:24.0 | +51.25'23" | 11.0 | 000.0 | M76 | MES 2515 PLANETARY PERSEUS |
| 2:41:00.0 | -00.09'24" | 10.0 | 000.0 | M77 | MES 32000SPIRAL GAL CETUS |
| 5:45:24.0 | +00.03'12" | 8.0 | 000.0 | M78 | MES 9999 DIFFUSE NE ORION |
| 5:23:12.0 | -24.33'24" | 8.0 | 000.0 | M79 | MES 13190GLOB CLUST LEPUS |
| 16:15:24.0 | -22.55'11" | 8.0 | 000.0 | M80 | MES 10982GLOB CLUST SCORPIO |
| 9:54:12.0 | +69.12'48" | 7.0 | 000.0 | M81 | MES 32000SPIRAL GAL URSA MAJO |
| 9:54:12.0 | +69.50'35" | 9.0 | 000.0 | M82 | MES 32000IRREGULAR URSA MAJO |
| 13:35:24.0 | -29.43'11" | 8.0 | 000.0 | M83 | MES 32000SPIRAL GAL HYDRA |
| 12:24:48.0 | +13.03'00" | 10.0 | 000.0 | M84 | MES 32000ELLIPTICAL VIRGO |
| 12:24:48.0 | +18.21'47" | 10.0 | 000.0 | M85 | MES 32000ELLIPTICAL COMA BERE |
| 12:25:24.0 | +13.06'48" | 10.0 | 000.0 | M86 | MES 32000ELLIPTICAL VIRGO |
| 12:29:48.0 | +12.33'00" | 10.0 | 000.0 | M87 | MES 32000ELLIPTICAL VIRGO |
| 12:31:00.0 | +14.35'12" | 10.0 | 000.0 | M88 | MES 32000SPIRAL GAL COMA BERE |
| 12:34:48.0 | +12.43'00" | 11.0 | 000.0 | M89 | MES 32000ELLIPTICAL VIRGO |
| 12:34:24.0 | +13.19'36" | 10.0 | 000.0 | M90 | MES 32000SPIRAL GAL VIRGO |
| 12:21:00.0 | +14.18'00" | 9.0 | 000.0 | M91 | MES 9999 UNEXPLAINE COMA BERE |

```
                                                                                            407-001

17:17:36.0 +43.11'11"  7.0  000.0 M92  MES 10982GLOB CLUST HERCULES
 7:43:48.0 -23.48'00"  6.0  000.0 M93  MES  1095 OPEN CLUST PUPPIS
12:50:24.0 +41.17'47"  9.0  000.0 M94  MES 32000SPIRAL GAL CANES VEN
10:42:36.0 +11.52'48" 10.0  000.0 M95  MES 32000SPIRAL GAL LEO
10:45:24.0 +11.59'00" 10.0  000.0 M96  MES 32000SPIRAL GAL LEO
11:13:12.0 +55.12'48" 11.0  000.0 M97  MES  2301 PLANETARY URSA MAJO
12:12:36.0 +15.04'36" 10.0  000.0 M98  MES 32000SPIRAL GAL COMA BERE
12:17:36.0 +14.35'12" 10.0  000.0 M99  MES 32000SPIRAL GAL COMA BERE
12:21:00.0 +15.59'35" 10.0  000.0 M100 MES 32000SPIRAL GAL COMA BERE
14:02:36.0 +54.29'00"  8.0  000.0 M101 MES 32000SPIRAL GAL URSA MAJO
 1:31:00.0 +60.33'35"  7.0  000.0 M103 MES  1147 OPEN CLUST CASSIOPEI
12:38:12.0 -11.28'36"  8.0  000.0 M104 MES 32000SPIRAL GAL VIRGO
10:46:00.0 +12.45'36" 10.0  000.0 M105 MES 32000ELLIPTICAL LEO
12:18:12.0 +47.28'00"  9.0  000.0 M106 MES 32000SPIRAL GAL CANES VEN
16:31:00.0 -12.59'12"  9.0  000.0 M107 MES 29908GLOB CLUST OPHIUCHUS
11:10:24.0 +55.51'11" 10.0  000.0 M108 MES 32000SPIRAL GAL URSA MAJO
11:56:00.0 +53.32'23" 10.0  000.0 M109 MES 32000SPIRAL GAL URSA MAJO
************************************************************  7:13:48.6
+09.28'19" 23.1  000.0 HALLEYS HLY    SAT, OCT 16, 982
 7:12:06.8 +09.14'52" 23.0  000.0 HALLEYS HLY  SUN, OCT 31, 1982
 7:08:54.6 +09.04'49" 22.9  000.0 HALLEYS HLY  MON, NOV 15, 1982
 7:04:16.4 +08.59'23" 22.8  000.0 HALLEYS HLY  TUE, NOV 30, 1982
 6:58:26.4 +08.59'24" 22.7  000.0 HALLEYS HLY  WED, DEC 15, 1982
 6:51:48.6 +09.05'17" 22.7  000.0 HALLEYS HLY  THU, DEC 30, 1982
 6:44:54.7 +09.16'48" 22.6  000.0 HALLEYS HLY  FRI, JAN 14, 1983
 6:38:19.6 +09.33'13" 22.6  000.0 HALLEYS HLY  SAT, JAN 29, 1983
 6:32:35.3 +09.53'17" 22.6  000.0 HALLEYS HLY  SUN, FEB 13, 1983
```

-79-

| | | | | | | |
|---|---|---|---|---|---|---|
| 6:28:07.0 | +10.15'34" | 22.5 | 000.0 | HALLEYS | HLY | MON, FEB 28, 1983 |
| 6:25:09.5 | +10.38'33" | 22.5 | 000.0 | HALLEYS | HLY | TUE, MAR 15, 1983 |
| 6:23:48.3 | +11.00'50" | 22.5 | 000.0 | HALLEYS | HLY | WED, MAR 30, 1983 |
| 6:24:00.1 | +11.21'14" | 22.5 | 000.0 | HALLEYS | HLY | THU, APR 14, 1983 |
| 6:25:36.6 | +11.38'47" | 22.5 | 000.0 | HALLEYS | HLY | FRI, APR 29, 1983 |
| 6:28:24.8 | +11.52'44" | 22.5 | 000.0 | HALLEYS | HLY | SAT, MAY 14, 1983 |
| 6:32:10.5 | +12.02'35" | 22.4 | 000.0 | HALLEYS | HLY | SUN, MAY 29, 1983 |
| 6:36:38.1 | +12.08'03" | 22.4 | 000.0 | HALLEYS | HLY | MON, JUN 13, 1983 |
| 6:41:31.5 | +12.08'58" | 22.3 | 000.0 | HALLEYS | HLY | TUE, JUN 28, 1983 |
| 6:46:34.6 | +12.05'29" | 22.2 | 000.0 | HALLEYS | HLY | WED, JUL 13, 1983 |
| 6:51:31.0 | +11.57'47" | 22.1 | 000.0 | HALLEYS | HLY | THU, JUL 28, 1983 |
| 6:56:03.7 | +11.46'23" | 22.1 | 000.0 | HALLEYS | HLY | FRI, AUG 12, 1983 |
| 6:59:55.0 | +11.31'54" | 22.0 | 000.0 | HALLEYS | HLY | SAT, AUG 27, 1983 |
| 7:02:46.9 | +11.15'12" | 21.9 | 000.0 | HALLEYS | HLY | FRI, SEP 16, 1983 |
| 7:04:21.0 | +10.57'24" | 21.8 | 000.0 | HALLEYS | HLY | MON, SEP 26, 1983 |
| 7:04:19.7 | +10.39'47" | 21.6 | 000.0 | HALLEYS | HLY | TUE, OCT 11, 1983 |
| 7:02:27.9 | +10.23'51" | 21.5 | 000.0 | HALLEYS | HLY | WED, OCT 26, 1983 |
| 6:58:36.4 | +10.11'09" | 21.3 | 000.0 | HALLEYS | HLY | THU, NOV 10, 1983 |
| 6:52:45.3 | +10.03'13" | 21.2 | 000.0 | HALLEYS | HLY | FRI, NOV 25, 1983 |
| 6:45:08.1 | +10.01'17" | 21.1 | 000.0 | HALLEYS | HLY | SAT, DEC 10, 1983 |
| 6:29:57.9 | +10.12'59" | 20.9 | 000.0 | HALLEYS | HLY | WED, JAN 4, 1984 |
| 6:20:37.8 | +10.28'40" | 20.0 | 000.0 | HALLEYS | HLY | THU, JAN 19, 1984 |
| 6:12:08.2 | +10.49'37" | 20.8 | 000.0 | HALLEYS | HLY | FRI, FEB 3, 1984 |
| 6:05:10.6 | +11.14'24" | 20.8 | 000.0 | HALLEYS | HLY | SAT, FEB 18, 1984 |
| 6:00:11.5 | +11.41'21" | 20.7 | 000.0 | HALLEYS | HLY | SUN, MAR 4, 1984 |
| 5:57:22.2 | +12.08'52" | 20.7 | 000.0 | HALLEYS | HLY | MON, MAR 19, 1984 |
| 5:56:40.3 | +12.35'29" | 20.7 | 000.0 | HALLEYS | HLY | TUE, APR 3, 1984 |

| | | | | | | |
|---|---|---|---|---|---|---|
| 5:57:55.0 | +12.59'57" | 20.7 | 000.0 | HALLEYS | HLY | WED, APR 18, 1984 |
| 6:00:50.0 | +13.21'17" | 20.6 | 000.0 | HALLEYS | HLY | THU, MAY 3, 1984 |
| 6:05:06.6 | +13.38'39" | 20.6 | 000.0 | HALLEYS | HLY | FRI, MAY 18, 1984 |
| 6:10:25.5 | +13.51'29" | 20.5 | 000.0 | HALLEYS | HLY | SAT, JUN 2, 1984 |
| 6:16:26.9 | +13.59'24" | 20.4 | 000.0 | HALLEYS | HLY | SUN, JUN 17, 1984 |
| 6:22:51.5 | +14.02'15" | 20.3 | 000.0 | HALLEYS | HLY | MON, JUL 2, 1984 |
| 6:29:19.1 | +14.00'01" | 20.2 | 000.0 | HALLEYS | HLY | TUE, JUL 17, 1984 |
| 6:35:29.5 | +13.53'00" | 20.0 | 000.0 | HALLEYS | HLY | WED, AUG 1, 1984 |
| 6:41:00.1 | +13.41'38" | 19.9 | 000.0 | HALLEYS | HLY | THU, AUG 16, 1984 |
| 6:45:26.7 | +13.26'39" | 19.7 | 000.0 | HALLEYS | HLY | FRI, AUG 31, 1984 |
| 6:48:21.7 | +13.09'02" | 19.5 | 000.0 | HALLEYS | HLY | SAT, SEP 15, 1984 |
| 6:49:15.1 | +12.50'06" | 19.3 | 000.0 | HALLEYS | HLY | SUN, SEP 30, 1984 |
| 6:47:46.3 | +12.32'36" | 19.1 | 000.0 | HALLEYS | HLY | SUN, OCT 14, 1984 |
| 6:43:13.8 | +12.15'44" | 18.8 | 000.0 | HALLEYS | HLY | MON, OCT 29, 1984 |
| 6:34:35.4 | +12.01'57" | 18.6 | 000.0 | HALLEYS | HLY | WED, NOV 14, 1984 |
| 6:22:52.2 | +11.54'42" | 18.3 | 000.0 | HALLEYS | HLY | THU, NOV 29, 1984 |
| 6:08:10.2 | +11.54'12" | 18.1 | 000.0 | HALLEYS | HLY | FRI, DEC 14, 1984 |
| 5:51:39.5 | +12.01'01" | 17.9 | 000.0 | HALLEYS | HLY | SAT, DEC 29, 1984 |
| 5:35:02.7 | +12.15'07" | 17.8 | 000.0 | HALLEYS | HLY | SUN, JAN 13, 1985 |
| 5:20:04.2 | +12.36'03" | 17.7 | 000.0 | HALLEYS | HLY | MON, JAN 28, 1985 |
| 5:08:05.1 | +13.03'07" | 17.6 | 000.0 | HALLEYS | HLY | TUE, FEB 12, 1985 |
| 4:59:45.5 | +13.35'13" | 17.5 | 000.0 | HALLEYS | HLY | WED, FEB 27, 1985 |
| 4:55:10.7 | +14.11'01" | 17.5 | 000.0 | HALLEYS | HLY | THU, MAR 14, 1985 |
| 4:54:02.5 | +14.49'03" | 17.4 | 000.0 | HALLEYS | HLY | FRI, MAR 29, 1985 |
| 4:55:52.3 | +15.27'43" | 17.3 | 000.0 | HALLEYS | HLY | SAT, APR 13, 1985 |
| 5:00:09.3 | +16.05'41" | 17.1 | 000.0 | HALLEYS | HLY | SUN, APR 28, 1985 |
| 5:06:23.0 | +16.41'40" | 17.0 | 000.0 | HALLEYS | HLY | SUN, MAY 12, 1985 |

| | | | | |
|---|---|---|---|---|
| 5:14:06.9 | +17.14'45" | 16.7 | 000.0 HALLEYS HLY | TUE, MAY 28, 1985 |
| 5:22:55.7 | +17.44'10" | 16.5 | 000.0 HALLEYS HLY | WED, JUN 12, 1985 |
| 5:32:27.1 | +18.09'31" | 16.2 | 000.0 HALLEYS HLY | THU, JUN 27, 1985 |
| 5:37:01.5 | +18.19'54" | 16.1 | 000.0 HALLEYS HLY | THU, JUL 4, 1985 |
| 5:41:37.8 | +18.29'25" | 15.9 | 000.0 HALLEYS HLY | THU, JUL 11, 1985 |
| 5:46:13.4 | +18.38'03" | 14.8 | 000.0 HALLEYS HLY | THU, JUL 18, 1985 |
| 5:50:45.3 | +18.45'53" | 14.6 | 000.0 HALLEYS HLY | THU, JUL 25, 1985 |
| 5:55:10.2 | +18.53'00" | 14.3 | 000.0 HALLEYS HLY | THU, AUG 1, 1985 |
| 5:59:24.8 | +18.59'31" | 14.1 | 000.0 HALLEYS HLY | THU, AUG 8, 1985 |
| 6:03:25.1 | +19.05'37" | 13.8 | 000.0 HALLEYS HLY | THU, AUG 15, 1985 |
| 6:07:05.6 | +19.11'29" | 13.5 | 000.0 HALLEYS HLY | THU, AUG 22, 1985 |
| 6:10:20.0 | +19.17'22" | 13.2 | 000.0 HALLEYS HLY | THU, AUG 29, 1985 |
| 6:13:01.1 | +19.23'39" | 12.9 | 000.0 HALLEYS HLY | THU, SEP 5, 1985 |
| 6:14:58.5 | +19.30'44" | 12.5 | 000.0 HALLEYS HLY | THU, SEP 12, 1985 |
| 6:15:58.3 | +19.39'11" | 12.1 | 000.0 HALLEYS HLY | THU, SEP 19, 1985 |
| 6:15:41.7 | +19.49'44" | 11.7 | 000.0 HALLEYS HLY | THU, SEP 26, 1985 |
| 6:13:42.9 | +20.03'15" | 11.3 | 000.0 HALLEYS HLY | THU, OCT 3, 1985 |
| 6:09:22.9 | +20.20'46" | 10.8 | 000.0 HALLEYS HLY | THU, OCT 10, 1985 |
| 6:01:41.8 | +20.43'23" | 10.2 | 000.0 HALLEYS HLY | THU, OCT 17, 1985 |
| 5:49:06.6 | +21.11'49" | 9.6 | 000.0 HALLEYS HLY | THU, OCT 24, 1985 |
| 5:32:34.8 | +21.39'51" | 9.1 | 000.0 HALLEYS HLY | THU, OCT 31, 1985 |
| 4:57:51.5 | +22.13'13" | 8.3 | 000.0 HALLEYS HLY | THU, NOV 7, 1985 |
| 4:09:52.7 | +22.09'26" | 7.5 | 000.0 HALLEYS HLY | THU, NOV 14, 1985 |
| 3:01:56.0 | +20.30'41" | 6.9 | 000.0 HALLEYS HLY | THU, NOV 21, 1985 |
| 1:42:15.6 | +16.21'08" | 6.4 | 000.0 HALLEYS HLY | THU, NOV 28, 1985 |
| 0:30:16.8 | +10.44'21" | 6.1 | 000.0 HALLEYS HLY | THU, DEC 5, 1985 |
| 23:36:59.4 | +05.43'22" | 6.0 | 000.0 HALLEYS HLY | THU, DEC 12, 1985 |

| | | | | |
|---|---|---|---|---|
| 23:00:21.6 | +02.01'52" | 5.9 | 000.0 HALLEYS HLY | THU, DEC 19, 1985 |
| 22:41:17.9 | +00.05'01" | 5.7 | 000.0 HALLEYS HLY | TUE, DEC 24, 1985 |
| 22:38:00.2 | -00.15'08" | 5.7 | 000.0 HALLEYS HLY | WED, DEC 25, 1985 |
| 22:34:51.6 | -00.34'22" | 5.6 | 000.0 HALLEYS HLY | THU, DEC 26, 1985 |
| 22:31:50.9 | -00.52'46" | 5.6 | 000.0 HALLEYS HLY | FRI, DEC 27, 1985 |
| 22:28:57.7 | -01.10'22" | 5.6 | 000.0 HALLEYS HLY | SAT, DEC 28, 1985 |
| 22:26:11.4 | -01.27'14" | 5.5 | 000.0 HALLEYS HLY | SUN, DEC 29, 1985 |
| 22:23:31.6 | -01.43'25" | 5.5 | 000.0 HALLEYS HLY | MON, DEC 30, 1985 |
| 22:20:58.2 | -01.58'59" | 5.4 | 000.0 HALLEYS HLY | TUE, DEC 31, 1985 |
| 22:18:29.5 | -02.13'57" | 5.4 | 000.0 HALLEYS HLY | WED, JAN 1, 1986 |
| 22:16:06.6 | -02.28'24" | 5.3 | 000.0 HALLEYS HLY | THU, JAN 2, 1986 |
| 22:13:47.6 | -02.42'21" | 5.3 | 000.0 HALLEYS HLY | FRI, JAN 3, 1986 |
| 22:11:33.7 | -02.55'52" | 5.2 | 000.0 HALLEYS HLY | SAT, JAN 4, 1986 |
| 22:09:23.0 | -03.08'58" | 5.2 | 000.0 HALLEYS HLY | SUN, JAN 5, 1986 |
| 22:07:16.0 | -03.21'41" | 5.1 | 000.0 HALLEYS HLY | MON, JAN 6, 1986 |
| 22:05:12.5 | -03.34'05" | 5.0 | 000.0 HALLEYS HLY | TUE, JAN 7, 1986 |
| 22:03:11.9 | -03.46'10" | 5.0 | 000.0 HALLEYS HLY | WED, JAN 8, 1986 |
| 22:01:13.8 | -03.58'00" | 4.9 | 000.0 HALLEYS HLY | THU, JAN 9, 1986 |
| 21:59:18.2 | -04.09'35" | 4.8 | 000.0 HALLEYS HLY | FRI, JAN 10, 1986 |
| 21:57:24.5 | -04.20'57" | 4.8 | 000.0 HALLEYS HLY | SAT, JAN 11, 1986 |
| 21:55:32.9 | -04.32'10" | 4.7 | 000.0 HALLEYS HLY | SUN, JAN 12, 1986 |
| 21:53:42.7 | -04.43'14" | 4.6 | 000.0 HALLEYS HLY | MON, JAN 13, 1986 |
| 21:51:54.0 | -04.54'11" | 4.6 | 000.0 HALLEYS HLY | TUE, JAN 14, 1986 |
| 21:50:06.4 | -05.05'02" | 4.5 | 000.0 HALLEYS HLY | WED, JAN 15, 1986 |
| 21:48:19.8 | -05.15'49" | 4.4 | 000.0 HALLEYS HLY | THU, JAN 16, 1986 |
| 21:46:34.0 | -05.26'34" | 4.3 | 000.0 HALLEYS HLY | FRI, JAN 17, 1986 |
| 21:44:48.5 | -05.37'19" | 4.3 | 000.0 HALLEYS HLY | SAT, JAN 18, 1986 |

| | | | | | |
|---|---|---|---|---|---|
| 21:43:04.1 | -05.48'04" | 4.2 | 000.0 | HALLEYS | HLY | SUN, JAN 19, 1986 |
| 21:41:19.3 | -05.58'50" | 4.1 | 000.0 | HALLEYS | HLY | MON, JAN 20, 1986 |
| 21:39:35.3 | -06.09'40" | 4.0 | 000.0 | HALLEYS | HLY | TUE, JAN 21, 1986 |
| 21:37:50.9 | -06.20'35" | 3.9 | 000.0 | HALLEYS | HLY | WED, JAN 22, 1986 |
| 21:36:06.5 | -06.31'35" | 3.9 | 000.0 | HALLEYS | HLY | THU, JAN 23, 1986 |
| 21:34:21.7 | -06.42'43" | 3.8 | 000.0 | HALLEYS | HLY | FRI, JAN 24, 1986 |
| 21:32:37.0 | -06.53'58" | 3.7 | 000.0 | HALLEYS | HLY | SAT, JAN 25, 1986 |
| 21:30:51.5 | -07.05'23" | 3.6 | 000.0 | HALLEYS | HLY | SUN, JAN 26, 1986 |
| 21:29:05.6 | -07.16'58" | 3.6 | 000.0 | HALLEYS | HLY | MON, JAN 27, 1986 |
| 21:27:19.4 | -07.28'44" | 3.5 | 000.0 | HALLEYS | HLY | TUE, JAN 28, 1986 |
| 21:25:32.9 | -07.40'42" | 3.4 | 000.0 | HALLEYS | HLY | WED, JAN 29, 1986 |
| 21:23:45.6 | -07.52'52" | 3.3 | 000.0 | HALLEYS | HLY | THU, JAN 30, 1986 |
| 21:21:57.6 | -08.05'17" | 3.3 | 000.0 | HALLEYS | HLY | FRI, JAN 31, 1986 |
| 21:20:09.2 | -08.17'55" | 3.2 | 000.0 | HALLEYS | HLY | SAT, FEB 1, 1986 |
| 21:18:20.2 | -08.30'48" | 3.2 | 000.0 | HALLEYS | HLY | SUN, FEB 2, 1986 |
| 21:16:30.7 | -08.43'56" | 3.1 | 000.0 | HALLEYS | HLY | MON, FEB 3, 1986 |
| 21:14:41.3 | -08.57'20" | 3.1 | 000.0 | HALLEYS | HLY | TUE, FEB 4, 1986 |
| 21:12:50.8 | -09.10'59" | 3.0 | 000.0 | HALLEYS | HLY | WED, FEB 5, 1986 |
| 21:11:00.6 | -09.24'55" | 3.0 | 000.0 | HALLEYS | HLY | THU, FEB 6, 1986 |
| 21:09:10.4 | -09.39'06" | 3.0 | 000.0 | HALLEYS | HLY | FRI, FEB 7, 1986 |
| 21:07:19.9 | -09.53'33" | 2.9 | 000.0 | HALLEYS | HLY | SAT, FEB 8, 1986 |
| 21:05:29.0 | -10.08'16" | 2.9 | 000.0 | HALLEYS | HLY | SUN, FEB 9, 1986 |
| 21:03:38.9 | -10.23'16" | 2.9 | 000.0 | HALLEYS | HLY | MON, FEB 10, 1986 |
| 21:01:48.7 | -10.38'31" | 3.0 | 000.0 | HALLEYS | HLY | TUE, FEB 11, 1986 |
| 20:59:59.3 | -10.54'03" | 3.0 | 000.0 | HALLEYS | HLY | WED, FEB 12, 1986 |
| 20:58:09.5 | -11.09'50" | 3.0 | 000.0 | HALLEYS | HLY | THU, FEB 13, 1986 |
| 20:56:20.8 | -11.25'53" | 3.0 | 000.0 | HALLEYS | HLY | FRI, FEB 14, 1986 |

407-001

| | | | | | |
|---|---|---|---|---|---|
| 20:54:32.8 | -11.42'12" | 3.2 | 000.0 | HALLEYS HLY | SAT, FEB 15, 1986 |
| 20:52:45.1 | -11.58'46" | 3.2 | 000.0 | HALLEYS HLY | SUN, FEB 16, 1986 |
| 20:50:58.6 | -12.15'36" | 3.2 | 000.0 | HALLEYS HLY | MON, FEB 17, 1986 |
| 20:49:12.4 | -12.32'42" | 3.3 | 000.0 | HALLEYS HLY | TUE, FEB 18, 1986 |
| 20:47:26.9 | -12.50'06" | 3.5 | 000.0 | HALLEYS HLY | WED, FEB 19, 1986 |
| 20:45:42.1 | -13.07'46" | 3.6 | 000.0 | HALLEYS HLY | THU, FEB 20, 1986 |
| 20:43:58.1 | -13.25'44" | 3.7 | 000.0 | HALLEYS HLY | FRI, FEB 21, 1986 |
| 20:42:14.4 | -13.44'00" | 3.9 | 000.0 | HALLEYS HLY | SAT, FEB 22, 1986 |
| 20:40:31.4 | -14.02'37" | 4.0 | 000.0 | HALLEYS HLY | SUN, FEB 23, 1986 |
| 20:38:48.5 | -14.21'34" | 4.1 | 000.0 | HALLEYS HLY | MON, FEB 24, 1986 |
| 20:35:23.6 | -15.00'35" | 4.4 | 000.0 | HALLEYS HLY | WED, FEB 26, 1986 |
| 20:33:41.0 | -15.20'42" | 4.5 | 000.0 | HALLEYS HLY | THU, FEB 27, 1986 |
| 20:31:58.8 | -15.41'16" | 4.6 | 000.0 | HALLEYS HLY | FRI, FEB 28, 1986 |
| 20:30:15.5 | -16.02'20" | 4.7 | 000.0 | HALLEYS HLY | SAT, MAR 1, 1986 |
| 20:28:31.4 | -16.23'55" | 4.8 | 000.0 | HALLEYS HLY | SUN, MAR 2, 1986 |
| 20:26:46.3 | -16.46'04" | 4.9 | 000.0 | HALLEYS HLY | MON, MAR 3, 1986 |
| 20:25:00.1 | -17.08'50" | 5.0 | 000.0 | HALLEYS HLY | TUE, MAR 4, 1986 |
| 20:23:11.8 | -17.32'17" | 5.0 | 000.0 | HALLEYS HLY | WED, MAR 5, 1986 |
| 20:21:21.6 | -17.56'27" | 5.0 | 000.0 | HALLEYS HLY | THU, MAR 6, 1986 |
| 20:19:29.3 | -18.21'25" | 5.0 | 000.0 | HALLEYS HLY | FRI, MAR 7, 1986 |
| 20:17:34.1 | -18.47'14" | 5.0 | 000.0 | HALLEYS HLY | SAT, MAR 8, 1986 |
| 20:15:34.9 | -19.14'00" | 5.0 | 000.0 | HALLEYS HLY | SUN, MAR 9, 1986 |
| 20:13:32.2 | -19.41'46" | 5.0 | 000.0 | HALLEYS HLY | MON, MAR 10, 1986 |
| 20:11:25.1 | -20.10'38" | 5.0 | 000.0 | HALLEYS HLY | TUE, MAR 11, 1986 |
| 20:09:12.2 | -20.40'44" | 5.0 | 000.0 | HALLEYS HLY | WED, MAR 12, 1986 |
| 20:06:54.0 | -21.12'07" | 4.9 | 000.0 | HALLEYS HLY | THU, MAR 13, 1986 |
| 20:04:28.6 | -21.44'56" | 4.9 | 000.0 | HALLEYS HLY | FRI, MAR 14, 1986 |

| | | | | |
|---|---|---|---|---|
| 20:01:55.9 | -22.19'17" | 4.9 | 000.0 HALLEYS HLY | SAT, MAR 15, 1986 |
| 19:59:14.3 | -22.55'18" | 4.8 | 000.0 HALLEYS HLY | SUN, MAR 16, 1986 |
| 19:56:22.9 | -23.33'09" | 4.8 | 000.0 HALLEYS HLY | MON, MAR 17, 1986 |
| 19:53:20.4 | -24.12'58" | 4.7 | 000.0 HALLEYS HLY | TUE, MAR 18, 1986 |
| 19:50:05.3 | -24.54'56" | 4.7 | 000.0 HALLEYS HLY | WED, MAR 19, 1986 |
| 19:46:35.8 | -25.39'13" | 4.6 | 000.0 HALLEYS HLY | THU, MAR 20, 1986 |
| 19:42:50.0 | -26.26'01" | 4.6 | 000.0 HALLEYS HLY | FRI, MAR 21, 1986 |
| 19:38:45.2 | -27.15'31" | 4.5 | 000.0 HALLEYS HLY | SAT, MAR 22, 1986 |
| 19:34:19.9 | -28.07'54" | 4.5 | 000.0 HALLEYS HLY | SUN, MAR 23, 1986 |
| 19:29:30.5 | -29.03'24" | 4.5 | 000.0 HALLEYS HLY | MON, MAR 24, 1986 |
| 19:24:13.7 | -30.02'13" | 4.4 | 000.0 HALLEYS HLY | TUE, MAR 25, 1986 |
| 19:18:24.8 | -31.04'29" | 4.4 | 000.0 HALLEYS HLY | WED, MAR 26, 1986 |
| 19:11:59.6 | -32.10'24" | 4.3 | 000.0 HALLEYS HLY | THU, MAR 27, 1986 |
| 19:04:53.0 | -33.20'03" | 4.3 | 000.0 HALLEYS HLY | FRI, MAR 28, 1986 |
| 18:56:57.5 | -34.33'25" | 4.2 | 000.0 HALLEYS HLY | SAT, MAR 29, 1986 |
| 18:48:06.5 | -35.50'23" | 4.2 | 000.0 HALLEYS HLY | SUN, MAR 30, 1986 |
| 18:38:11.0 | -37.10'39" | 4.1 | 000.0 HALLEYS HLY | MON, MAR 31, 1986 |
| 18:27:01.8 | -38.33'39" | 4.1 | 000.0 HALLEYS HLY | TUE, APR 1, 1986 |
| 18:14:27.6 | -39.58'29" | 4.1 | 000.0 HALLEYS HLY | WED, APR 2, 1986 |
| 18:00:18.0 | -41.23'45" | 4.0 | 000.0 HALLEYS HLY | THU, APR 3, 1986 |
| 17:44:20.4 | -42.47'34" | 4.0 | 000.0 HALLEYS HLY | FRI, APR 4, 1986 |
| 17:26:25.8 | -44.07'20" | 4.0 | 000.0 HALLEYS HLY | SAT, APR 5, 1986 |
| 17:06:27.7 | -45.19'50" | 4.0 | 000.0 HALLEYS HLY | SUN, APR 6, 1986 |
| 16:44:26.5 | -46.21'15" | 4.0 | 000.0 HALLEYS HLY | MON, APR 7, 1986 |
| 16:20:31.2 | -47.07'28" | 4.0 | 000.0 HALLEYS HLY | TUE, APR 8, 1986 |
| 15:55:02.6 | -47.34'36" | 4.0 | 000.0 HALLEYS HLY | WED, APR 9, 1986 |
| 15:28:34.7 | -47.39'28" | 4.0 | 000.0 HALLEYS HLY | THU, APR 10, 1986 |

407-001

| | | | | | | |
|---|---|---|---|---|---|---|
| 15:01:48.7 | -47.20'24" | 4.0 | 000.0 | HALLEYS | HLY | FRI, APR 11, 1986 |
| 14:35:30.5 | -46.37'31" | 4.1 | 000.0 | HALLEYS | HLY | SAT, APR 12, 1986 |
| 14:10:19.9 | -45.32'49" | 4.1 | 000.0 | HALLEYS | HLY | SUN, APR 13, 1986 |
| 13:46:49.1 | -44.09'43" | 4.2 | 000.0 | HALLEYS | HLY | MON, APR 14, 1986 |
| 13:25:16.0 | -42.32'31" | 4.3 | 000.0 | HALLEYS | HLY | TUE, APR 15, 1986 |
| 13:05:48.5 | -40.45'41" | 4.4 | 000.0 | HALLEYS | HLY | WED, APR 16, 1986 |
| 12:48:25.2 | -38.53'20" | 4.5 | 000.0 | HALLEYS | HLY | THU, APR 17, 1986 |
| 12:32:59.3 | -36.59'00" | 4.6 | 000.0 | HALLEYS | HLY | FRI, APR 18, 1986 |
| 12:19:19.9 | -35.05'28" | 4.7 | 000.0 | HALLEYS | HLY | SAT, APR 19, 1986 |
| 12:07:16.3 | -33.14'45" | 4.8 | 000.0 | HALLEYS | HLY | SUN, APR 20, 1986 |
| 11:56:37.0 | -31.28'15" | 4.9 | 000.0 | HALLEYS | HLY | MON, APR 21, 1986 |
| 11:47:11.4 | -29.46'50" | 5.1 | 000.0 | HALLEYS | HLY | TUE, APR 22, 1986 |
| 11:38:49.9 | -28.11'00" | 5.2 | 000.0 | HALLEYS | HLY | WED, APR 23, 1986 |
| 11:31:24.6 | -26.40'55" | 5.3 | 000.0 | HALLEYS | HLY | THU, APR 24, 1986 |
| 11:24:47.9 | -25.16'35" | 5.4 | 000.0 | HALLEYS | HLY | FRI, APR 25, 1986 |
| 11:18:53.6 | -23.57'49" | 5.5 | 000.0 | HALLEYS | HLY | SAT, APR 26, 1986 |
| 11:13:36.5 | -22.44'23" | 5.6 | 000.0 | HALLEYS | HLY | SUN, APR 27, 1986 |
| 11:08:52.1 | -21.36'00" | 5.8 | 000.0 | HALLEYS | HLY | MON, APR 28, 1986 |
| 10:57:16.6 | -18.37'54" | 6.1 | 000.0 | HALLEYS | HLY | THU, MAY 1, 1986 |
| 10:54:07.9 | -17.46'31" | 6.2 | 000.0 | HALLEYS | HLY | FRI, MAY 2, 1986 |
| 10:51:17.3 | -16.58'37" | 6.3 | 000.0 | HALLEYS | HLY | SAT, MAY 3, 1986 |
| 10:48:42.5 | -16.13'57" | 6.3 | 000.0 | HALLEYS | HLY | SUN, MAY 4, 1986 |
| 10:46:22.1 | -15.32'16" | 6.4 | 000.0 | HALLEYS | HLY | MON, MAY 5, 1986 |
| 10:34:58.4 | -11.46'39" | 7.0 | 000.0 | HALLEYS | HLY | MON, MAY 12, 1986 |
| 10:29:16.4 | -09.21'25" | 7.4 | 000.0 | HALLEYS | HLY | MON, MAY 19, 1986 |
| 10:26:51.0 | -07.45'27" | 7.8 | 000.0 | HALLEYS | HLY | MON, MAY 26, 1986 |
| 10:26:28.3 | -06.41'29" | 8.2 | 000.0 | HALLEYS | HLY | MON, JUN 2, 1986 |

-87-

| | | | | | |
|---|---|---|---|---|---|
| 10:27:28.8 | -05.59'37" | 8.5 | 000.0 | HALLEYS | HLY | MON, JUN 9, 1986 |
| 10:29:26.9 | -05.33'45" | 8.9 | 000.0 | HALLEYS | HLY | MON, JUN 16, 1986 |
| 10:32:06.0 | -05.19'48" | 9.2 | 000.0 | HALLEYS | HLY | MON, JUN 23, 1986 |
| 10:35:14.6 | -05.15'01" | 9.6 | 000.0 | HALLEYS | HLY | MON, JUN 30, 1986 |
| 10:38:45.6 | -05.17'32" | 9.9 | 000.0 | HALLEYS | HLY | MON, JUL 7, 1986 |
| 10:42:33.5 | -05.25'58" | 10.3 | 000.0 | HALLEYS | HLY | MON, JUL 14, 1986 |
| 10:46:32.9 | -05.39'14" | 10.6 | 000.0 | HALLEYS | HLY | MON, JUL 21, 1986 |
| 10:50:40.2 | -05.56'31" | 11.0 | 000.0 | HALLEYS | HLY | MON, JUL 28, 1986 |
| 10:54:52.6 | -06.17'12" | 11.3 | 000.0 | HALLEYS | HLY | MON, AUG 4, 1986 |
| 10:59:07.4 | -06.40'46" | 11.7 | 000.0 | HALLEYS | HLY | MON, AUG 11, 1986 |
| 11:03:22.7 | -07.06'46" | 12.0 | 000.0 | HALLEYS | HLY | MON, AUG 18, 1986 |
| 11:07:35.4 | -07.34'48" | 12.3 | 000.0 | HALLEYS | HLY | MON, AUG 25, 1986 |
| 11:11:44.5 | -08.04'36" | 12.6 | 000.0 | HALLEYS | HLY | MON, SEP 1, 1986 |
| 11:15:47.9 | -08.35'52" | 12.9 | 000.0 | HALLEYS | HLY | MON, SEP 8, 1986 |
| 11:19:42.2 | -09.08'20" | 13.1 | 000.0 | HALLEYS | HLY | MON, SEP 15, 1986 |
| 11:23:26.9 | -09.41'43" | 13.3 | 000.0 | HALLEYS | HLY | MON, SEP 22, 1986 |
| 11:26:59.3 | -10.15'49" | 13.5 | 000.0 | HALLEYS | HLY | MON, SEP 29, 1986 |
| 11:30:16.9 | -10.50'25" | 13.7 | 000.0 | HALLEYS | HLY | MON, OCT 6, 1986 |
| 11:33:17.6 | -11.30'12" | 13.8 | 000.0 | HALLEYS | HLY | MON, OCT 13, 1986 |
| 11:35:59.3 | -12.00'00" | 13.9 | 000.0 | HALLEYS | HLY | MON, OCT 20, 1986 |
| 11:38:18.2 | -12.34'30" | 14.0 | 000.0 | HALLEYS | HLY | MON, OCT 27, 1986 |
| 11:40:12.4 | -13.08'26" | 14.0 | 000.0 | HALLEYS | HLY | MON, NOV 3, 1986 |
| 11:41:37.7 | -13.41'29" | 14.1 | 000.0 | HALLEYS | HLY | MON, NOV 10, 1986 |
| 11:42:31.3 | -14.13'14" | 14.1 | 000.0 | HALLEYS | HLY | MON, NOV 17, 1986 |
| 11:42:49.7 | -14.43'21" | 14.1 | 000.0 | HALLEYS | HLY | MON, NOV 24, 1986 |
| 11:42:29.9 | -15.11'24" | 14.1 | 000.0 | HALLEYS | HLY | MON, DEC 1, 1986 |
| 11:41:27.6 | -15.36'47" | 14.1 | 000.0 | HALLEYS | HLY | MON, DEC 8, 1986 |

407-001

```
11:39:40.3  -15.58'57"  14.1  000.0 HALLEYS  HLY  MON, DEC 15, 1986
11:36:38.9  -16.19'34"  14.1  000.0 HALLEYS  HLY  TUE, DEC 23, 1986
11:33:07.2  -16.32'41"  14.1  000.0 HALLEYS  HLY  TUE, DEC 30, 1986
11:28:45.1  -16.40'27"  14.1  000.0 HALLEYS  HLY  TUE, JAN  6, 1987
11:23:33.7  -16.42'07"  14.1  000.0 HALLEYS  HLY  TUE, JAN 13, 1987
11:17:35.9  -16.37'09"  14.2  000.0 HALLEYS  HLY  TUE, JAN 20, 1987
11:10:56.3  -16.25'02"  14.3  000.0 HALLEYS  HLY  TUE, JAN 27, 1987
11:03:42.8  -16.05'29"  14.5  000.0 HALLEYS  HLY  TUE, FEB  3, 1987
10:54:56.5  -15.34'07"  14.7  000.0 HALLEYS  HLY  WED, FEB 11, 1987
10:47:02.4  -14.59'17"  17.5  000.0 HALLEYS  HLY  WED, FEB 18, 1987
10:39:07.6  -14.18'21"  17.6  000.0 HALLEYS  HLY  WED, FEB 25, 1987
10:31:22.4  -13.32'27"  17.7  000.0 HALLEYS  HLY  WED, MAR  4, 1987
10:23:59.3  -12.42'54"  17.8  000.0 HALLEYS  HLY  WED, MAR 11, 1987
10:17:07.1  -11.51'15"  17.8  000.0 HALLEYS  HLY  WED, MAR 18, 1987
*********************************************************  3:19:54.0 -
43.04'00"   4.3   0.71 HR1008        6
3:24:42.0  +64.35'00"  5.2   2.08 HR100            190
3:28:00.0  +49.04'00"  5.0  -0.09 HR1034           200
3:29:06.0  +59.56'00"  4.2   0.41 HR1035          1100
3:29:54.0  +58.53'00"  4.5   0.56 HR1040          1100
3:42:12.0  +63.13'00"  5.1   1.63 HR1105            34
3:37:06.0  -40.16'00"  4.6   1.04 HR1106            74
3:49:30.0  +65.32'00"  4.5   1.88 HR1155           390
3:49:30.0  -36.12'00"  4.2   0.95 HR1195            53
4:20:42.0  +65.08'00"  5.3   0.81 HR1327            99
4:20:36.0  -20.38'00"  5.4  -0.02 HR1367            63
4:49:54.0  +37.29'00"  4.9   1.44 HR1533           270
```

-89-

| | | | | | |
|---|---|---|---|---|---|
| 0:37:24.0 | +35.24'00" | 5.5 | 0.88 | HR157 | 110 |
| 5:22:36.0 | +79.14'00" | 5.1 | 0.47 | HR1686 | 19 |
| 5:30:12.0 | -47.05'00" | 5.5 | 0.62 | HR1856 | 31 |
| 5:50:54.0 | -52.07'00" | 5.2 | 0.09 | HR2049 | 89 |
| 5:54:06.0 | -63.05'00" | 4.7 | 0.01 | HR2102 | 13 |
| 6:09:00.0 | -22.26'00" | 5.5 | -0.01 | HR2180 | 120 |
| 6:18:48.0 | +69.19'00" | 4.8 | 0.03 | HR2209 | 66 |
| 6:24:12.0 | -11.32'00" | 5.2 | 1.24 | HR2305 | 120 |
| 0:50:42.0 | +64.15'00" | 5.4 | 0.49 | HR233 | 91 |
| 6:33:36.0 | -01.13'00" | 5.1 | -0.14 | HR2395 | 160 |
| 6:46:12.0 | +79.34'00" | 5.5 | 0.50 | HR2401 | 22 |
| 6:35:00.0 | -52.59'00" | 4.4 | -0.02 | HR2435 | 100 |
| 6:47:24.0 | -37.56'00" | 5.3 | -0.08 | HR2518 | 130 |
| 7:00:06.0 | +76.59'00" | 4.6 | 1.36 | HR2527 | 93 |
| 6:49:54.0 | -53.37'00" | 4.4 | 0.92 | HR2554 | 52 |
| 7:40:30.0 | +87.01'00" | 5.1 | 1.63 | HR2609 | 120 |
| 7:04:18.0 | -56.45'00" | 5.2 | -0.04 | HR2683 | 41 |
| 7:12:36.0 | -46.46'00" | 4.5 | 0.32 | HR2740 | 24 |
| 7:13:30.0 | -44.38'00" | 5.1 | 1.56 | HR2748 | 20 |
| 1:08:42.0 | +86.15'00" | 4.3 | 1.21 | HR285 | 68 |
| 7:34:06.0 | -22.18'00" | 4.5 | 0.51 | HR2906 | 26 |
| 7:35:42.0 | -52.32'00" | 4.9 | 1.40 | HR2934 | 120 |
| 7:37:24.0 | -34.58'00" | 4.5 | -0.09 | HR2937 | 88 |
| 7:38:48.0 | -26.48'00" | 3.8 | -0.17 | HR2948 | 9999 |
| 7:46:42.0 | +37.31'00" | 5.2 | 1.58 | HR2999 | 150 |
| 7:45:18.0 | -37.58'00" | 3.6 | 1.72 | HR3017 | 530 |
| 7:47:30.0 | -46.37'00" | 5.2 | -0.14 | HR3037 | 510 |

| | | | | |
|---|---|---|---|---|
| 8:00:12.0 | +73.55'00" | 5.4 | 1.42 | HR3075 | 110
| 7:52:12.0 | −40.35'00" | 3.7 | 1.04 | HR3080 | 38
| 7:52:36.0 | −38.52'00" | 4.5 | −0.19 | HR3084 | 230
| 7:53:18.0 | −48.06'00" | 4.2 | −0.14 | HR3090 | 970
| 7:57:42.0 | −30.20'00" | 4.8 | 0.15 | HR3113 | 41
| 7:59:54.0 | −18.24'00" | 4.6 | 0.08 | HR3131 | 38
| 8:02:18.0 | +02.20'00" | 4.4 | 1.25 | HR3145 | 70
| 7:59:36.0 | −60.35'00" | 5.2 | 1.72 | HR3153 | 300
| 8:12:48.0 | +68.28'00" | 5.3 | 1.04 | HR3182 | 310
| 8:18:36.0 | −36.40'00" | 4.5 | 0.22 | HR3270 | 62
| 8:21:24.0 | −33.03'00" | 4.8 | 1.45 | HR3282 | 110
| 8:25:42.0 | −03.54'00" | 3.9 | −0.02 | HR3314 | 46
| 8:25:06.0 | −24.03'00" | 5.3 | 1.48 | HR3315 | 130
| 8:37:36.0 | −42.59'00" | 4.1 | 0.11 | HR3426 | 950
| 8:40:36.0 | −46.39'00" | 3.8 | 0.71 | HR3445 | 1900
| 8:40:36.0 | −59.46'00" | 4.3 | −0.11 | HR3457 | 350
| 8:44:24.0 | −42.39'00" | 4.1 | 0.87 | HR3477 | 56
| 8:46:00.0 | −46.03'00" | 3.9 | 0.00 | HR3487 | 75
| 8:46:42.0 | −56.46'00" | 4.5 | −0.17 | HR3498 | 250
| 8:55:00.0 | −60.39'00" | 3.8 | −0.10 | HR3571 | 93
| 9:00:36.0 | +41.47'00" | 4.0 | 0.44 | HR3579 | 14
| 8:57:00.0 | −59.14'00" | 4.9 | −0.19 | HR3582 | 280
| 9:00:06.0 | −41.15'00" | 4.5 | 0.65 | HR3591 | 20
| 9:06:30.0 | +38.27'00" | 4.6 | 1.04 | HR3612 | 370
| 9:04:12.0 | −47.06'00" | 3.8 | 1.20 | HR3614 | 57
| 9:05:12.0 | −72.36'00" | 4.5 | 0.61 | HR3643 | 92
| 9:11:18.0 | −62.19'00" | 4.0 | −0.18 | HR3663 | 180

| | | | | | |
|---|---|---|---|---|---|
| 9:16:12.0 | −57.32′00″ | 4.3 | 1.63 | HR3696 | 70 |
| 9:37:06.0 | +81.20′00″ | 4.3 | 1.48 | HR3751 | 57 |
| 9:33:12.0 | −21.07′00″ | 5.0 | 1.02 | HR3808 | 21 |
| 9:31:36.0 | −73.05′00″ | 5.5 | 1.56 | HR3821 | 9999 |
| 9:34:24.0 | −59.14′00″ | 4.1 | 0.01 | HR3825 | 330 |
| 9:38:30.0 | +04.39′00″ | 4.7 | 1.32 | HR3834 | 90 |
| 9:36:48.0 | −49.21′00″ | 4.4 | 0.17 | HR3836 | 28 |
| 9:48:36.0 | +46.01′00″ | 5.1 | 0.62 | HR3881 | 13 |
| 9:54:54.0 | −19.01′00″ | 4.9 | 1.57 | HR3923 | 120 |
| 10:14:42.0 | −42.07′00″ | 3.9 | 0.05 | HR4023 | 31 |
| 10:18:06.0 | −28.60′00″ | 5.3 | 0.24 | HR4049 | 9999 |
| 10:17:06.0 | −61.20′00″ | 3.4 | 1.54 | HR4050 | 280 |
| 10:24:06.0 | +65.34′00″ | 5.0 | −0.06 | HR4072 | 11 |
| 10:20:54.0 | −56.03′00″ | 4.5 | −0.12 | HR4074 | 210 |
| 10:22:18.0 | −41.39′00″ | 4.8 | 1.12 | HR4080 | 88 |
| 10:31:06.0 | +82.34′00″ | 5.3 | 0.37 | HR4084 | 43 |
| 10:23:30.0 | −38.01′00″ | 5.3 | 0.25 | HR4086 | 19 |
| 10:24:24.0 | −74.02′00″ | 4.0 | 0.35 | HR4102 | 17 |
| 10:27:54.0 | −58.44′00″ | 3.8 | 0.31 | HR4114 | 140 |
| 10:35:06.0 | +75.43′00″ | 4.8 | 0.96 | HR4126 | 85 |
| 10:32:54.0 | −47.00′00″ | 5.0 | 1.04 | HR4143 | 120 |
| 10:35:36.0 | −57.33′00″ | 4.5 | 1.62 | HR4159 | 92 |
| 10:37:18.0 | −48.14′00″ | 3.8 | 0.30 | HR4167 | 23 |
| 10:39:18.0 | −55.36′00″ | 4.3 | 1.04 | HR4180 | 150 |
| 10:43:06.0 | +69.05′00″ | 5.0 | 1.38 | HR4181 | 96 |
| 10:43:30.0 | +46.12′00″ | 5.2 | 0.33 | HR4191 | 22 |
| 10:43:30.0 | −60.34′00″ | 4.6 | 1.71 | HR4200 | 75 |

407-001

407-001

| | | | | |
|---|---|---|---|---|
| 10:53:30.0 | −58.51′00″ | 3.8 | 0.95 | HR4257 | 26
| 11:00:12.0 | −42.14′00″ | 4.4 | 0.61 | HR4293 | 52
| 11:08:36.0 | −58.58′00″ | 3.9 | 1.23 | HR4337 | 1400
| 11:12:30.0 | −49.06′00″ | 5.4 | 0.18 | HR4350 | 9999
| 11:35:54.0 | −47.38′00″ | 5.3 | 0.25 | HR4466 | 17
| 11:43:30.0 | −62.29′00″ | 5.0 | 0.80 | HR4511 | 4100
| 11:46:30.0 | −61.11′00″ | 4.1 | 0.90 | HR4522 | 140
| 11:48:48.0 | −26.45′00″ | 5.1 | 1.60 | HR4532 | 130
| 11:49:42.0 | −63.47′00″ | 4.3 | −0.15 | HR4537 | 120
| 11:51:06.0 | −45.10′00″ | 4.5 | 1.30 | HR4546 | 90
| 12:03:42.0 | −42.26′00″ | 5.2 | 0.41 | HR4600 | 23
| 12:08:06.0 | −50.40′00″ | 4.5 | −0.15 | HR4618 | 160
| 12:12:12.0 | +77.37′00″ | 5.1 | 0.33 | HR4646 | 40
| 12:28:24.0 | −39.02′00″ | 5.4 | −0.08 | HR4748 | 9999
| 12:33:36.0 | +33.15′00″ | 5.4 | 1.00 | HR4783 | 110
| 12:44:00.0 | −28.19′00″ | 5.5 | 1.34 | HR4839 | 140
| 12:50:42.0 | −33.60′00″ | 4.9 | −0.04 | HR4874 | 96
| 12:53:06.0 | −48.57′00″ | 4.3 | 1.37 | HR4888 | 54
| 12:53:24.0 | −40.11′00″ | 4.3 | 0.21 | HR4889 | 57
| 1:42:06.0 | +35.15′00″ | 5.4 | −0.09 | HR490 | 85
| 13:13:42.0 | +40.09′00″ | 4.9 | 1.06 | HR4997 | 79
| 1:42:42.0 | −03.41′00″ | 5.0 | 1.38 | HR500 | 170
| 13:16:54.0 | −31.30′00″ | 5.1 | 0.96 | HR5006 | 110
| 13:22:36.0 | −60.59′00″ | 4.5 | −0.13 | HR5035 | 130
| 13:28:30.0 | +59.57′00″ | 5.4 | −0.01 | HR5085 | 21
| 13:31:00.0 | −39.24′00″ | 3.9 | 1.17 | HR5089 | 36
| 13:34:48.0 | +37.11′00″ | 5.0 | 0.40 | HR5110 | 39

−93−

| | | | | |
|---|---|---|---|---|
| 1:46:00.0 | −05.44′00″ | 5.3 | 1.52 | HR513 | 110 |
| 13:57:36.0 | −63.41′00″ | 4.7 | 1.11 | HR5241 | 100 |
| 14:07:54.0 | +43.51′00″ | 5.3 | 1.59 | HR5299 | 18 |
| 14:20:18.0 | −56.23′00″ | 4.3 | 0.12 | HR5358 | 310 |
| 14:18:00.0 | +35.31′00″ | 4.8 | 1.06 | HR5361 | 92 |
| 14:23:00.0 | −39.31′00″ | 4.4 | −0.18 | HR5378 | 180 |
| 14:24:48.0 | −24.48′00″ | 5.3 | 0.96 | HR5390 | 100 |
| 14:24:12.0 | +05.49′00″ | 5.1 | 0.12 | HR5392 | 15 |
| 14:42:00.0 | −37.48′00″ | 4.0 | −0.17 | HR5471 | 140 |
| 14:43:42.0 | −35.10′00″ | 4.1 | 1.35 | HR5485 | 71 |
| 14:47:00.0 | −52.23′00″ | 5.2 | 0.98 | HR5495 | 88 |
| 14:51:24.0 | +59.18′00″ | 5.5 | 1.36 | HR5552 | 92 |
| 14:55:42.0 | −33.51′00″ | 5.3 | 0.00 | HR5558 | 87 |
| 14:57:36.0 | +65.56′00″ | 4.6 | 1.59 | HR5589 | 30 |
| 15:06:18.0 | +54.33′00″ | 5.3 | 0.96 | HR5635 | 98 |
| 15:14:36.0 | +67.21′00″ | 5.1 | 0.53 | HR5691 | 19 |
| 15:36:12.0 | −44.24′00″ | 5.4 | 1.50 | HR5784 | 150 |
| 15:38:48.0 | −52.22′00″ | 5.4 | 0.00 | HR5798 | 110 |
| 15:59:30.0 | −41.45′00″ | 5.0 | 1.00 | HR5943 | 81 |
| 15:57:48.0 | +54.45′00″ | 5.0 | 0.26 | HR5960 | 45 |
| 16:31:24.0 | −34.42′00″ | 4.2 | −0.16 | HR6143 | 220 |
| 16:36:24.0 | −35.15′00″ | 4.2 | 1.17 | HR6166 | 17 |
| 16:41:36.0 | −17.45′00″ | 5.0 | 1.11 | HR6196 | 240 |
| 16:45:18.0 | +56.47′00″ | 4.9 | 0.38 | HR6237 | 24 |
| 2:13:36.0 | +51.04′00″ | 5.3 | 0.93 | HR645 | 51 |
| 17:20:18.0 | +18.03′00″ | 5.0 | 1.62 | HR6452 | 120 |
| 17:26:36.0 | −05.05′00″ | 4.5 | 0.39 | HR6493 | 21 |

| | | | | |
|---|---|---|---|---|
| 17:36:30.0 | −38.38′00″ | 4.3 | 1.09 | HR6546 | 58 |
| 17:49:54.0 | −37.03′00″ | 3.2 | 1.17 | HR6630 | 46 |
| 18:07:30.0 | +43.28′00″ | 5.0 | 0.91 | HR6791 | 25 |
| 18:17:06.0 | −56.01′00″ | 5.3 | −0.05 | HR6819 | 230 |
| 18:36:30.0 | +09.07′00″ | 5.4 | 0.37 | HR6985 | 30 |
| 18:46:06.0 | +26.40′00″ | 4.8 | 1.20 | HR7064 | 100 |
| 2:38:00.0 | +72.49′00″ | 5.2 | 0.88 | HR743 | 94 |
| 19:40:48.0 | +45.31′00″ | 5.1 | 0.40 | HR7495 | 72 |
| 19:51:48.0 | −39.52′00″ | 5.3 | −0.06 | HR7552 | 17 |
| 20:15:18.0 | +25.36′00″ | 4.8 | −0.18 | HR7739 | 200 |
| 20:23:12.0 | +05.21′00″ | 5.3 | 0.97 | HR7794 | 46 |
| 20:45:18.0 | +57.35′00″ | 4.5 | 0.54 | HR7955 | 26 |
| 21:13:18.0 | −27.37′00″ | 5.4 | 1.42 | HR8110 | 82 |
| 22:13:54.0 | +39.43′00″ | 4.5 | 1.39 | HR8485 | 77 |
| 22:13:12.0 | +86.06′00″ | 5.3 | −0.03 | HR8546 | 19 |
| 22:51:00.0 | −39.09′00″ | 5.4 | 1.43 | HR8685 | 150 |
| 22:56:24.0 | +49.44′00″ | 5.0 | 1.78 | HR8726 | 320 |
| 22:54:24.0 | +84.21′00″ | 4.7 | 1.43 | HR8748 | 99 |
| 2:56:36.0 | −03.43′00″ | 5.2 | 0.08 | HR875 | 58 |
| 23:00:06.0 | +56.57′00″ | 5.0 | 1.42 | HR8752 | 1700 |
| 3:06:06.0 | +79.25′00″ | 5.5 | 1.57 | HR881 | 160 |
| 23:37:48.0 | −45.30′00″ | 4.7 | 0.08 | HR8959 | 45 |
| 23:47:54.0 | +67.48′00″ | 5.0 | −0.01 | HR9013 | 26 |
| 3:20:18.0 | +77.44′00″ | 5.5 | 0.19 | HR961 | 30 |
| 3:20:18.0 | +29.03′00″ | 4.5 | 1.55 | HR999 | 81 |
| 0:08:24.0 | +29.05′00″ | 2.1 | −0.11 | ALPHA AND | 22 ANDROMEDA |
| 1:09:42.0 | +35.37′00″ | 2.1 | 1.58 | BETA AND | 27 ANDROMEDA |

| | | | | | | |
|---|---|---|---|---|---|---|
| 0:39:18.0 | +30.52'00" | 3.3 | 1.28 | DELTA | AND 49 | ANDROMEDA |
| 0:38:36.0 | +29.19'00" | 4.4 | 0.87 | EPSILON | AND 41 | ANDROMEDA |
| 0:57:12.0 | +23.25'00" | 4.4 | 0.94 | ETA | AND 35 | ANDROMEDA |
| 2:03:54.0 | +42.20'00" | 2.3 | 1.37 | GA1 | AND 37 | ANDROMEDA |
| 23:38:06.0 | +43.16'00" | 4.3 | -0.10 | IOTA | AND 79 | ANDROMEDA |
| 23:40:24.0 | +44.20'00" | 4.1 | -0.08 | KAPPA | AND 60 | ANDROMEDA |
| 23:37:36.0 | +46.27'00" | 3.8 | 1.01 | LAMBDA | AND 24 | ANDROMEDA |
| 0:56:48.0 | +38.30'00" | 3.9 | 0.13 | MU | AND 25 | ANDROMEDA |
| 0:49:48.0 | +41.05'00" | 4.5 | -0.15 | NU | AND 130 | ANDROMEDA |
| 1:27:42.0 | +45.24'00" | 4.8 | 0.42 | OMEGA | AND 36 | ANDROMEDA |
| 23:01:54.0 | +42.20'00" | 3.6 | -0.09 | OMICRON | AND 35 | ANDROMEDA |
| 23:46:00.0 | +46.25'00" | 5.0 | 1.11 | PSI | AND 740 | ANDROMEDA |
| 1:09:30.0 | +47.15'00" | 4.3 | -0.07 | PHI | AND 120 | ANDROMEDA |
| 0:36:54.0 | +33.43'00" | 4.4 | -0.14 | PI | AND 120 | ANDROMEDA |
| 0:21:06.0 | +37.58'00" | 5.2 | 0.42 | RHO | AND 40 | ANDROMEDA |
| 0:24:00.0 | +38.35'00" | 5.7 | 1.97 | R | AND 9999 | ANDROMEDA |
| 0:18:18.0 | +36.47'00" | 4.5 | 0.05 | SIGMA | AND 42 | ANDROMEDA |
| 1:40:36.0 | +40.35'00" | 4.9 | -0.09 | TAU | AND 130 | ANDROMEDA |
| 0:17:06.0 | +38.41'00" | 4.6 | 0.06 | THETA | AND 44 | ANDROMEDA |
| 1:36:48.0 | +41.24'00" | 4.1 | 0.54 | UPSILON | AND 13 | ANDROMEDA |
| 1:22:18.0 | +45.32'00" | 4.9 | 1.08 | XI | AND 35 | ANDROMEDA |
| 0:47:18.0 | +24.16'00" | 4.1 | 1.12 | ZETA | AND 48 | ANDROMEDA |
| 0:10:18.0 | +46.04'00" | 5.0 | 0.40 | 22 | AND 240 | ANDROMEDA |
| 1:38:00.0 | +48.38'00" | 3.6 | 1.28 | 51 | AND 57 | ANDROMEDA |
| 2:19:18.0 | +47.23'00" | 5.3 | -0.01 | 62 | AND 26 | ANDROMEDA |
| 10:27:12.0 | -31.04'00" | 4.3 | 1.45 | ALPHA | ANT 85 | ANTLIA |
| 9:29:12.0 | -35.57'00" | 4.5 | 1.44 | EPSILON | ANT 96 | ANTLIA |

407-001

| | | | | | | |
|---|---|---|---|---|---|---|
| 9:58:54.0 | -35.53'00" | 5.2 | 0.31 | ETA | ANT 33 | ANTLIA |
| 10:56:42.0 | -37.08'00" | 4.6 | 1.03 | IOTA | ANT 56 | ANTLIA |
| 9:44:12.0 | -27.46'00" | 4.8 | 0.51 | THETA | ANT 14 | ANTLIA |
| 14:47:54.0 | -79.03'00" | 3.8 | 1.43 | ALPHA | APS 67 | APUS |
| 16:43:06.0 | -77.31'00" | 4.2 | 1.06 | BETA | APS 42 | APUS |
| 16:20:18.0 | -78.42'00" | 4.7 | 1.69 | DE1 | APS 110 | APUS |
| 14:22:24.0 | -80.07'00" | 5.1 | -0.10 | EPSILON | APS 240 | APUS |
| 14:18:12.0 | -81.00'00" | 4.9 | 0.11 | ETA | APS 9999 | APUS |
| 16:33:30.0 | -78.54'00" | 3.9 | 0.91 | GAMMA | APS 14 | APUS |
| 17:22:06.0 | -70.07'00" | 5.4 | -0.04 | IOTA | APS 9999 | APUS |
| 15:31:30.0 | -73.23'00" | 5.5 | -0.12 | KA1 | APS 350 | APUS |
| 14:05:18.0 | -76.48'00" | 5.5 | 1.80 | THETA | APS 200 | APUS |
| 22:05:48.0 | -00.19'00" | 3.0 | 0.98 | ALPHA | AQR 290 | AQUARIUS |
| 21:31:36.0 | -05.34'00" | 2.9 | 0.83 | BETA | AQR 300 | AQUARIUS |
| 22:54:36.0 | -15.49'00" | 3.3 | 0.05 | DELTA | AQR 30 | AQUARIUS |
| 20:47:42.0 | -09.30'00" | 3.8 | 0.00 | EPSILON | AQR 33 | AQUARIUS |
| 22:35:24.0 | -00.07'00" | 4.0 | -0.09 | ETA | AQR 46 | AQUARIUS |
| 22:21:42.0 | -01.23'00" | 3.8 | -0.05 | GAMMA | AQR 28 | AQUARIUS |
| 22:06:24.0 | -13.52'00" | 4.3 | -0.07 | IOTA | AQR 78 | AQUARIUS |
| 22:37:48.0 | -04.14'00" | 5.0 | 1.14 | KAPPA | AQR 110 | AQUARIUS |
| 22:52:36.0 | -07.35'00" | 3.7 | 1.64 | LAMBDA | AQR 71 | AQUARIUS |
| 20:52:42.0 | -08.59'00" | 4.7 | 0.32 | MU | AQR 30 | AQUARIUS |
| 21:09:36.0 | -11.22'00" | 4.5 | 0.94 | NU | AQR 70 | AQUARIUS |
| 23:39:48.0 | -14.13'00" | 5.0 | 0.24 | OE1 | AQR 18 | AQUARIUS |
| 23:42:42.0 | -14.33'00" | 4.5 | -0.04 | OE2 | AQR 43 | AQUARIUS |
| 22:03:18.0 | -02.09'00" | 4.7 | -0.06 | OMICRON | AQR 95 | AQUARIUS |
| 23:14:18.0 | -06.03'00" | 4.2 | 1.56 | PHI | AQR 75 | AQUARIUS |

| | | | | | |
|---|---|---|---|---|---|
| 22:25:18.0 | +01.23'00" | 4.7 | −0.03 | PI | AQR | 450 | AQUARIUS |
| 23:15:54.0 | −09.05'00" | 4.2 | 1.11 | PS1 | AQR | 30 | AQUARIUS |
| 23:17:54.0 | −09.11'00" | 4.4 | −0.15 | PS2 | AQR | 130 | AQUARIUS |
| 23:19:00.0 | −09.37'00" | 5.0 | −0.02 | PS3 | AQR | 75 | AQUARIUS |
| 22:30:36.0 | −10.41'00" | 4.8 | −0.06 | SIGMA | AQR | 92 | AQUARIUS |
| 22:47:42.0 | −14.03'00" | 5.7 | −0.05 | TA1 | AQR | 9999 | AQUARIUS@ |
| 22:49:36.0 | −13.36'00" | 4.0 | 1.57 | TA2 | AQR | 74 | AQUARIUS@ |
| 22:16:48.0 | −07.47'00" | 4.2 | 0.98 | THETA | AQR | 26 | AQUARIUS |
| 22:34:42.0 | −20.43'00" | 5.2 | 0.44 | UPSILON | AQR | 25 | AQUARIUS |
| 21:37:48.0 | −07.51'00" | 4.7 | 0.17 | XI | AQR | 36 | AQUARIUS |
| 22:28:48.0 | −00.01'00" | 3.7 | 0.40 | ZETA | AQR | 30 | AQUARIUS |
| 23:33:18.0 | −20.55'00" | 4.7 | 0.02 | 101 | AQR | 25 | AQUARIUS |
| 23:41:36.0 | −18.02'00" | 5.3 | 1.57 | 103 | AQR | 39 | AQUARIUS |
| 23:41:48.0 | −17.49'00" | 4.8 | 0.82 | 104 | AQR | 220 | AQUARIUS |
| 23:44:12.0 | −18.17'00" | 5.2 | −0.08 | 106 | AQR | 120 | AQUARIUS |
| 23:46:00.0 | −18.41'00" | 5.3 | 0.28 | 107 | AQR | 43 | AQUARIUS |
| 23:51:24.0 | −18.55'00" | 5.2 | −0.14 | 108 | AQR | 16 | AQUARIUS |
| 21:24:12.0 | −12.53'00" | 5.5 | 0.29 | 18 | AQR | 95 | AQUARIUS |
| 20:47:42.0 | −05.02'00" | 4.4 | 1.65 | 3 | AQR | 91 | AQUARIUS |
| 22:21:36.0 | −21.36'00" | 5.1 | 1.07 | 47 | AQR | 110 | AQUARIUS |
| 22:47:30.0 | −19.37'00" | 5.3 | 0.94 | 68 | AQR | 73 | AQUARIUS |
| 23:06:42.0 | −23.45'00" | 4.5 | 0.90 | 86 | AQR | 71 | AQUARIUS |
| 23:09:24.0 | −21.10'00" | 3.7 | 1.22 | 88 | AQR | 33 | AQUARIUS |
| 23:09:54.0 | −22.27'00" | 4.7 | 0.65 | 89 | AQR | 13 | AQUARIUS |
| 23:23:00.0 | −20.06'00" | 4.0 | 1.10 | 98 | AQR | 49 | AQUARIUS |
| 23:26:00.0 | −20.39'00" | 4.4 | 1.48 | 99 | AQR | 87 | AQUARIUS |
| 19:50:48.0 | +08.52'00" | 0.8 | 0.22 | ALPHA | AQL | 5 | AQUILA |

407-001

| | | | | | |
|---|---|---|---|---|---|
| 19:55:18.0 | +06.24'00" | 3.7 | 0.86 | BETA | AQL 11 | AQUILA |
| 19:25:30.0 | +03.07'00" | 3.4 | 0.32 | DELTA | AQL 16 | AQUILA |
| 18:59:36.0 | +15.04'00" | 4.0 | 1.08 | EPSILON | AQL 65 | AQUILA |
| 19:52:30.0 | +01.00'00" | 3.9 | 0.89 | ETA | AQL 440 | AQUILA |
| 19:46:18.0 | +10.37'00" | 2.7 | 1.52 | GAMMA | AQL 87 | AQUILA |
| 19:36:42.0 | -01.17'00" | 4.4 | -0.08 | IOTA | AQL 180 | AQUILA |
| 19:36:54.0 | -07.02'00" | 5.0 | 0.00 | KAPPA | AQL 9999 | AQUILA |
| 19:06:12.0 | -04.53'00" | 3.4 | -0.09 | LAMBDA | AQL 30 | AQUILA |
| 19:34:06.0 | +07.23'00" | 4.5 | 1.17 | MU | AQL 39 | AQUILA |
| 19:17:48.0 | +11.36'00" | 5.3 | 0.20 | OMEGA | AQL 23 | AQUILA |
| 20:14:18.0 | +15.12'00" | 5.0 | 0.08 | RHO | AQL 51 | AQUILA |
| 20:11:18.0 | -00.49'00" | 3.2 | -0.07 | THETA | AQL 61 | AQUILA |
| 19:05:24.0 | +13.52'00" | 3.0 | 0.01 | ZETA | AQL 32 | AQUILA |
| 19:01:42.0 | -05.44'00" | 4.0 | 1.09 | 12 | AQL 64 | AQUILA |
| 19:12:42.0 | -07.56'00" | 5.3 | 0.13 | 20 | AQL 220 | AQUILA |
| 19:25:00.0 | +11.57'00" | 5.2 | 0.77 | 31 | AQL 18 | AQUILA |
| 19:30:42.0 | -02.47'00" | 5.0 | 1.75 | 36 | AQL 100 | AQUILA |
| 20:29:36.0 | -02.53'00" | 4.9 | 1.15 | 69 | AQL 100 | AQUILA |
| 20:38:18.0 | -01.06'00" | 4.3 | 0.95 | 71 | AQL 64 | AQUILA |
| 17:31:48.0 | -49.53'00" | 3.0 | -0.17 | ALPHA | ARA 58 | ARA |
| 17:25:18.0 | -55.32'00" | 2.9 | 1.46 | BETA | ARA 240 | ARA |
| 17:31:06.0 | -60.41'00" | 3.6 | -0.10 | DELTA | ARA 29 | ARA |
| 16:59:36.0 | -53.10'00" | 4.1 | 1.45 | EP1 | ARA 82 | ARA |
| 16:49:48.0 | -59.02'00" | 3.8 | 1.57 | ETA | ARA 58 | ARA |
| 17:25:24.0 | -56.23'00" | 3.3 | -0.13 | GAMMA | ARA 330 | ARA |
| 17:40:24.0 | -49.25'00" | 4.8 | 0.40 | LAMBDA | ARA 19 | ARA |
| 17:44:06.0 | -51.50'00" | 5.2 | 0.70 | MU | ARA 12 | ARA |

| | | | | |
|---|---|---|---|---|
| 17:35:42.0 | −46.30′00″ | 4.6 | −0.03 | SIGMA ARA |
| 18:06:36.0 | −50.06′00″ | 3.7 | −0.08 | THETA ARA 47 |
| 16:58:36.0 | −55.59′00″ | 3.1 | 1.60 | ZETA ARA 480 |
| 2:07:12.0 | +23.28′00″ | 2.0 | 1.15 | ALPHA ARA 42 |
| 1:54:36.0 | +20.48′00″ | 2.6 | 0.13 | BETA ARIES 26 |
| 3:11:36.0 | +19.44′00″ | 4.4 | 1.03 | DELTA ARI 14 |
| 2:59:12.0 | +21.20′00″ | 4.6 | 0.04 | EPSILON ARI 78 |
| 1:53:30.0 | +19.18′00″ | 4.1 | −0.04 | GAMMA ARI 48 |
| 2:38:48.0 | +21.58′00″ | 5.3 | 0.16 | NU ARI 36 |
| 2:51:30.0 | +15.05′00″ | 5.5 | −0.09 | SIGMA ARI 38 |
| 3:21:12.0 | +21.09′00″ | 5.3 | −0.07 | TAU ARI 170 |
| 3:14:54.0 | +21.03′00″ | 4.9 | −0.01 | ZETA ARI 190 |
| 2:43:24.0 | +27.42′00″ | 4.7 | −0.13 | 35 ARI 91 |
| 2:47:54.0 | +29.15′00″ | 4.5 | 1.11 | 39 ARI 180 |
| 2:50:00.0 | +27.16′00″ | 3.6 | −0.10 | 41 ARI 58 |
| 5:16:42.0 | +45.60′00″ | 0.1 | 0.80 | ALPHA ARI 36 |
| 5:59:30.0 | +44.57′00″ | 1.9 | 0.03 | BETA AUR 13 |
| 5:32:42.0 | +32.12′00″ | 4.8 | 0.34 | CHI AUR 22 |
| 5:59:30.0 | +54.17′00″ | 3.7 | 1.00 | DELTA AUR 930 |
| 5:02:00.0 | +43.49′00″ | 3.0 | 0.54 | EPSILON AUR 50 |
| 5:06:30.0 | +41.14′00″ | 3.2 | −0.18 | ETA AUR 1400 |
| 4:57:00.0 | +33.10′00″ | 2.7 | 1.53 | IOTA AUR 61 |
| 6:15:24.0 | +29.30′00″ | 4.4 | 1.02 | KAPPA AUR 82 |
| 5:19:06.0 | +40.06′00″ | 4.7 | 0.63 | LAMBDA AUR 46 |
| 5:13:24.0 | +38.29′00″ | 4.9 | 0.18 | MU AUR 13 |
| 5:51:30.0 | +39.09′00″ | 4.0 | 1.13 | NU AUR 22 |
| 5:45:54.0 | +49.50′00″ | 5.5 | 0.03 | OMICRON AUR 45 |
| | | | | AURIGA 20 |

407-001

−100−

| RA | Dec | Mag | Val | Name | Abbr | Num | Constellation |
|---|---|---|---|---|---|---|---|
| 6:24:54.0 | +49.17'00" | 4.9 | 1.97 | PH1 | AUR | 600 | AURIGA@ |
| 6:46:42.0 | +43.35'00" | 5.3 | 0.56 | PH5 | AUR | 15 | AURIGA@ |
| 6:47:42.0 | +48.47'00" | 5.2 | 1.12 | PH6 | AUR | 110 | AURIGA@ |
| 5:59:54.0 | +45.56'00" | 4.3 | 1.72 | PI | AUR | 200 | AURIGA |
| 5:49:12.0 | +39.11'00" | 4.5 | 0.94 | TAU | AUR | 70 | AURIGA |
| 5:59:42.0 | +37.13'00" | 2.6 | -0.08 | THETA | AUR | 25 | AURIGA |
| 5:54:48.0 | +55.42'00" | 5.0 | 0.05 | XI | AUR | 26 | AURIGA |
| 5:02:30.0 | +41.05'00" | 3.8 | 1.22 | ZETA | AUR | 160 | AURIGA |
| 7:11:42.0 | +39.19'00" | 4.9 | 1.45 | 63 | AUR | 170 | AURIGA |
| 7:24:06.0 | +40.40'00" | 5.2 | 1.23 | 66 | AUR | 66 | AURIGA |
| 14:10:24.0 | +25.06'00" | 4.8 | 0.54 | d | BOO | 29 | BOOTES |
| 14:15:42.0 | +19.11'00" | 0.0 | 1.23 | ALPHA | BOO | 11 | BOOTES |
| 15:01:54.0 | +40.23'00" | 3.5 | 0.97 | BETA | BOO | 42 | BOOTES |
| 15:15:30.0 | +33.19'00" | 3.5 | 0.95 | DELTA | BOO | 43 | BOOTES |
| 14:45:00.0 | +27.04'00" | 2.4 | 0.96 | EPSILON | BOO | 46 | BOOTES |
| 13:54:42.0 | +18.24'00" | 2.7 | 0.58 | ETA | BOO | 10 | BOOTES |
| 14:32:06.0 | +38.18'00" | 3.0 | 0.19 | GAMMA | BOO | 32 | BOOTES |
| 14:16:12.0 | +51.22'00" | 4.8 | 0.20 | IOTA | BOO | 28 | BOOTES |
| 14:13:30.0 | +51.47'00" | 4.4 | 0.23 | KAPPA | BOO | 110 | BOOTES |
| 14:16:24.0 | +46.05'00" | 4.2 | 0.08 | LAMBDA | BOO | 29 | BOOTES |
| 15:24:30.0 | +37.23'00" | 4.3 | 0.31 | MU1 | BOO | 18 | BOOTES |
| 15:30:54.0 | +40.50'00" | 5.0 | 1.59 | NU1 | BOO | 100 | BOOTES |
| 14:45:12.0 | +16.58'00" | 4.6 | 0.98 | OMICRON | BOO | 29 | BOOTES |
| 15:37:48.0 | +40.21'00" | 5.2 | 0.88 | PHI | BOO | 26 | BOOTES |
| 14:40:42.0 | +16.25'00" | 4.5 | -0.03 | PI | BOO | 40 | BOOTES@ |
| 15:04:24.0 | +26.57'00" | 4.5 | 1.24 | PSI | BOO | 75 | BOOTES |
| 14:31:48.0 | +30.22'00" | 3.6 | 1.30 | RHO | BOO | 56 | BOOTES |

407-001

| | | | | | |
|---|---|---|---|---|---|
| 14:34:42.0 | +29.45'00" | 4.5 | 0.36 | SIGMA | BOO | 17 | BOOTES |
| 13:47:18.0 | +17.27'00" | 4.5 | 0.48 | TAU | BOO | 16 | BOOTES |
| 14:25:12.0 | +51.51'00" | 4.1 | 0.50 | THETA | BOO | 13 | BOOTES |
| 13:49:30.0 | +15.48'00" | 4.1 | 1.52 | UPSILON | BOO | 72 | BOOTES |
| 14:51:24.0 | +19.06'00" | 4.6 | 0.76 | XI | BOO | 7 | BOOTES |
| 14:41:06.0 | +13.44'00" | 3.8 | 0.05 | ZETA | BOO | 63 | BOOTES |
| 14:19:18.0 | +13.00'00" | 5.4 | 0.38 | 18 | BOO | 46 | BOOTES |
| 14:26:30.0 | +19.14'00" | 5.4 | 0.23 | 22 | BOO | 40 | BOOTES |
| 14:38:48.0 | +44.24'00" | 5.4 | 0.00 | 33 | BOO | 25 | BOOTES |
| 14:43:24.0 | +26.32'00" | 4.8 | 1.66 | 34 | BOO | 30 | BOOTES |
| 15:07:18.0 | +24.52'00" | 4.9 | 0.43 | 45 | BOO | 19 | BOOTES |
| 4:40:36.0 | -41.52'00" | 4.5 | 0.34 | ALPHA | CAE | 20 | CAELUM |
| 4:42:06.0 | -37.09'00" | 5.1 | 0.37 | BETA | CAE | 17 | CAELUM |
| 4:30:48.0 | -44.57'00" | 5.1 | -0.19 | DELTA | CAE | 230 | CAELUM |
| 5:04:24.0 | -35.29'00" | 4.6 | 1.20 | GA1 | CAE | 52 | CAELUM@ |
| 5:04:24.0 | -35.42'00" | 6.3 | 0.30 | GA2 | CAE | 9999 | CAELUM@ |
| 4:54:00.0 | +66.21'00" | 4.3 | 0.03 | ALPHA | CAM | 860 | CAMELOPARDALIS |
| 5:03:24.0 | +60.27'00" | 4.0 | 0.92 | BETA | CAM | 460 | CAMELOPARDALIS |
| 3:50:24.0 | +71.20'00" | 4.6 | 0.03 | GAMMA | CAM | 56 | CAMELOPARDALIS |
| 4:32:00.0 | +53.55'00" | 5.8 | 0.18 | 1 | CAM | 890 | CAMELOPARDALIS |
| 6:12:48.0 | +65.43'00" | 5.3 | 1.34 | 36 | CAM | 170 | CAMELOPARDALIS |
| 4:48:00.0 | +56.45'00" | 5.3 | 0.25 | 4 | CAM | 24 | CAMELOPARDALIS |
| 6:53:42.0 | +68.53'00" | 5.1 | -0.13 | 43 | CAM | 170 | CAMELOPARDALIS |
| 4:57:18.0 | +53.45'00" | 4.5 | -0.02 | 7 | CAM | 45 | CAMELOPARDALIS |
| 20:17:36.0 | -12.30'00" | 4.2 | 1.07 | AL1 | CAP | 490 | CAPRICORNUS |
| 20:18:06.0 | -12.33'00" | 3.6 | 0.94 | AL2 | CAP | 36 | CAPRICORNUS |
| 20:21:00.0 | -14.47'00" | 3.1 | 0.79 | BETA | CAP | 32 | CAPRICORNUS |

| | | | | | | |
|---|---|---|---|---|---|---|
| 21:47:00.0 | -16.08'00" | 2.9 | 0.29 | DELTA | CAP | 15 | CAPRICORNUS |
| 21:37:06.0 | -19.28'00" | 4.7 | -0.17 | EPSILON | CAP | 250 | CAPRICORNUS |
| 21:04:24.0 | -19.51'00" | 4.8 | 0.17 | ETA | CAP | 12 | CAPRICORNUS |
| 21:40:06.0 | -16.40'00" | 3.7 | 0.32 | GAMMA | CAP | 18 | CAPRICORNUS |
| 21:22:12.0 | -16.50'00" | 4.3 | 0.90 | IOTA | CAP | 63 | CAPRICORNUS |
| 21:42:42.0 | -18.52'00" | 4.7 | 0.88 | KAPPA | CAP | 77 | CAPRICORNUS |
| 21:53:18.0 | -13.33'00" | 5.1 | 0.37 | MU | CAP | 30 | CAPRICORNUS |
| 20:51:48.0 | -26.55'00" | 4.1 | 1.64 | OMEGA | CAP | 64 | CAPRICORNUS |
| 20:27:18.0 | -18.13'00" | 5.3 | -0.07 | PI | CAP | 9999 | CAPRICORNUS |
| 20:46:06.0 | -25.16'00" | 4.1 | 0.43 | PSI | CAP | 12 | CAPRICORNUS |
| 20:28:54.0 | -17.49'00" | 4.8 | 0.38 | RHO | CAP | 32 | CAPRICORNUS |
| 21:05:54.0 | -17.14'00" | 4.1 | -0.01 | THETA | CAP | 49 | CAPRICORNUS |
| 20:40:00.0 | -18.08'00" | 5.1 | 1.66 | UPSILON | CAP | 120 | CAPRICORNUS |
| 21:26:42.0 | -22.25'00" | 3.7 | 1.00 | ZETA | CAP | 450 | CAPRICORNUS |
| 21:07:06.0 | -25.00'00" | 4.5 | 1.61 | 24 | CAP | 95 | CAPRICORNUS |
| 21:28:42.0 | -21.48'00" | 4.5 | 0.91 | 36 | CAP | 67 | CAPRICORNUS |
| 9:11:00.0 | -58.58'00" | 3.4 | -0.19 | a | CAR | 190 | CARINA |
| 9:45:12.0 | -62.30'00" | 3.7 | 1.22 | l | CAR | 16 | CARINAΘ |
| 10:32:00.0 | -61.41'00" | 3.3 | -0.09 | p | CAR | 96 | CARINA |
| 6:24:00.0 | -52.42'00" | -0.7 | 0.15 | ALPHA | CAR | 360 | CARINA |
| 9:13:12.0 | -69.43'00" | 1.7 | 0.00 | BETA | CAR | 26 | CARINA |
| 7:56:48.0 | -52.59'00" | 3.5 | -0.18 | CHI | CAR | 180 | CARINA |
| 8:22:30.0 | -59.31'00" | 1.9 | 1.28 | EPSILON | CAR | 62 | CARINA |
| 10:45:06.0 | -59.41'00" | 6.2 | 0.62 | ETA | CAR | 9999 | CARINA |
| 9:17:06.0 | -59.17'00" | 2.3 | 0.18 | IOTA | CAR | 250 | CARINA |
| 10:13:42.0 | -70.02'00" | 3.3 | -0.08 | OMEGA | CAR | 70 | CARINA |
| 10:27:24.0 | -57.38'00" | 4.7 | 0.51 | P | CAR | 3600 | CARINA |

| | | | | | | | |
|---|---|---|---|---|---|---|---|
| 9:32:12.0 | -62.47'00" | 4.0 | 2.20 | R | CAR | 520 | CARINA |
| 10:43:00.0 | -64.24'00" | 2.8 | -0.23 | THETA | CAR | 230 | CARINA |
| 9:47:06.0 | -65.04'00" | 3.0 | 0.27 | UPSILON | CAR | 99 | CARINA |
| 0:40:30.0 | +56.32'00" | 2.2 | 1.17 | ALPHA | CAS | 37 | CASSIOPEIA |
| 0:09:12.0 | +59.09'00" | 2.3 | 0.34 | BETA | CAS | 13 | CASSIOPEIA |
| 1:25:48.0 | +60.14'00" | 2.7 | 0.13 | DELTA | CAS | 19 | CASSIOPEIA |
| 1:54:24.0 | +63.40'00" | 3.4 | -0.15 | EPSILON | CAS | 160 | CASSIOPEIA |
| 0:49:06.0 | +57.49'00" | 3.4 | 0.57 | ETA | CAS | 6 | CASSIOPEIA |
| 0:56:42.0 | +60.43'00" | 2.5 | -0.15 | GAMMA | CAS | 240 | CASSIOPEIA |
| 2:29:06.0 | +67.24'00" | 4.5 | 0.12 | IOTA | CAS | 20 | CASSIOPEIA |
| 0:33:00.0 | +62.56'00" | 4.2 | 0.14 | KAPPA | CAS | 930 | CASSIOPEIA |
| 1:08:18.0 | +54.55'00" | 5.2 | 0.69 | MU | CAS | 8 | CASSIOPEIA |
| 0:44:42.0 | +48.17'00" | 4.5 | -0.07 | OMICRON | CAS | 210 | CASSIOPEIA |
| 1:20:06.0 | +58.14'00" | 5.0 | 0.68 | PHI | CAS | 2900 | CASSIOPEIA |
| 1:25:54.0 | +68.08'00" | 4.7 | 1.05 | PSI | CAS | 74 | CASSIOPEIA |
| 23:54:24.0 | +57.30'00" | 4.5 | 1.22 | RHO | CAS | 1500 | CASSIOPEIA |
| 1:11:06.0 | +55.09'00" | 4.3 | 0.17 | THETA | CAS | 37 | CASSIOPEIA |
| 0:37:00.0 | +53.54'00" | 3.7 | -0.20 | ZETA | CAS | 170 | CASSIOPEIA |
| 23:24:48.0 | +62.17'00" | 5.0 | 1.68 | 4 | CAS | 86 | CASSIOPEIA |
| 1:38:30.0 | +73.02'00" | 5.3 | 0.96 | 40 | CAS | 170 | CASSIOPEIA |
| 2:02:00.0 | +70.54'00" | 4.5 | 0.16 | 48 | CAS | 33 | CASSIOPEIA |
| 2:03:24.0 | +72.25'00" | 4.0 | -0.01 | 50 | CAS | 36 | CASSIOPEIA |
| 14:39:36.0 | -60.50'00" | 0.0 | 0.71 | ALPHA | CEN | 1 | CENTARIUS |
| 14:03:48.0 | -60.22'00" | 0.6 | -0.23 | BETA | CEN | 140 | CENTARIUS |
| 14:06:00.0 | -41.11'00" | 4.4 | -0.19 | CHI | CEN | 240 | CENTARIUS |
| 12:08:24.0 | -50.43'00" | 2.6 | -0.12 | DELTA | CEN | 100 | CENTARIUS |
| 13:39:54.0 | -53.28'00" | 2.3 | -0.22 | EPSILON | CEN | 150 | CENTARIUS |

| | | | | | |
|---|---|---|---|---|---|
| 14:35:30.0 | −42.09'00" | 2.3 | −0.19 | ETA | CEN | 110 | CENTARIUS |
| 12:41:30.0 | −48.58'00" | 2.2 | −0.01 | GAMMA | CEN | 34 | CENTARIUS |
| 13:20:36.0 | −36.43'00" | 2.8 | 0.04 | IOTA | CEN | 16 | CENTARIUS |
| 14:59:12.0 | −42.06'00" | 3.1 | −0.20 | KAPPA | CEN | 130 | CENTARIUS |
| 11:35:48.0 | −63.01'00" | 3.1 | −0.04 | LAMBDA | CEN | 57 | CENTARIUS |
| 13:49:36.0 | −42.28'00" | 3.0 | −0.17 | MU | CEN | 89 | CENTARIUS |
| 13:49:30.0 | −41.41'00" | 3.4 | −0.22 | NU | CEN | 150 | CENTARIUS |
| 13:58:18.0 | −42.06'00" | 3.8 | −0.21 | PHI | CEN | 190 | CENTARIUS |
| 11:21:00.0 | −54.29'00" | 3.9 | −0.15 | PI | CEN | 99 | CENTARIUS |
| 14:20:36.0 | −37.53'00" | 4.1 | −0.03 | PSI | CEN | 65 | CENTARIUS |
| 12:11:42.0 | −52.22'00" | 4.0 | −0.15 | RHO | CEN | 120 | CENTARIUS |
| 12:28:00.0 | −50.14'00" | 3.9 | −0.19 | SIGMA | CEN | 130 | CENTARIUS |
| 12:37:42.0 | −48.32'00" | 3.9 | 0.05 | TAU | CEN | 30 | CENTARIUS |
| 14:06:42.0 | −36.22'00" | 2.1 | 1.01 | THETA | CEN | 14 | CENTARIUS |
| 13:58:42.0 | −44.48'00" | 3.9 | −0.20 | UP1 | CEN | 170 | CENTARIUS |
| 14:01:42.0 | −45.36'00" | 4.3 | 0.60 | UP2 | CEN | 160 | CENTARIUS |
| 13:06:54.0 | −49.54'00" | 4.3 | −0.19 | XI2 | CEN | 280 | CENTARIUS |
| 13:55:30.0 | −47.17'00" | 2.6 | −0.22 | ZETA | CEN | 110 | CENTARIUS |
| 13:45:42.0 | −33.03'00" | 4.2 | 0.38 | 1 | CEN | 28 | CENTARIUS |
| 13:49:24.0 | −34.27'00" | 4.2 | 1.50 | 2 | CEN | 87 | CENTARIUS |
| 13:51:48.0 | −32.60'00" | 4.6 | −0.13 | 3 | CEN | 91 | CENTARIUS@ |
| 21:18:36.0 | +62.35'00" | 2.4 | 0.22 | ALPHA | CEP | 14 | CEPHEUS |
| 21:28:42.0 | +70.34'00" | 3.2 | −0.22 | BETA | CEP | 230 | CEPHEUS |
| 22:29:12.0 | +58.25'00" | 3.8 | 0.60 | DELTA | CEP | 410 | CEPHEUS |
| 22:15:00.0 | +57.03'00" | 4.2 | 0.28 | EPSILON | CEP | 30 | CEPHEUS |
| 20:45:18.0 | +61.50'00" | 3.4 | 0.92 | ETA | CEP | 14 | CEPHEUS |
| 23:39:18.0 | +77.38'00" | 3.2 | 1.03 | GAMMA | CEP | 16 | CEPHEUS |

| | | | | |
|---|---|---|---|---|
| 22:49:42.0 | +66.12'00" | 3.5 | 1.05 | IOTA | CEP | 39 | CEPHEUS |
| 20:08:54.0 | +77.43'00" | 4.4 | -0.05 | KAPPA | CEP | 100 | CEPHEUS |
| 22:11:30.0 | +59.25'00" | 5.0 | 0.25 | LAMBDA | CEP | 42 | CEPHEUS |
| 21:43:30.0 | +58.47'00" | 4.1 | 2.35 | MU | CEP | 480 | CEPHEUS |
| 21:45:24.0 | +61.07'00" | 4.3 | 0.52 | NU | CEP | 1200 | CEPHEUS |
| 23:07:54.0 | +75.23'00" | 4.4 | 0.80 | PI | CEP | 59 | CEPHEUS |
| 20:29:36.0 | +62.60'00" | 4.2 | 0.20 | THETA | CEP | 34 | CEPHEUS |
| 22:03:48.0 | +64.38'00" | 4.3 | 0.34 | XI | CEP | 37 | CEPHEUS |
| 22:10:54.0 | +58.12'00" | 3.4 | 1.57 | ZETA | CEP | 220 | CEPHEUS |
| 21:41:54.0 | +71.19'00" | 4.6 | 1.10 | 11 | CEP | 60 | CEPHEUS |
| 21:54:54.0 | +56.37'00" | 5.8 | 0.73 | 13 | CEP | 710 | CEPHEUS |
| 22:09:48.0 | +72.20'00" | 4.8 | 0.92 | 24 | CEP | 79 | CEPHEUS |
| 22:38:36.0 | +63.35'00" | 5.2 | 0.06 | 30 | CEP | 27 | CEPHEUS |
| 22:35:48.0 | +73.39'00" | 5.1 | 0.39 | 31 | CEP | 39 | CEPHEUS |
| 21:37:54.0 | +62.05'00" | 4.7 | 0.30 | 9 | CEP | 640 | CEPHEUS |
| 3:02:18.0 | +04.05'00" | 2.5 | 1.64 | ALPHA | CET | 40 | CETUS |
| 0:43:36.0 | -17.59'00" | 2.1 | 1.02 | BETA | CET | 21 | CETUS |
| 1:49:36.0 | -10.41'00" | 4.7 | 0.33 | CHI | CET | 30 | CETUS |
| 2:39:30.0 | +00.20'00" | 4.1 | -0.22 | DELTA | CET | 260 | CETUS |
| 1:08:36.0 | -10.11'00" | 3.5 | 1.16 | ETA | CET | 36 | CETUS |
| 2:43:18.0 | +03.14'00" | 3.5 | 0.09 | GAMMA | CET | 23 | CETUS |
| 0:19:24.0 | -08.49'00" | 3.6 | 1.22 | IOTA | CET | 50 | CETUS |
| 3:19:24.0 | +03.22'00" | 4.8 | 0.68 | KAPPA | CET | 9 | CETUS |
| 2:59:42.0 | +08.54'00" | 4.7 | -0.12 | LAMBDA | CET | 220 | CETUS |
| 2:44:54.0 | +10.07'00" | 4.3 | 0.31 | MU | CET | 30 | CETUS |
| 2:35:54.0 | +05.36'00" | 4.9 | 0.87 | NU | CET | 82 | CETUS |
| 2:19:18.0 | -02.59'00" | 2.0 | 1.42 | OMICRON | CET | 29 | CETUS |

| | | | | | | |
|---|---|---|---|---|---|---|
| 0:50:06.0 | -10.39'00" | 5.2 | 0.50 | PH2 | CET 17 | CETUS |
| 2:44:06.0 | -13.52'00" | 4.3 | -0.14 | PI | CET 93 | CETUS |
| 2:25:54.0 | -12.17'00" | 4.9 | -0.03 | RHO | CET 85 | CETUS |
| 2:32:06.0 | -15.15'00" | 4.8 | 0.45 | SIGMA | CET 33 | CETUS |
| 1:44:06.0 | -15.56'00" | 3.5 | 0.72 | TAU | CET 4 | CETUS |
| 1:24:00.0 | -08.11'00" | 3.6 | 1.06 | THETA | CET 35 | CETUS |
| 2:00:00.0 | -21.05'00" | 4.0 | 1.57 | UPSILON | CET 79 | CETUS |
| 2:13:00.0 | +08.51'00" | 4.4 | 0.89 | XI1 | CET 200 | CETUS |
| 2:28:12.0 | +08.28'00" | 4.3 | -0.06 | XI2 | CET 98 | CETUS |
| 1:51:30.0 | -10.20'00" | 3.7 | 1.14 | ZETA | CET 58 | CETUS |
| 0:03:42.0 | -17.20'00" | 4.6 | -0.05 | 2 | CET 91 | CETUS |
| 0:53:00.0 | -01.09'00" | 4.8 | 1.57 | 20 | CET 110 | CETUS |
| 1:29:36.0 | -21.38'00" | 5.1 | 0.02 | 48 | CET 61 | CETUS |
| 0:14:36.0 | -18.56'00" | 4.4 | 1.66 | 7 | CET 86 | CETUS |
| 3:12:48.0 | -01.12'00" | 5.1 | 0.57 | 94 | CET 18 | CETUS |
| 8:18:30.0 | -76.55'00" | 4.1 | 0.39 | ALPHA | CHA 24 | CHAMAELEON |
| 12:18:18.0 | -79.19'00" | 4.3 | -0.12 | BETA | CHA 110 | CHAMAELEON |
| 10:45:48.0 | -80.32'00" | 4.5 | -0.19 | DE2 | CHA 170 | CHAMAELEON |
| 10:35:30.0 | -78.36'00" | 4.1 | 1.58 | GAMMA | CHA 77 | CHAMAELEON |
| 8:20:36.0 | -77.29'00" | 4.4 | 1.16 | THETA | CHA 24 | CHAMAELEON |
| 14:42:30.0 | -64.59'00" | 3.2 | 0.24 | ALPHA | CIR 14 | CIRCINUS |
| 15:17:30.0 | -58.48'00" | 4.1 | 0.09 | BETA | CIR 22 | CIRCINUS |
| 15:23:24.0 | -59.19'00" | 4.5 | 0.19 | GAMMA | CIR 84 | CIRCINUS |
| 6:45:06.0 | -16.43'00" | -1.5 | 0.00 | ALPHA | CMA 3 | CANIS MAJOR |
| 6:22:42.0 | -17.57'00" | 2.0 | -0.23 | BETA | CMA 220 | CANIS MAJOR |
| 7:08:24.0 | -26.24'00" | 1.8 | 0.65 | DELTA | CMA 940 | CANIS MAJOR |
| 6:58:36.0 | -28.58'00" | 1.5 | -0.21 | EPSILON | CMA 150 | CANIS MAJOR |

| | | | | | |
|---|---|---|---|---|---|
| 7:24:06.0 | −29.18′00″ | 2.4 | −0.07 | ETA | CMA | 760 | CANIS MAJOR |
| 7:03:48.0 | −15.38′00″ | 4.1 | −0.12 | GAMMA | CMA | 320 | CANIS MAJOR |
| 6:56:06.0 | −17.03′00″ | 4.4 | −0.07 | IOTA | CMA | 410 | CANIS MAJOR |
| 6:49:48.0 | −32.31′00″ | 4.0 | −0.23 | KAPPA | CMA | 200 | CANIS MAJOR |
| 6:28:12.0 | −32.35′00″ | 4.5 | −0.17 | LAMBDA | CMA | 17 | CANIS MAJOR |
| 6:36:42.0 | −19.15′00″ | 4.0 | 1.06 | NU2 | CMA | 25 | CANIS MAJOR |
| 6:37:54.0 | −18.14′00″ | 4.4 | 1.15 | NU3 | CMA | 72 | CANIS MAJOR |
| 6:54:06.0 | −24.11′00″ | 3.9 | 1.73 | OI1 | CMA | 520 | CANIS MAJOR |
| 7:03:00.0 | −23.50′00″ | 3.0 | −0.09 | OI2 | CMA | 860 | CANIS MAJOR |
| 7:14:48.0 | −26.46′00″ | 3.9 | −0.17 | OMEGA | CMA | 170 | CANIS MAJOR |
| 6:55:36.0 | −20.08′00″ | 4.7 | 0.37 | PI | CMA | 65 | CANIS MAJOR |
| 7:01:42.0 | −27.56′00″ | 3.5 | 1.73 | SIGMA | CMA | 460 | CANIS MAJOR |
| 7:18:42.0 | −24.57′00″ | 4.4 | −0.15 | TAU | CMA | 1100 | CANIS MAJOR |
| 6:54:12.0 | −12.02′00″ | 4.1 | 1.43 | THETA | CMA | 73 | CANIS MAJOR |
| 6:31:54.0 | −23.25′00″ | 4.3 | −0.25 | XI1 | CMA | 440 | CANIS MAJOR |
| 6:35:06.0 | −22.58′00″ | 4.5 | −0.05 | XI2 | CMA | 61 | CANIS MAJOR |
| 6:20:18.0 | −30.04′00″ | 3.0 | −0.19 | ZETA | CMA | 88 | CANIS MAJOR |
| 6:53:30.0 | −20.13′00″ | 4.8 | −0.21 | 15 | CMA | 560 | CANIS MAJOR |
| 7:14:18.0 | −26.21′00″ | 4.7 | −0.19 | 27 | CMA | 320 | CANIS MAJOR |
| 7:39:18.0 | +05.13′00″ | 0.4 | 0.42 | ALPHA | CMI | 4 | CANIS MINOR |
| 7:27:06.0 | +08.17′00″ | 2.9 | −0.09 | BETA | CMI | 42 | CANIS MINOR |
| 7:25:36.0 | +09.17′00″ | 5.0 | 1.01 | EPSILON | CMI | 78 | CANIS MINOR |
| 7:28:12.0 | +08.56′00″ | 4.3 | 1.43 | GAMMA | CMI | 65 | CANIS MINOR |
| 7:51:42.0 | +01.46′00″ | 5.1 | −0.12 | ZETA | CMI | 25 | CANIS MINOR |
| 7:46:18.0 | +10.46′00″ | 5.3 | 0.01 | 11 | CMI | 66 | CANIS MINOR |
| 7:29:48.0 | +12.00′00″ | 4.5 | 1.28 | 6 | CMI | 70 | CANIS MINOR |
| 8:58:30.0 | +11.51′00″ | 4.3 | 0.14 | ALPHA | CNC | 23 | CANCER |

| | | | | | | | |
|---|---|---|---|---|---|---|---|
| 8:16:30.0 | +09.11'00" | 3.5 | 1.48 | BETA | CNC | 52 | CANCER |
| 8:20:06.0 | +27.13'00" | 5.1 | 0.47 | CHI | CNC | 17 | CANCER |
| 8:44:42.0 | +18.09'00" | 3.9 | 1.08 | DELTA | CNC | 47 | CANCER |
| 8:32:42.0 | +20.26'00" | 5.3 | 1.25 | ETA | CNC | 130 | CANCER |
| 8:43:18.0 | +21.28'00" | 4.7 | 0.01 | GAMMA | CNC | 48 | CANCER |
| 8:46:42.0 | +28.46'00" | 4.0 | 1.01 | IOTA | CNC | 130 | CANCER |
| 9:07:42.0 | +10.40'00" | 5.2 | -0.11 | KAPPA | CNC | 9999 | CANCER |
| 8:59:30.0 | +32.25'00" | 5.2 | 0.93 | SI3 | CNC | 20 | CANCER |
| 8:31:36.0 | +18.06'00" | 5.4 | 1.56 | THETA | CNC | 120 | CANCER |
| 9:09:24.0 | +22.03'00" | 5.1 | 0.97 | XI | CNC | 97 | CANCER |
| 8:12:12.0 | +17.39'00" | 4.7 | 0.53 | ZETA | CNC | 16 | CANCER |
| 12:25:48.0 | +39.01'00" | 5.0 | 0.96 | 6 | CNV | 41 | CANES VENATICI |
| 12:56:00.0 | +38.19'00" | 2.8 | -0.12 | ALPHA | CVN | 20 | CANES VENATICI |
| 12:33:42.0 | +41.21'00" | 4.3 | 0.59 | BETA | CVN | 9 | CANES VENATICI |
| 12:45:06.0 | +45.26'00" | 5.0 | 2.54 | Y | CVN | 21 | CANES VENATICI |
| 13:05:42.0 | +35.48'00" | 5.3 | -0.08 | 14 | CVN | 100 | CANES VENATICI |
| 13:17:30.0 | +40.34'00" | 4.7 | 0.30 | 20 | CVN | 52 | CANES VENATICI |
| 12:19:48.0 | +48.59'00" | 5.3 | 1.66 | 3 | CVN | 9999 | CANES VENATICI |
| 5:39:36.0 | -34.04'00" | 2.6 | -0.12 | ALPHA | COL | 37 | COLUMBA |
| 5:51:00.0 | -35.46'00" | 3.1 | 1.16 | BETA | COL | 44 | COLUMBA |
| 6:22:06.0 | -33.26'00" | 3.9 | 0.88 | DELTA | COL | 36 | COLUMBA |
| 5:31:12.0 | -35.28'00" | 3.9 | 1.14 | EPSILON | COL | 42 | COLUMBA |
| 5:59:06.0 | -42.49'00" | 4.0 | 1.14 | ETA | COL | 44 | COLUMBA |
| 5:57:30.0 | -35.17'00" | 4.4 | -0.18 | GAMMA | COL | 210 | COLUMBA |
| 6:16:30.0 | -35.08'00" | 4.4 | 1.00 | KAPPA | COL | 58 | COLUMBA |
| 5:17:30.0 | -34.54'00" | 4.8 | 1.00 | OMICRON | COL | 21 | COLUMBA |
| 13:10:00.0 | +17.32'00" | 4.5 | 0.45 | ALPHA | COM | 18 | COMA BERENICES |

| | | | | | |
|---|---|---|---|---|---|
| 13:11:54.0 | +27.53'00" | 4.3 | 0.57 | BETA | COM | 8 | COMA BERENICES |
| 12:26:54.0 | +28.16'00" | 4.4 | 1.13 | GAMMA | COM | 31 | COMA BERENICES |
| 12:22:30.0 | +25.51'00" | 4.8 | 0.49 | 12 | COM | 27 | COMA BERENICES |
| 12:24:18.0 | +26.06'00" | 5.2 | 0.08 | 13 | COM | 31 | COMA BERENICES |
| 12:26:24.0 | +27.16'00" | 5.0 | 0.27 | 14 | COM | 24 | COMA BERENICES |
| 12:27:00.0 | +26.50'00" | 5.0 | 0.08 | 16 | COM | 21 | COMA BERENICES |
| 12:28:54.0 | +25.55'00" | 5.3 | -0.05 | 17 | COM | 22 | COMA BERENICES |
| 12:34:54.0 | +22.38'00" | 4.8 | 0.00 | 23 | COM | 110 | COMA BERENICES |
| 12:35:06.0 | +18.23'00" | 5.0 | 1.15 | 24 | COM | 110 | COMA BERENICES |
| 12:51:42.0 | +27.32'00" | 4.9 | 0.67 | 31 | COM | 74 | COMA BERENICES |
| 13:07:12.0 | +27.37'00" | 4.8 | 1.48 | 41 | COM | 110 | COMA BERENICES |
| 12:16:18.0 | +23.57'00" | 5.0 | 0.97 | 7 | COM | 89 | COMA BERENICESθ |
| 19:09:30.0 | -37.54'00" | 4.1 | 0.04 | ALPHA | CRA | 14 | CORONA AUSTRALIA |
| 19:10:00.0 | -39.20'00" | 4.1 | 1.20 | BETA | CRA | 34 | CORONA AUSTRALIA |
| 19:08:18.0 | -40.30'00" | 4.6 | 1.09 | DELTA | CRA | 63 | CORONA AUSTRALIA |
| 18:58:42.0 | -37.06'00" | 4.9 | 0.41 | EPSILON | CRA | 28 | CORONA AUSTRALIA |
| 18:48:48.0 | -43.41'00" | 5.5 | 0.13 | ET1 | CRA | 66 | CORONA AUSTRALIA |
| 18:49:36.0 | -43.26'00" | 5.6 | -0.08 | ET2 | CRA | 50 | CORONA AUSTRALIA |
| 19:06:24.0 | -37.04'00" | 4.2 | 0.52 | GAMMA | CRA | 12 | CORONA AUSTRALIA |
| 18:33:30.0 | -42.19'00" | 4.6 | 1.01 | THETA | CRA | 60 | CORONA AUSTRALIA |
| 19:03:06.0 | -42.06'00" | 4.8 | -0.02 | ZETA | CRA | 68 | CORONA AUSTRALIA |
| 15:34:42.0 | +26.43'00" | 2.2 | -0.02 | ALPHA | CRB | 24 | CRAB |
| 15:27:48.0 | +29.06'00" | 3.7 | 0.28 | BETA | CRB | 18 | CRAB |
| 15:49:36.0 | +26.04'00" | 4.6 | 0.80 | DELTA | CRB | 38 | CRAB |
| 15:57:36.0 | +26.53'00" | 4.2 | 1.23 | EPSILON | CRB | 74 | CRAB |
| 15:42:42.0 | +26.18'00" | 3.8 | 0.00 | GAMMA | CRB | 64 | CRAB |
| 16:01:24.0 | +29.51'00" | 5.0 | -0.07 | IOTA | CRB | 130 | CRAB |

| | | | | | | | |
|---|---|---|---|---|---|---|---|
| 15:51:12.0 | +35.39'00" | 4.8 | 1.00 | KAPPA | CRB | 33 | CRAB |
| 15:59:30.0 | +25.55'00" | 7.9 | 1.10 | T | CRB | 410 | CRABθ(9.9 & 0.1) |
| 16:09:00.0 | +36.29'00" | 4.8 | 1.01 | TAU | CRB | 52 | CRAB |
| 15:32:54.0 | +31.22'00" | 4.1 | -0.13 | THETA | CRB | 110 | CRAB |
| 15:39:24.0 | +36.38'00" | 4.6 | -0.12 | ZETA | CRB | 130 | CRABθ |
| 10:59:48.0 | -18.18'00" | 4.1 | 1.09 | ALPHA | CRT | 37 | CRATER |
| 11:11:42.0 | -22.50'00" | 4.5 | 0.03 | BETA | CRT | 72 | CRATER |
| 11:19:18.0 | -14.47'00" | 3.6 | 1.12 | DELTA | CRT | 22 | CRATER |
| 11:24:36.0 | -10.52'00" | 4.8 | 1.56 | EPSILON | CRT | 96 | CRATER |
| 11:56:00.0 | -17.09'00" | 5.2 | -0.02 | ETA | CRT | 51 | CRATER |
| 11:24:54.0 | -17.41'00" | 4.1 | 0.21 | GAMMA | CRT | 24 | CRATER |
| 11:36:42.0 | -09.48'00" | 4.7 | -0.08 | THETA | CRT | 79 | CRATER |
| 11:44:48.0 | -18.21'00" | 4.7 | 0.97 | ZETA | CRT | 74 | CRATER |
| 12:26:36.0 | -63.06'00" | 1.1 | -0.10 | ALPHA | CRU | 110 | CRUXθ |
| 12:47:42.0 | -59.41'00" | 1.3 | -0.23 | BETA | CRU | 130 | CRUX |
| 12:15:06.0 | -58.45'00" | 2.8 | -0.23 | DELTA | CRU | 79 | CRUX |
| 12:21:24.0 | -60.24'00" | 3.6 | 1.42 | EPSILON | CRU | 18 | CRUX |
| 12:06:54.0 | -64.37'00" | 4.2 | 0.34 | ETA | CRU | 33 | CRUX |
| 12:31:12.0 | -57.07'00" | 1.6 | 1.59 | GAMMA | CRU | 27 | CRUX |
| 12:54:36.0 | -57.11'00" | 4.0 | -0.17 | MU1 | CRU | 190 | CRUX |
| 12:03:00.0 | -63.19'00" | 4.3 | 0.27 | TH1 | CRU | 17 | CRUX |
| 12:04:18.0 | -63.10'00" | 4.7 | -0.08 | TH2 | CRU | 290 | CRUX |
| 12:18:24.0 | -64.00'00" | 4.0 | -0.17 | ZETA | CRU | 150 | CRUX |
| 12:08:24.0 | -24.44'00" | 4.0 | 0.32 | ALPHA | CRV | 21 | CORVUS |
| 12:34:24.0 | -23.24'00" | 2.7 | 0.89 | BETA | CRV | 89 | CORVUS |
| 12:29:54.0 | -16.31'00" | 3.0 | -0.05 | DELTA | CRV | 36 | CORVUS |
| 12:10:06.0 | -22.37'00" | 3.0 | 1.33 | EPSILON | CRV | 32 | CORVUS |

| | | | | | |
|---|---|---|---|---|---|
| 12:32:06.0 | −16.12′00″ | 4.3 | 0.38 | ETA | CRV | 29 | CORVUS |
| 12:15:48.0 | −17.33′00″ | 2.6 | −0.11 | GAMMA | CRV | 57 | CORVUS |
| 20:41:24.0 | +45.17′00″ | 1.3 | 0.09 | ALPHA | CYG | 560 | CYGNUS |
| 19:30:42.0 | +27.58′00″ | 3.1 | 1.13 | BETA | CYG | 120 | CYGNUS |
| 19:50:36.0 | +32.55′00″ | 4.2 | 1.82 | CHI | CYG | 25 | CYGNUS |
| 19:45:00.0 | +45.08′00″ | 2.9 | −0.03 | DELTA | CYG | 49 | CYGNUS |
| 20:46:12.0 | +33.58′00″ | 2.5 | 1.03 | EPSILON | CYG | 25 | CYGNUS |
| 19:56:18.0 | +35.05′00″ | 3.9 | 1.02 | ETA | CYG | 52 | CYGNUS |
| 20:22:12.0 | +40.15′00″ | 2.2 | 0.68 | GAMMA | CYG | 230 | CYGNUS |
| 19:29:42.0 | +51.44′00″ | 3.8 | 0.14 | IOTA | CYG | 41 | CYGNUS |
| 19:17:06.0 | +53.22′00″ | 3.8 | 0.96 | KAPPA | CYG | 52 | CYGNUS |
| 20:47:24.0 | +36.29′00″ | 4.5 | −0.11 | LAMBDA | CYG | 130 | CYGNUS |
| 21:44:06.0 | +28.45′00″ | 4.5 | 0.48 | MU | CYG | 17 | CYGNUS@ |
| 20:57:12.0 | +41.10′00″ | 3.9 | 0.02 | NU | CYG | 45 | CYGNUS |
| 20:13:36.0 | +46.44′00″ | 3.8 | 1.28 | OI1 | CYG | 160 | CYGNUS |
| 20:15:30.0 | +47.43′00″ | 4.0 | 1.52 | OI2 | CYG | 280 | CYGNUS |
| 20:17:48.0 | +38.02′00″ | 4.8 | 0.42 | P | CYG | 44 | CYGNUS@ |
| 21:42:06.0 | +51.11′00″ | 4.7 | −0.12 | PI1 | CYG | 180 | CYGNUS |
| 21:46:48.0 | +49.19′00″ | 4.2 | −0.12 | PI2 | CYG | 250 | CYGNUS |
| 21:34:00.0 | +45.36′00″ | 4.0 | 0.89 | RHO | CYG | 56 | CYGNUS |
| 21:17:24.0 | +39.24′00″ | 4.2 | 0.12 | SIGMA | CYG | 1600 | CYGNUS |
| 21:14:48.0 | +38.03′00″ | 3.7 | 0.39 | TAU | CYG | 21 | CYGNUS |
| 19:36:24.0 | +50.13′00″ | 4.5 | 0.38 | THETA | CYG | 19 | CYGNUS |
| 21:17:54.0 | +34.54′00″ | 4.4 | −0.11 | UPSILON | CYG | 240 | CYGNUS |
| 21:04:54.0 | +43.56′00″ | 3.7 | 1.65 | XI | CYG | 290 | CYGNUS |
| 21:12:54.0 | +30.14′00″ | 3.2 | 0.99 | ZETA | CYG | 120 | CYGNUS |
| 19:44:18.0 | +37.21′00″ | 4.9 | 0.95 | 15 | CYG | 83 | CYGNUS |

| | | | | | |
|---|---|---|---|---|---|
| 20:09:24.0 | +36.50'00" | 4.9 | -0.13 | 28 | CYG 210 CYGNUS |
| 20:13:24.0 | +56.34'00" | 4.3 | 0.11 | 33 | CYG 39 CYGNUS |
| 20:23:54.0 | +32.11'00" | 4.4 | 1.33 | 39 | CYG 78 CYGNUS |
| 20:29:24.0 | +30.22'00" | 4.0 | 0.40 | 41 | CYG 160 CYGNUS |
| 20:41:00.0 | +32.18'00" | 5.5 | 0.88 | 49 | CYG 120 CYGNUS |
| 20:45:42.0 | +30.43'00" | 4.2 | 1.05 | 52 | CYG 59 CYGNUS |
| 20:48:54.0 | +46.07'00" | 4.8 | 0.41 | 55 | CYG 1000 CYGNUS |
| 20:59:48.0 | +47.31'00" | 4.7 | -0.05 | 59 | CYG 480 CYGNUS |
| 21:06:54.0 | +38.45'00" | 4.8 | 1.18 | 61 | CYG 3 CYGNUS |
| 21:29:24.0 | +46.32'00" | 5.2 | 0.97 | 71 | CYG 100 CYGNUS |
| 21:36:54.0 | +40.25'00" | 5.0 | 0.18 | 74 | CYG 22 CYGNUS |
| 21:40:12.0 | +43.16'00" | 5.1 | 1.60 | 75 | CYG 130 CYGNUS |
| 19:31:48.0 | +34.27'00" | 4.7 | -0.14 | 8 | CYG 240 CYGNUS |
| 20:39:36.0 | +15.55'00" | 3.8 | -0.06 | ALPHA | DEL 52 DELPHINUS |
| 20:37:30.0 | +14.36'00" | 3.6 | 0.44 | BETA | DEL 33 DELPHINUS |
| 20:43:30.0 | +15.04'00" | 4.4 | 0.32 | DELTA | DEL 56 DELPHINUS |
| 20:33:12.0 | +11.18'00" | 4.0 | -0.03 | EPSILON | DEL 150 DELPHINUS |
| 20:46:42.0 | +16.07'00" | 3.9 | 1.04 | GAMMA | DEL 23 DELPHINUS@ |
| 20:39:06.0 | +10.05'00" | 5.1 | 0.72 | KAPPA | DEL 23 DELPHINUS |
| 20:35:18.0 | +14.40'00" | 4.7 | 0.11 | ZETA | DEL 38 DELPHINUS |
| 4:34:00.0 | -55.03'00" | 3.3 | -0.10 | ALPHA | DOR 59 DORADO |
| 5:33:36.0 | -62.29'00" | 3.8 | 0.80 | BETA | DOR 2300 DORADO |
| 5:44:48.0 | -65.44'00" | 4.4 | 0.21 | DELTA | DOR 24 DORADO |
| 4:16:00.0 | -51.29'00" | 4.3 | 0.30 | GAMMA | DOR 21 DORADO |
| 6:08:42.0 | -68.51'00" | 5.1 | -0.08 | NU | DOR 110 DORADO |
| 4:36:48.0 | -62.05'00" | 5.4 | 1.58 | R | DOR 230 DORADO |
| 5:13:48.0 | -67.11'00" | 4.8 | 1.28 | THETA | DOR 80 DORADO |

| | | | | | |
|---|---|---|---|---|---|
| 5:05:30.0 | −57.28′00″ | 4.7 | 0.52 | ZETA | DOR 13 DORADO |
| 14:04:24.0 | +64.23′00″ | 3.7 | −0.05 | ALPHA | DRA 71 DRACO |
| 17:30:24.0 | +52.18′00″ | 2.8 | 0.98 | BETA | DRA 82 DRACO |
| 18:21:06.0 | +72.44′00″ | 3.6 | 0.49 | CHI | DRA 8 DRACO |
| 19:12:36.0 | +67.40′00″ | 3.1 | 1.00 | DELTA | DRA 36 DRACO |
| 19:48:12.0 | +70.16′00″ | 3.8 | 0.89 | EPSILON | DRA 51 DRACO |
| 16:24:00.0 | +61.31′00″ | 2.7 | 0.91 | ETA | DRA 26 DRACO |
| 17:56:36.0 | +51.29′00″ | 2.2 | 1.52 | GAMMA | DRA 31 DRACO |
| 15:24:54.0 | +58.58′00″ | 3.3 | 1.16 | IOTA | DRA 48 DRACO |
| 12:33:30.0 | +69.47′00″ | 3.9 | −0.13 | KAPPA | DRA 22 DRACO |
| 11:31:24.0 | +69.20′00″ | 3.8 | 1.62 | LAMBDA | DRA 65 DRACO |
| 17:05:18.0 | +54.28′00″ | 5.1 | 0.48 | MU | DRA 26 DRACOθ |
| 17:32:12.0 | +55.11′00″ | 4.9 | 0.26 | NU1 | DRA 9999 DRACO |
| 17:32:18.0 | +55.10′00″ | 4.9 | 0.28 | NU2 | DRA 19 DRACO |
| 17:36:54.0 | +68.45′00″ | 4.8 | 0.43 | OMEGA | DRA 22 DRACO |
| 18:51:12.0 | +59.23′00″ | 4.7 | 1.19 | OMICRON | DRA 67 DRACO |
| 18:20:48.0 | +71.20′00″ | 4.2 | −0.10 | PHI | DRA 33 DRACO |
| 17:41:54.0 | +72.09′00″ | 4.6 | 0.42 | PSI | DRA 23 DRACOθ |
| 19:20:42.0 | +65.43′00″ | 4.6 | 0.02 | PI | DRA 63 DRACO |
| 20:02:48.0 | +67.52′00″ | 4.5 | 1.32 | RHO | DRA 82 DRACO |
| 19:32:24.0 | +69.40′00″ | 4.7 | 0.79 | SIGMA | DRA 6 DRACO |
| 19:15:30.0 | +73.21′00″ | 4.5 | 1.25 | TAU | DRA 70 DRACO |
| 16:01:54.0 | +58.34′00″ | 4.0 | 0.52 | THETA | DRA 16 DRACO |
| 18:54:24.0 | +71.18′00″ | 4.8 | 1.15 | UPSILON | DRA 64 DRACO |
| 17:53:30.0 | +56.52′00″ | 3.8 | 1.18 | XI | DRA 58 DRACO |
| 17:08:48.0 | +65.43′00″ | 3.2 | −0.12 | ZETA | DRA 97 DRACO |
| 13:51:24.0 | +64.43′00″ | 4.7 | 1.58 | 10 | DRA 110 DRACO |

| | | | | | | |
|---|---|---|---|---|---|---|
| 16:28:00.0 | +68.46'00" | 5.0 | -0.06 | 15 | DRA 110 | DRACO |
| 16:36:12.0 | +52.54'00" | 4.7 | -0.06 | 16 | DRA 100 | DRACO θ |
| 17:32:00.0 | +68.08'00" | 5.1 | 1.08 | 27 | DRA 83 | DRACO |
| 11:42:30.0 | +66.45'00" | 5.3 | 1.28 | 3 | DRA 130 | DRACO |
| 17:49:24.0 | +76.58'00" | 5.0 | 0.49 | 35 | DRA 66 | DRACO |
| 18:13:54.0 | +64.24'00" | 5.0 | 0.38 | 36 | DRA 22 | DRACO |
| 18:23:54.0 | +58.48'00" | 5.0 | 0.08 | 39 | DRA 53 | DRACO |
| 18:46:24.0 | +75.26'00" | 5.4 | 0.05 | 50 | DRA 37 | DRACO |
| 20:31:30.0 | +74.57'00" | 5.2 | 0.07 | 73 | DRA 33 | DRACO |
| 12:55:30.0 | +65.26'00" | 5.2 | 0.28 | 8 | DRA 37 | DRACO |
| 21:15:48.0 | +05.15'00" | 3.9 | 0.53 | ALPHA | EQU 46 | EQUULEUS |
| 21:22:54.0 | +06.49'00" | 5.2 | 0.05 | BETA | EQU 21 | EQUULEUS |
| 21:14:30.0 | +10.00'00" | 4.5 | 0.50 | DELTA | EQU 15 | EQUULEUS |
| 20:59:06.0 | +04.18'00" | 5.2 | 0.46 | EPSILON | EQU 40 | EQUULEUS θ |
| 21:10:18.0 | +10.08'00" | 4.7 | 0.26 | GAMMA | EQU 21 | EQUULEUS |
| 3:48:36.0 | -37.37'00" | 4.2 | -0.01 | f | ERI 50 | ERIDANUS θ |
| 3:42:48.0 | -37.19'00" | 4.6 | 1.20 | h | ERI 95 | ERIDANUS θ |
| 2:39:48.0 | -42.53'00" | 4.8 | 0.06 | s | ERI 25 | ERIDANUS θ |
| 1:37:42.0 | -57.14'00" | 0.5 | -0.16 | ALPHA | ERI 26 | ERIDANUS |
| 5:07:48.0 | -05.05'00" | 2.8 | 0.13 | BETA | ERI 28 | ERIDANUS |
| 1:56:00.0 | -51.37'00" | 3.7 | 0.85 | CHI | ERI 15 | ERIDANUS |
| 3:43:12.0 | -09.46'00" | 3.5 | 0.92 | DELTA | ERI 9 | ERIDANUS |
| 3:32:54.0 | -09.27'00" | 3.7 | 0.88 | EPSILON | ERI 3 | ERIDANUS |
| 2:56:24.0 | -08.54'00" | 3.9 | 1.11 | ETA | ERI 23 | ERIDANUS |
| 3:58:00.0 | -13.31'00" | 3.0 | 1.59 | GAMMA | ERI 44 | ERIDANUS |
| 2:40:42.0 | -39.51'00" | 4.1 | 1.02 | IOTA | ERI 61 | ERIDANUS |
| 2:27:00.0 | -47.42'00" | 4.3 | -0.14 | KAPPA | ERI 190 | ERIDANUS |

| | | | | | | |
|---|---|---|---|---|---|---|
| 5:09:06.0 | -08.45'00" | 4.3 | -0.19 | LAMBDA | ERI | 280 | ERIDANUS |
| 4:45:30.0 | -03.15'00" | 4.0 | -0.15 | MU | ERI | 130 | ERIDANUS |
| 4:36:18.0 | -03.21'00" | 3.9 | -0.21 | NU | ERI | 320 | ERIDANUS |
| 4:11:54.0 | -06.50'00" | 4.0 | 0.33 | OI1 | ERI | 85 | ERIDANUS |
| 4:15:18.0 | -07.39'00" | 4.4 | 0.82 | OI2 | ERI | 5 | ERIDANUS |
| 4:52:54.0 | -05.27'00" | 4.4 | 0.25 | OMEGA | ERI | 36 | ERIDANUS |
| 2:16:30.0 | -51.31'00" | 3.6 | -0.12 | PHI | ERI | 37 | ERIDANUS |
| 3:46:06.0 | -12.06'00" | 4.4 | 1.63 | PI | ERI | 50 | ERIDANUS |
| 2:45:06.0 | -18.34'00" | 4.5 | 0.48 | TA1 | ERI | 15 | ERIDANUS |
| 2:51:00.0 | -21.00'00" | 4.8 | 0.91 | TA2 | ERI | 81 | ERIDANUS |
| 3:02:24.0 | -23.37'00" | 4.1 | 0.16 | TA3 | ERI | 23 | ERIDANUS |
| 3:19:30.0 | -21.45'00" | 3.7 | 1.69 | TA4 | ERI | 69 | ERIDANUS |
| 3:33:48.0 | -21.38'00" | 4.3 | -0.10 | TA5 | ERI | 78 | ERIDANUS |
| 3:46:48.0 | -23.15'00" | 4.2 | 0.42 | TA6 | ERI | 17 | ERIDANUS |
| 3:53:42.0 | -24.37'00" | 4.5 | 0.09 | TA8 | ERI | 140 | ERIDANUS |
| 3:59:54.0 | -24.01'00" | 4.7 | -0.13 | TA9 | ERI | 110 | ERIDANUS |
| 2:58:18.0 | -40.18'00" | 2.9 | 0.12 | THETA | ERI | 17 | ERIDANUS@ |
| 4:33:30.0 | -29.46'00" | 4.5 | 0.98 | UP1 | ERI | 63 | ERIDANUS |
| 4:35:36.0 | -30.34'00" | 3.8 | 0.98 | UP2 | ERI | 53 | ERIDANUS |
| 4:23:42.0 | -03.45'00" | 5.2 | 0.08 | XI | ERI | 57 | ERIDANUS |
| 3:15:48.0 | -08.49'00" | 4.8 | 0.23 | ZETA | ERI | 16 | ERIDANUS |
| 3:30:36.0 | -05.05'00" | 4.7 | -0.09 | 17 | ERI | 97 | ERIDANUS |
| 3:36:18.0 | -17.28'00" | 5.2 | -0.13 | 20 | ERI | 58 | ERIDANUS |
| 3:44:30.0 | -01.10'00" | 5.3 | -0.10 | 24 | ERI | 180 | ERIDANUS |
| 4:01:30.0 | -01.33'00" | 5.3 | -0.15 | 35 | ERI | 240 | ERIDANUS |
| 4:17:54.0 | -33.48'00" | 3.6 | -0.12 | 41 | ERI | 40 | ERIDANUS |
| 4:24:00.0 | -34.01'00" | 4.0 | 1.49 | 43 | ERI | 78 | ERIDANUS |

407-001

| | | | | | |
|---|---|---|---|---|---|
| 4:38:12.0 | −14.18'00" | 3.9 | 1.09 53 | ERI | 44 | ERIDANUS |
| 4:40:24.0 | −19.40'00" | 4.3 | 1.61 54 | ERI | 92 | ERIDANUS |
| 3:12:06.0 | −28.59'00" | 3.9 | 0.52 ALPHA | FOR | 14 | FORNAX |
| 2:49:06.0 | −32.24'00" | 4.5 | 0.99 BETA | FOR | 61 | FORNAX |
| 3:42:12.0 | −31.56'00" | 5.0 | −0.16 DELTA | FOR | 9999 | FORNAX |
| 2:22:30.0 | −23.49'00" | 5.2 | 0.60 KAPPA | FOR | 14 | FORNAX |
| 2:12:54.0 | −30.43'00" | 5.3 | −0.02 MU | FOR | 27 | FORNAX |
| 2:04:30.0 | −29.18'00" | 4.7 | −0.17 NU | FOR | 110 | FORNAX |
| 7:34:36.0 | +31.53'00" | 1.6 | 0.04 ALPHA | GEM | 14 | GEMINI |
| 7:45:18.0 | +28.02'00" | 1.1 | 1.00 BETA | GEM | 11 | GEMINI |
| 8:03:30.0 | +27.48'00" | 4.9 | 1.12 CHI | GEM | 100 | GEMINI |
| 7:20:06.0 | +21.59'00" | 3.5 | 0.34 DELTA | GEM | 18 | GEMINI |
| 6:43:54.0 | +25.08'00" | 3.0 | 1.40 EPSILON | GEM | 210 | GEMINI |
| 6:14:54.0 | +22.30'00" | 3.3 | 1.60 ETA | GEM | 57 | GEMINI |
| 6:37:42.0 | +16.24'00" | 1.9 | 0.00 GAMMA | GEM | 26 | GEMINI |
| 7:25:42.0 | +27.48'00" | 3.8 | 1.03 IOTA | GEM | 50 | GEMINI |
| 7:44:24.0 | +24.24'00" | 3.6 | 0.93 KAPPA | GEM | 45 | GEMINI |
| 7:18:06.0 | +16.32'00" | 3.6 | 0.11 LAMBDA | GEM | 25 | GEMINI |
| 6:23:00.0 | +22.31'00" | 2.9 | 1.64 MU | GEM | 46 | GEMINI |
| 6:29:00.0 | +20.13'00" | 4.2 | −0.13 NU | GEM | 110 | GEMINI |
| 7:02:24.0 | +24.13'00" | 5.2 | 0.94 OMEGA | GEM | 290 | GEMINI |
| 7:53:30.0 | +26.46'00" | 5.0 | 0.09 PHI | GEM | 45 | GEMINI |
| 7:47:30.0 | +33.25'00" | 5.1 | 1.60 PI | GEM | 120 | GEMINI |
| 7:29:06.0 | +31.47'00" | 4.2 | 0.32 RHO | GEM | 19 | GEMINI |
| 7:43:18.0 | +28.53'00" | 4.3 | 1.12 SIGMA | GEM | 40 | GEMINI |
| 7:11:06.0 | +30.15'00" | 4.4 | 1.26 TAU | GEM | 67 | GEMINI |
| 6:52:48.0 | +33.58'00" | 3.6 | 0.10 THETA | GEM | 51 | GEMINI |

407-001

| | | | | |
|---|---|---|---|---|
| 7:35:54.0 | +26.54'00" | 4.1 | 1.54 UPSILON | GEM 78 GEMINI |
| 6:45:18.0 | +12.54'00" | 3.4 | 0.43 XI | GEM 23 GEMINI |
| 7:04:06.0 | +20.34'00" | 3.8 | 0.79 ZETA | GEM 430 GEMINI |
| 6:04:06.0 | +23.16'00" | 4.2 | 0.82 1 | GEM 59 GEMINI |
| 6:44:00.0 | +13.14'00" | 4.5 | 1.16 30 | GEM 70 GEMINI |
| 7:13:24.0 | +16.10'00" | 5.0 | 1.66 51 | GEM 120 GEMINI |
| 7:46:06.0 | +18.31'00" | 4.9 | 1.45 81 | GEM 110 GEMINI |
| 22:08:12.0 | -46.58'00" | 1.7 | -0.13 ALPHA | GRU 21 GRU |
| 22:42:42.0 | -46.53'00" | 2.1 | 1.62 BETA | GRU 53 GRU |
| 22:29:18.0 | -43.30'00" | 4.0 | 1.03 DE1 | GRU 43 GRU |
| 22:29:48.0 | -43.45'00" | 4.1 | 1.57 DE2 | GRU 27 GRU |
| 22:48:36.0 | -51.19'00" | 3.5 | 0.08 EPSILON | GRU 25 GRU |
| 22:45:36.0 | -53.30'00" | 4.9 | 1.18 ETA | GRU 62 GRU |
| 21:53:54.0 | -37.22'00" | 3.0 | -0.12 GAMMA | GRU 70 GRU |
| 23:10:24.0 | -45.15'00" | 3.9 | 1.02 IOTA | GRU 53 GRU |
| 22:06:06.0 | -39.33'00" | 4.5 | 1.37 LAMBDA | GRU 94 GRU |
| 22:15:36.0 | -41.21'00" | 4.8 | 0.80 MU1 | GRU 79 GRU |
| 22:16:24.0 | -41.38'00" | 5.1 | 0.92 MU2 | GRU 86 GRU |
| 22:28:42.0 | -39.08'00" | 5.5 | 0.95 NU | GRU 76 GRU |
| 23:06:54.0 | -43.31'00" | 4.3 | 0.42 THETA | GRU 26 GRU |
| 23:00:54.0 | -52.45'00" | 4.1 | 0.98 ZETA | GRU 50 GRU |
| 17:14:36.0 | +14.23'00" | 3.1 | 1.44 ALPHA | HER 67 HERCULES |
| 16:30:12.0 | +21.29'00" | 2.8 | 0.94 BETA | HER 31 HERCULES |
| 15:52:42.0 | +42.27'00" | 4.6 | 0.56 CHI | HER 15 HERCULES |
| 17:15:00.0 | +24.50'00" | 3.1 | 0.08 DELTA | HER 28 HERCULES |
| 17:00:18.0 | +30.56'00" | 3.9 | -0.01 EPSILON | HER 26 HERCULES |
| 16:42:54.0 | +38.55'00" | 3.5 | 0.92 ETA | HER 21 HERCULES |

| | | | | | | | |
|---|---|---|---|---|---|---|---|
| 16:21:54.0 | +19.09'00" | 3.8 | 0.27 | GAMMA | HER | 42 | HERCULES |
| 17:39:30.0 | +46.00'00" | 3.8 | -0.18 | IOTA | HER | 130 | HERCULES |
| 16:08:06.0 | +17.03'00" | 5.0 | 0.95 | KAPPA | HER | 9999 | HERCULES |
| 17:30:42.0 | +26.07'00" | 4.4 | 1.44 | LAMBDA | HER | 85 | HERCULES |
| 17:46:30.0 | +27.43'00" | 3.4 | 0.75 | MU | HER | 8 | HERCULES |
| 17:58:30.0 | +30.11'00" | 4.4 | 0.39 | NU | HER | 190 | HERCULES |
| 16:25:24.0 | +14.02'00" | 4.6 | 0.00 | OMEGA | HER | 33 | HERCULES |
| 18:07:30.0 | +28.46'00" | 3.8 | -0.03 | OMICRON | HER | 52 | HERCULES |
| 16:08:48.0 | +44.56'00" | 4.3 | -0.07 | PHI | HER | 23 | HERCULES |
| 17:15:00.0 | +36.49'00" | 3.2 | 1.44 | PI | HER | 120 | HERCULES |
| 17:23:42.0 | +37.09'00" | 4.1 | -0.03 | RHO | HER | 52 | HERCULES |
| 16:34:06.0 | +42.26'00" | 4.2 | -0.01 | SIGMA | HER | 61 | HERCULES |
| 16:19:42.0 | +46.19'00" | 3.9 | -0.15 | TAU | HER | 130 | HERCULES |
| 17:56:18.0 | +37.15'00" | 3.9 | 1.35 | THETA | HER | 130 | HERCULES |
| 16:02:48.0 | +46.02'00" | 4.8 | -0.11 | UPSILON | HER | 9999 | HERCULES |
| 17:57:48.0 | +29.15'00" | 3.7 | 0.94 | XI | HER | 50 | HERCULES |
| 16:41:18.0 | +31.36'00" | 2.8 | 0.65 | ZETA | HER | 10 | HERCULES |
| 18:08:48.0 | +20.49'00" | 4.4 | -0.16 | 102 | HER | 240 | HERCULES |
| 18:23:42.0 | +21.46'00" | 3.8 | 1.18 | 109 | HER | 33 | HERCULES |
| 18:45:42.0 | +20.33'00" | 4.2 | 0.46 | 110 | HER | 15 | HERCULES |
| 18:47:00.0 | +18.11'00" | 4.4 | 0.13 | 111 | HER | 34 | HERCULES |
| 18:54:42.0 | +22.39'00" | 4.6 | 0.78 | 113 | HER | 36 | HERCULES |
| 16:38:42.0 | +48.56'00" | 4.9 | 1.55 | 42 | HER | 120 | HERCULES |
| 16:51:48.0 | +24.39'00" | 5.0 | 1.25 | 51 | HER | 170 | HERCULES |
| 16:53:00.0 | +31.42'00" | 5.3 | 0.29 | 53 | HER | 35 | HERCULES |
| 17:01:36.0 | +33.34'00" | 5.3 | 0.02 | 59 | HER | 110 | HERCULES |
| 17:05:24.0 | +12.44'00" | 4.9 | 0.12 | 60 | HER | 62 | HERCULES |

| | | | | | | |
|---|---|---|---|---|---|---|
| 17:20:42.0 | +32.28'00" | 5.4 | 0.62 | 72 | HER 14 | HERCULES |
| 17:43:24.0 | +24.20'00" | 5.7 | 0.65 | 84 | HER 26 | HERCULES |
| 17:55:24.0 | +26.03'00" | 5.5 | 0.34 | 89 | HER 5900 | HERCULES |
| 18:00:06.0 | +16.45'00" | 4.7 | 1.26 | 93 | HER 100 | HERCULES |
| 18:01:30.0 | +21.36'00" | 4.4 | 0.60 | 95 | HER 48 | HERCULES |
| 4:14:00.0 | -42.18'00" | 3.9 | 1.10 | ALPHA | HOR 59 | HOROLOGIUM |
| 2:58:48.0 | -64.04'00" | 5.0 | 0.13 | BETA | HOR 87 | HOROLOGIUM |
| 4:10:48.0 | -41.60'00" | 4.9 | 0.33 | DELTA | HOR 28 | HOROLOGIUM |
| 2:37:24.0 | -52.33'00" | 5.3 | 0.27 | ETA | HOR 15 | HOROLOGIUM |
| 2:42:36.0 | -50.48'00" | 5.4 | 0.56 | IOTA | HOR 17 | HOROLOGIUM |
| 2:24:54.0 | -60.19'00" | 5.4 | 0.39 | LAMBDA | HOR 89 | HOROLOGIUM |
| 3:03:36.0 | -59.44'00" | 5.1 | 0.34 | MU | HOR 30 | HOROLOGIUM |
| ** 2:53:54.0 | -49.53'00" | 4.0 | 2.00 | R | HOR 9999 | HOROLOGIUM@2000cor |
| 2:49:01.5 | -62.48'24 | 5.3 | 0.03 | NU | HOR 23 | HOROLOGIUM |
| 2:40:42.0 | -54.33'00" | 5.2 | 0.40 | ZETA | HOR 26 | HOROLOGIUM |
| 9:27:36.0 | -08.40'00" | 2.0 | 1.44 | ALPHA | HYA 26 | HYDRA |
| 11:52:54.0 | -33.54'00" | 4.3 | -0.10 | BETA | HYA 82 | HYDRA |
| 11:05:18.0 | -27.18'00" | 4.9 | 0.36 | CH1 | HYA 21 | HYDRA |
| 11:06:00.0 | -27.17'00" | 5.7 | -0.06 | CH2 | HYA 9999 | HYDRA |
| 8:37:42.0 | +05.42'00" | 4.2 | 0.00 | DELTA | HYA 43 | HYDRA |
| 8:46:48.0 | +06.25'00" | 3.4 | 0.68 | EPSILON | HYA 34 | HYDRA |
| 8:43:12.0 | +03.24'00" | 4.3 | -0.20 | ETA | HYA 160 | HYDRA |
| 13:18:54.0 | -23.10'00" | 3.0 | 0.92 | GAMMA | HYA 32 | HYDRA |
| 9:39:54.0 | -01.09'00" | 3.9 | 1.32 | IOTA | HYA 63 | HYDRA |
| 9:40:18.0 | -14.20'00" | 5.1 | -0.15 | KAPPA | HYA 170 | HYDRA |
| 10:10:36.0 | -12.21'00" | 3.6 | 1.01 | LAMBDA | HYA 46 | HYDRA |
| 10:26:06.0 | -16.50'00" | 3.8 | 1.48 | MU | HYA 59 | HYDRA |

407-001

| | | | | | |
|---|---|---|---|---|---|
| 10:49:36.0 | -16.12'00" | 3.1 | 1.25 | NU | HYA | 39 | HYDRA |
| 11:40:12.0 | -34.45'00" | 4.7 | -0.07 | OMICRON | HYA | 9999 | HYDRA |
| 14:06:24.0 | -26.41'00" | 3.3 | 1.12 | PI | HYA | 47 | HYDRA |
| 13:29:42.0 | -23.17'00" | 5.0 | 1.60 | R | HYA | 9999 | HYDRA |
| 8:48:24.0 | +05.50'00" | 4.4 | -0.04 | RHO | HYA | 57 | HYDRA |
| 8:38:48.0 | +03.20'00" | 4.4 | 1.21 | SIGMA | HYA | 75 | HYDRA |
| 9:32:00.0 | -01.11'00" | 4.6 | 0.10 | TA2 | HYA | 82 | HYDRA |
| 9:14:24.0 | +02.19'00" | 3.9 | -0.06 | THETA | HYA | 45 | HYDRA |
| 9:51:30.0 | -14.51'00" | 4.1 | 0.92 | UP1 | HYA | 58 | HYDRA |
| 10:05:06.0 | -13.04'00" | 4.6 | -0.09 | UP2 | HYA | 140 | HYDRA |
| 11:33:00.0 | -31.51'00" | 3.5 | 0.94 | XI | HYA | 44 | HYDRA |
| 8:55:24.0 | +05.57'00" | 3.1 | 1.00 | ZETA | HYA | 38 | HYDRA |
| 8:46:24.0 | -13.33'00" | 4.3 | 0.90 | 12 | HYA | 64 | HYDRA |
| 8:49:24.0 | -03.27'00" | 5.3 | -0.09 | 14 | HYA | 9999 | HYDRA |
| 10:34:00.0 | -23.45'00" | 5.1 | 1.60 | 44 | HYA | 93 | HYDRA |
| 13:58:30.0 | -24.58'00" | 5.2 | -0.10 | 47 | HYA | 9999 | HYDRA |
| 14:28:12.0 | -29.30'00" | 5.0 | -0.07 | 52 | HYA | 130 | HYDRA |
| 14:47:42.0 | -26.05'00" | 5.2 | 0.94 | 56 | HYA | 89 | HYDRA |
| 14:50:18.0 | -27.58'00" | 4.4 | 1.40 | 58 | HYA | 88 | HYDRA |
| 8:40:00.0 | -12.29'00" | 5.0 | 1.42 | 6 | HYA | 110 | HYDRA |
| 1:58:48.0 | -61.34'00" | 2.9 | 0.28 | ALPHA | HYI | 11 | HYDRUS |
| 0:25:48.0 | -77.15'00" | 2.8 | 0.62 | BETA | HYI | 6 | HYDRUS |
| 2:21:48.0 | -68.40'00" | 4.1 | 0.03 | DELTA | HYI | 35 | HYDRUS |
| 2:39:36.0 | -68.16'00" | 4.1 | -0.06 | EPSILON | HYI | 91 | HYDRUS |
| 3:47:12.0 | -74.14'00" | 3.2 | 1.62 | GAMMA | HYI | 49 | HYDRUS |
| 2:22:54.0 | -73.39'00" | 5.0 | 1.09 | KAPPA | HYI | 77 | HYDRUS |
| 0:48:36.0 | -74.55'00" | 5.1 | 1.37 | LAMBDA | HYI | 130 | HYDRUS |

| | | | | | |
|---|---|---|---|---|---|
| 2:31:42.0 | −79.07′00″ | 5.3 | 0.98 | MU | HYI | 78 | HYDRUS |
| 1:54:54.0 | −67.39′00″ | 4.7 | 0.95 | NU2 | HYI | 69 | HYDRUS |
| 3:02:18.0 | −71.54′00″ | 5.5 | −0.14 | THETA | HYI | 9999 | HYDRUS |
| 20:37:36.0 | −47.17′00″ | 3.1 | 1.00 | ALPHA | IND | 38 | INDUS |
| 20:54:48.0 | −58.27′00″ | 3.7 | 1.25 | BETA | IND | 37 | INDUS |
| 21:57:54.0 | −54.60′00″ | 4.4 | 0.28 | DELTA | IND | 35 | INDUS |
| 22:03:24.0 | −56.47′00″ | 4.7 | 1.06 | EPSILON | IND | 3 | INDUS |
| 20:44:00.0 | −51.55′00″ | 4.5 | 0.27 | ETA | IND | 26 | INDUS |
| 20:51:30.0 | −51.37′00″ | 5.1 | 1.13 | IOTA | IND | 75 | INDUS |
| 21:05:12.0 | −54.44′00″ | 5.2 | 1.21 | MU | IND | 67 | INDUS |
| 21:50:48.0 | −69.38′00″ | 5.5 | 1.37 | OMICRON | IND | 150 | INDUS |
| 21:19:54.0 | −53.27′00″ | 4.4 | 0.19 | THETA | IND | 28 | INDUS |
| 22:31:18.0 | +50.17′00″ | 3.8 | 0.01 | ALPHA | LAC | 30 | LACERTA |
| 22:23:36.0 | +52.14′00″ | 4.4 | 1.02 | BETA | LAC | 66 | LACERTA |
| 22:16:00.0 | +37.45′00″ | 4.1 | 1.46 | 1 | LAC | 100 | LACERTA |
| 22:39:18.0 | +39.03′00″ | 4.9 | −0.20 | 10 | LAC | 780 | LACERTA |
| 22:40:30.0 | +44.17′00″ | 4.5 | 1.33 | 11 | LAC | 84 | LACERTA |
| 22:44:06.0 | +41.49′00″ | 5.1 | 0.96 | 13 | LAC | 95 | LACERTA |
| 22:21:00.0 | +46.32′00″ | 4.6 | −0.10 | 2 | LAC | 150 | LACERTA |
| 22:24:30.0 | +49.29′00″ | 4.6 | 0.09 | 4 | LAC | 1500 | LACERTA |
| 22:29:30.0 | +47.42′00″ | 4.4 | 1.68 | 5 | LAC | 230 | LACERTA |
| 22:30:30.0 | +43.07′00″ | 4.5 | −0.09 | 6 | LAC | 280 | LACERTA |
| 22:37:24.0 | +51.33′00″ | 4.6 | 0.24 | 9 | LAC | 41 | LACERTA |
| 10:08:24.0 | +11.58′00″ | 1.4 | −0.11 | ALPHA | LEO | 26 | LEO |
| 11:49:06.0 | +14.34′00″ | 2.1 | 0.09 | BETA | LEO | 12 | LEO |
| 11:05:00.0 | +07.20′00″ | 4.6 | 0.33 | CHI | LEO | 47 | LEO |
| 11:14:06.0 | +20.31′00″ | 2.6 | 0.12 | DELTA | LEO | 16 | LEO |

407-001

| | | | | | |
|---|---|---|---|---|---|
| 9:45:54.0 | +23.46'00" | 3.0 | 0.80 | EPSILON | LEO | 95 | LEO |
| 10:07:18.0 | +16.46'00" | 3.5 | -0.03 | ETA | LEO | 560 | LEO |
| 10:20:00.0 | +19.51'00" | 2.0 | 1.15 | GAMMA | LEO | 9999 | LEO@ |
| 11:23:54.0 | +10.32'00" | 3.9 | 0.41 | IOTA | LEO | 24 | LEO |
| 9:24:42.0 | +26.11'00" | 4.5 | 1.23 | KAPPA | LEO | 73 | LEO |
| 9:31:42.0 | +22.58'00" | 4.3 | 1.54 | LAMBDA | LEO | 79 | LEO |
| 9:52:48.0 | +26.00'00" | 3.9 | 1.22 | MU | LEO | 55 | LEO |
| 9:41:06.0 | +09.54'00" | 3.5 | 0.49 | OMICRON | LEO | 17 | LEO |
| 11:16:42.0 | -03.39'00" | 4.5 | 0.21 | PHI | LEO | 39 | LEO |
| 10:00:12.0 | +08.03'00" | 4.7 | 1.60 | PI | LEO | 110 | LEO |
| 9:43:42.0 | +14.01'00" | 5.4 | 1.63 | PSI | LEO | 140 | LEO |
| 9:47:36.0 | +11.26'00" | 4.4 | 2.20 | R | LEO | 19 | LEO@ |
| 10:32:48.0 | +09.18'00" | 3.9 | -0.14 | RHO | LEO | 770 | LEO |
| 11:21:06.0 | +06.02'00" | 4.1 | -0.06 | SIGMA | LEO | 59 | LEO |
| 11:27:54.0 | +02.51'00" | 5.0 | 1.00 | TAU | LEO | 150 | LEO |
| 11:14:12.0 | +15.26'00" | 3.3 | -0.01 | THETA | LEO | 24 | LEO |
| 11:36:54.0 | -00.49'00" | 4.3 | 1.00 | UPSILON | LEO | 64 | LEO |
| 9:31:54.0 | +11.18'00" | 5.0 | 1.05 | XI | LEO | 84 | LEO |
| 10:16:42.0 | +23.25'00" | 3.4 | 0.31 | ZETA | LEO | 36 | LEO |
| 10:07:54.0 | +09.60'00" | 4.4 | 1.45 | 31 | LEO | 81 | LEO |
| 10:49:18.0 | +10.33'00" | 5.3 | 0.01 | 53 | LEO | 59 | LEO |
| 10:55:36.0 | +24.45'00" | 4.3 | 0.02 | 54 | LEO | 42 | LEO |
| 11:00:36.0 | +03.37'00" | 4.8 | 1.16 | 58 | LEO | 83 | LEO |
| 11:02:18.0 | +20.11'00" | 4.4 | 0.05 | 60 | LEO | 22 | LEO |
| 11:48:00.0 | +20.13'00" | 4.5 | 0.55 | 93 | LEO | 22 | LEO |
| 11:55:42.0 | +15.39'00" | 5.5 | 0.11 | 95 | LEO | 56 | LEO |
| 5:32:42.0 | -17.49'00" | 2.6 | 0.21 | ALPHA | LEP | 290 | LEPUS |

| | | | | | |
|---|---|---|---|---|---|
| 5:28:12.0 | -20.46'00" | 2.8 | 0.82 | BETA | LEP 97 | LEPUS |
| 5:51:18.0 | -20.53'00" | 3.8 | 0.99 | DELTA | LEP 48 | LEPUS |
| 5:05:30.0 | -22.22'00" | 3.2 | 1.46 | EPSILON | LEP 50 | LEPUS |
| 5:56:24.0 | -14.10'00" | 3.7 | 0.33 | ETA | LEP 20 | LEPUS |
| 16:00:06.0 | -38.24'00" | 3.4 | -0.22 | ETA | LEP 150 | LUPUSθ |
| 5:44:30.0 | -22.27'00" | 3.6 | 0.47 | GAMMA | LEP 8 | LEPUS |
| 5:12:18.0 | -11.52'00" | 4.5 | -0.10 | IOTA | LEP 85 | LEPUS |
| 5:13:12.0 | -12.56'00" | 4.4 | -0.10 | KAPPA | LEP 130 | LEPUS |
| 5:19:36.0 | -13.11'00" | 4.3 | -0.26 | LAMBDA | LEP 25 | LEPUS |
| 5:12:54.0 | -16.12'00" | 3.3 | -0.11 | MU | LEP 66 | LEPUS |
| 6:05:00.0 | -16.29'00" | 4.9 | 0.24 | 17 | LEP 15 | LEPUSθ |
| 6:06:12.0 | -14.56'00" | 4.7 | 0.05 | THETA | LEP 18 | LEPUS |
| 5:47:00.0 | -14.49'00" | 3.6 | 0.10 | ZETA | LEP 24 | LEPUS |
| 14:50:42.0 | -15.60'00" | 5.2 | 0.41 | AL1 | LIB 9999 | LIBRA |
| 14:50:54.0 | -16.03'00" | 2.8 | 0.15 | AL2 | LIB 22 | LIBRA |
| 15:17:00.0 | -09.23'00" | 2.6 | -0.11 | BETA | LIB 37 | LIBRA |
| 15:01:00.0 | -08.31'00" | 4.9 | 0.00 | DELTA | LIB 73 | LIBRA |
| 15:35:30.0 | -14.47'00" | 3.9 | 1.01 | GAMMA | LIB 23 | LIBRA |
| 15:12:12.0 | -19.47'00" | 4.5 | -0.08 | IOTA | LIB 93 | LIBRA |
| 15:41:54.0 | -19.41'00" | 4.7 | 1.57 | KAPPA | LIB 91 | LIBRA |
| 15:53:18.0 | -20.10'00" | 5.0 | -0.01 | LAMBDA | LIB 180 | LIBRA |
| 15:04:06.0 | -25.17'00" | 3.3 | 1.70 | SIGMA | LIB 51 | LIBRA |
| 15:38:42.0 | -29.47'00" | 3.7 | -0.17 | TAU | LIB 100 | LIBRA |
| 15:53:48.0 | -16.44'00" | 4.2 | 1.02 | THETA | LIB 25 | LIBRA |
| 15:37:00.0 | -28.08'00" | 3.6 | 1.38 | UPSILON | LIB 39 | LIBRA |
| 14:56:48.0 | -11.25'00" | 5.5 | 1.49 | XI2 | LIB 130 | LIBRA |
| 14:57:12.0 | -04.21'00" | 4.5 | 0.32 | 16 | LIB 31 | LIBRA |

| | | | | | |
|---|---|---|---|---|---|
| 15:34:12.0 | -10.04'00" | 4.6 | 1.01 | 37 | LIB 57 LIBRA |
| 15:58:12.0 | -14.17'00" | 4.9 | -0.10 | 48 | LIB 9999 LIBRA |
| 16:00:18.0 | -16.32'00" | 5.5 | 0.52 | 49 | LIB 20 LIBRA |
| 10:27:54.0 | +36.42'00" | 4.2 | 0.90 | BETA | LMI 31 LEO MINOR |
| 9:34:12.0 | +36.24'00" | 4.6 | 0.92 | 10 | LMI 71 LEO MINOR |
| 9:57:42.0 | +41.03'00" | 5.1 | 0.46 | 19 | LMI 23 LEO MINOR |
| 10:01:00.0 | +31.55'00" | 5.4 | 0.66 | 20 | LMI 14 LEO MINOR |
| 10:07:24.0 | +35.15'00" | 4.5 | 0.18 | 21 | LMI 26 LEO MINOR |
| 10:25:54.0 | +33.48'00" | 4.7 | 0.25 | 30 | LMI 27 LEO MINOR |
| 10:38:42.0 | +31.59'00" | 4.7 | 0.81 | 37 | LMI 230 LEO MINOR |
| 10:43:24.0 | +23.11'00" | 5.1 | 0.04 | 41 | LMI 55 LEO MINOR |
| 10:45:54.0 | +30.41'00" | 5.2 | -0.06 | 42 | LMI 100 LEO MINOR |
| 10:53:18.0 | +34.13'00" | 3.8 | 1.04 | 46 | LMI 23 LEO MINOR |
| 15:38:06.0 | -42.34'00" | 4.3 | 1.42 | OMEGA | LUP 69 LUPUS@ |
| 15:41:12.0 | -44.40'00" | 4.6 | 0.40 | g | LUP 22 LUPUS@ |
| 14:41:54.0 | -47.23'00" | 2.3 | -0.20 | ALPHA | LUP 210 LUPUS |
| 14:58:30.0 | -43.08'00" | 2.7 | -0.22 | BETA | LUP 110 LUPUS |
| 15:51:00.0 | -33.38'00" | 4.0 | -0.04 | CHI | LUP 68 LUPUS |
| 15:21:24.0 | -40.39'00" | 3.2 | -0.22 | DELTA | LUP 180 LUPUS |
| 15:22:42.0 | -44.41'00" | 3.4 | -0.18 | EPSILON | LUP 140 LUPUS |
| 15:35:06.0 | -41.10'00" | 2.8 | -0.20 | GAMMA | LUP 79 LUPUS |
| 14:19:24.0 | -46.03'00" | 3.6 | -0.18 | IOTA | LUP 110 LUPUS |
| 15:11:54.0 | -48.44'00" | 3.9 | -0.05 | KAPPA | LUP 39 LUPUS |
| 15:08:48.0 | -45.17'00" | 4.1 | -0.18 | LAMBDA | LUP 190 LUPUS |
| 15:18:30.0 | -47.53'00" | 4.3 | -0.08 | MU | LUP 77 LUPUS |
| 14:51:36.0 | -43.35'00" | 4.3 | -0.15 | OMICRON | LUP 180 LUPUS |
| 15:21:48.0 | -36.16'00" | 3.6 | 1.54 | PHI1 | LUP 56 LUPUS |

| | | | | | |
|---|---|---|---|---|---|
| 15:23:12.0 | -36.52'00" | 4.5 | -0.15 | PH2 | LUP 220 LUPUS |
| 15:05:06.0 | -47.03'00" | 4.1 | -0.14 | PI | LUP 130 LUPUS |
| 14:37:54.0 | -49.26'00" | 4.1 | -0.15 | RHO | LUP 110 LUPUS |
| 14:32:36.0 | -50.27'00" | 4.4 | -0.19 | SIGMA | LUP 130 LUPUS |
| 14:26:06.0 | -45.13'00" | 4.6 | -0.15 | TA1 | LUP 310 LUPUS |
| 14:26:12.0 | -45.23'00" | 4.4 | 0.43 | TA2 | LUP 28 LUPUS |
| 16:06:36.0 | -36.48'00" | 4.2 | -0.17 | THETA | LUP 200 LUPUS |
| 15:12:18.0 | -52.06'00" | 3.4 | 0.92 | ZETA | LUP 42 LUPUS |
| 15:14:36.0 | -31.31'00" | 4.9 | 0.37 | 1 | LUP 1800 LUPUS |
| 15:17:48.0 | -30.09'00" | 4.3 | 1.10 | 2 | LUP 55 LUPUS |
| 9:21:06.0 | +34.24'00" | 3.1 | 1.55 | ALPHA | LYN 51 LYNX |
| 6:57:18.0 | +58.25'00" | 4.4 | 0.85 | 15 | LYN 32 LYNX |
| 6:19:36.0 | +59.01'00" | 4.5 | 0.01 | 2 | LYN 35 LYNX |
| 7:26:42.0 | +49.13'00" | 4.6 | -0.02 | 21 | LYN 74 LYNX |
| 7:43:00.0 | +58.43'00" | 5.0 | 0.08 | 24 | LYN 100 LYNX |
| 8:08:30.0 | +51.30'00" | 4.8 | 0.05 | 27 | LYN 60 LYNX |
| 8:22:48.0 | +43.11'00" | 4.3 | 1.55 | 31 | LYN 76 LYNX |
| 8:41:00.0 | +45.50'00" | 5.4 | 0.99 | 34 | LYN 25 LYNX |
| 9:13:48.0 | +43.13'00" | 5.3 | -0.14 | 36 | LYN 9999 LYNX |
| 9:18:48.0 | +36.48'00" | 3.8 | 0.08 | 38 | LYN 27 LYNX |
| 18:36:54.0 | +38.47'00" | 0.0 | 0.00 | ALPHA | LYR 8 LYRA |
| 18:50:06.0 | +33.22'00" | 3.5 | 0.00 | BETA | LYR 92 LYRA |
| 18:54:30.0 | +36.54'00" | 4.3 | 1.68 | DE2 | LYR 220 LYRA |
| 18:44:18.0 | +39.40'00" | 4.7 | 0.16 | EP1 | LYR 38 LYRA |
| 18:44:24.0 | +39.37'00" | 5.1 | 0.19 | EP2 | LYR 38 LYRAθ |
| 19:13:48.0 | +39.09'00" | 4.4 | -0.15 | ETA | LYR 270 LYRA |
| 18:58:54.0 | +32.41'00" | 3.2 | -0.05 | GAMMA | LYR 59 LYRA |

| | | | | | | |
|---|---|---|---|---|---|---|
| 19:07:18.0 | +36.06'00" | 5.3 | -0.11 | IOTA | LYR 180 | LYRA |
| 18:19:54.0 | +36.04'00" | 4.3 | 1.17 | KAPPA | LYR 77 | LYRA |
| 19:00:00.0 | +32.09'00" | 4.9 | 1.47 | LAMBDA | LYR 260 | LYRA |
| 18:55:18.0 | +43.57'00" | 4.0 | 1.59 | R | LYR 40 | LYRA |
| 19:16:24.0 | +38.08'00" | 4.4 | 1.26 | THETA | LYR 170 | LYRA |
| 18:44:48.0 | +37.36'00" | 4.4 | 0.19 | ZE1 | LYR 9999 | LYRA |
| 6:10:12.0 | -74.45'00" | 5.1 | 0.72 | ALPHA | MEN 9 | MENSA |
| 5:02:42.0 | -71.19'00" | 5.3 | 1.00 | BETA | MEN 17 | MENSA |
| 4:55:12.0 | -74.56'00" | 5.5 | 1.52 | ETA | MEN 140 | MENSA |
| 5:31:54.0 | -76.20'00" | 5.2 | 1.13 | GAMMA | MEN 130 | MENSA |
| 20:50:00.0 | -33.47'00" | 4.9 | 1.00 | ALPHA | MIC 380 | MICROSCOPIUM |
| 20:52:00.0 | -33.11'00" | 6.0 | 0.03 | BETA | MIC 85 | MICROSCOPIUM |
| 21:17:54.0 | -32.10'00" | 4.7 | 0.06 | EPSILON | MIC 14 | MICROSCOPIUM |
| 21:01:18.0 | -32.15'00" | 4.7 | 0.89 | GAMMA | MIC 70 | MICROSCOPIUM |
| 20:48:30.0 | -43.59'00" | 5.1 | 0.35 | IOTA | MIC 28 | MICROSCOPIUM |
| 21:20:48.0 | -40.49'00" | 4.8 | 0.02 | TH1 | MIC 21 | MICROSCOPIUM |
| 21:03:00.0 | -38.38'00" | 5.3 | 0.50 | ZETA | MIC 35 | MICROSCOPIUM |
| 7:41:12.0 | -09.33'00" | 3.9 | 1.02 | ALPHA | MON 54 | MONOCEROS |
| 6:28:48.0 | -07.02'00" | 4.2 | -0.10 | BETA | MON 220 | MONOCEROS@ |
| 7:11:54.0 | -00.30'00" | 4.2 | -0.01 | DELTA | MON 64 | MONOCEROS |
| 6:23:48.0 | +04.36'00" | 4.3 | 0.20 | EPSILON | MON 54 | MONOCEROS@ |
| 6:14:54.0 | -06.16'00" | 4.0 | 1.32 | GAMMA | MON 66 | MONOCEROS |
| 8:08:36.0 | -02.59'00" | 4.3 | 0.97 | ZETA | MON 560 | MONOCEROS |
| 6:28:00.0 | -04.46'00" | 5.1 | -0.18 | 10 | MON 320 | MONOCEROS |
| 6:32:54.0 | +07.20'00" | 4.5 | 0.00 | 13 | MON 860 | MONOCEROS |
| 6:41:00.0 | +09.54'00" | 4.7 | -0.25 | 15 | MON 22 | MONOCEROS |
| 6:47:54.0 | +02.25'00" | 4.5 | 1.11 | 18 | MON 59 | MONOCEROS |

407-001

| | | | | | |
|---|---|---|---|---|---|
| 7:10:12.0 | -04.14'00" | 4.9 | 1.03 | 20 | MON 87 MONOCEROS |
| 7:37:18.0 | -04.07'00" | 5.1 | 0.44 | 25 | MON 53 MONOCEROS |
| 7:59:42.0 | -03.41'00" | 4.9 | 1.21 | 27 | MON 97 MONOCEROS |
| 8:01:12.0 | -01.24'00" | 4.7 | 1.49 | 28 | MON 88 MONOCEROS |
| 6:19:42.0 | -07.49'00" | 5.3 | -0.19 | 7 | MON 360 MONOCEROS |
| 12:37:12.0 | -69.08'00" | 2.7 | -0.20 | ALPHA | MUS 100 MUSCA |
| 12:46:18.0 | -68.06'00" | 3.1 | -0.18 | BETA | MUS 89 MUSCA |
| 13:02:18.0 | -71.33'00" | 3.6 | 1.18 | DELTA | MUS 54 MUSCA |
| 12:17:36.0 | -67.58'00" | 4.1 | 1.58 | EPSILON | MUS 12 MUSCA |
| 13:15:12.0 | -67.54'00" | 4.8 | -0.08 | ETA | MUS 100 MUSCA |
| 12:32:30.0 | -72.08'00" | 3.9 | -0.15 | GAMMA | MUS 59 MUSCA |
| 11:45:36.0 | -66.44'00" | 3.6 | 0.16 | LAMBDA | MUS 16 MUSCA |
| 16:06:30.0 | -45.10'00" | 4.7 | 0.23 | DELTA | NOR 18 NORMA |
| 16:27:12.0 | -47.33'00" | 4.5 | -0.07 | EPSILON | NOR 150 NORMA |
| 16:03:12.0 | -49.14'00" | 4.7 | 0.92 | ETA | NOR 64 NORMA |
| 16:19:48.0 | -50.09'00" | 4.0 | 1.08 | GA2 | NOR 40 NORMA |
| 16:13:30.0 | -54.38'00" | 4.9 | 1.04 | KAPPA | NOR 61 NORMA |
| 21:04:42.0 | -77.01'00" | 5.2 | 0.49 | ALPHA | OCT 70 OCTANS |
| 22:46:06.0 | -81.23'00" | 4.2 | 0.20 | BETA | OCT 20 OCTANS |
| 18:54:42.0 | -87.36'00" | 5.3 | 1.28 | CHI | OCT 330 OCTANS |
| 14:26:54.0 | -83.40'00" | 4.3 | 1.31 | DELTA | OCT 60 OCTANS |
| 22:20:00.0 | -80.26'00" | 5.1 | 1.47 | EPSILON | OCT 280 OCTANS |
| 12:55:00.0 | -85.07'00" | 5.5 | 1.02 | IOTA | OCT 110 OCTANS |
| 21:41:30.0 | -77.23'00" | 3.8 | 1.00 | NU | OCT 32 OCTANS |
| 21:08:42.0 | -88.57'00" | 5.5 | 0.27 | SIGMA | OCT 9999 OCTANS |
| 23:28:06.0 | -87.29'00" | 5.5 | 1.27 | TAU | OCT 110 OCTANS |
| 0:01:36.0 | -77.04'00" | 4.8 | 1.27 | THETA | OCT 78 OCTANS |

| | | | | |
|---|---|---|---|---|
| 8:56:42.0 | −85.40′00″ | 5.4 | 0.31 ZETA | OCT 92 OCTANS |
| 17:34:54.0 | +12.34′00″ | 2.1 | 0.15 ALPHA | OPH 19 OPHIUCHUS |
| 17:43:30.0 | +04.34′00″ | 2.8 | 1.16 BETA | OPH 37 OPHIUCHUS |
| 16:27:00.0 | −18.27′00″ | 4.4 | 0.28 CHI | OPH 150 OPHIUCHUS |
| 16:24:06.0 | −20.02′00″ | 4.5 | 1.01 PSI | OPH 72 OPHIUCHUS@ |
| 16:14:18.0 | −03.42′00″ | 2.7 | 1.58 DELTA | OPH 43 OPHIUCHUS |
| 16:18:18.0 | −04.42′00″ | 3.2 | 0.96 EPSILON | OPH 32 OPHIUCHUS |
| 17:10:24.0 | −15.43′00″ | 2.4 | 0.06 ETA | OPH 18 OPHIUCHUS |
| 17:47:54.0 | +02.42′00″ | 3.8 | 0.04 GAMMA | OPH 35 OPHIUCHUS |
| 16:54:00.0 | +10.10′00″ | 4.4 | −0.08 IOTA | OPH 99 OPHIUCHUS |
| 16:57:42.0 | +09.23′00″ | 3.2 | 1.15 KAPPA | OPH 36 OPHIUCHUS |
| 16:30:54.0 | +01.59′00″ | 3.8 | 0.01 LAMBDA | OPH 33 OPHIUCHUS |
| 17:37:48.0 | −08.07′00″ | 4.6 | 0.11 MU | OPH 73 OPHIUCHUS |
| 17:59:00.0 | −09.46′00″ | 3.3 | 0.99 NU | OPH 42 OPHIUCHUS |
| 16:32:06.0 | −21.28′00″ | 4.5 | 0.13 OMEGA | OPH 19 OPHIUCHUS |
| 16:31:06.0 | −16.37′00″ | 4.3 | 0.92 PHI | OPH 63 OPHIUCHUS |
| 16:25:36.0 | −23.27′00″ | 4.7 | 0.24 RHO | OPH 230 OPHIUCHUS |
| 17:26:30.0 | +04.08′00″ | 4.3 | 1.50 SIGMA | OPH 190 OPHIUCHUS |
| 17:22:00.0 | −24.60′00″ | 3.3 | −0.22 THETA | OPH 180 OPHIUCHUS |
| 17:21:00.0 | −21.07′00″ | 4.4 | 0.39 XI | OPH 19 OPHIUCHUS |
| 16:37:12.0 | −10.34′00″ | 2.6 | 0.02 ZETA | OPH 170 OPHIUCHUS |
| 16:49:48.0 | −10.47′00″ | 4.7 | 0.47 20 | OPH 56 OPHIUCHUS |
| 17:01:06.0 | −04.13′00″ | 4.8 | 1.48 30 | OPH 93 OPHIUCHUS |
| 17:15:18.0 | −26.36′00″ | 4.5 | 0.86 36 | OPH 5 OPHIUCHUS |
| 17:26:24.0 | −24.11′00″ | 4.2 | 0.28 44 | OPH 25 OPHIUCHUS |
| 17:27:24.0 | −29.52′00″ | 4.3 | 0.40 45 | OPH 27 OPHIUCHUS |
| 17:43:24.0 | −21.41′00″ | 4.9 | 0.47 58 | OPH 20 OPHIUCHUS |

| | | | | | |
|---|---|---|---|---|---|
| 18:00:36.0 | +02.56'00" | 4.0 | 0.20 | 67 | OPH 740 OPHIUCHUS |
| 18:01:48.0 | +01.18'00" | 4.5 | 0.02 | 68 | OPH 45 OPHIUCHUS |
| 18:05:30.0 | +02.30'00" | 4.0 | 0.86 | 70 | OPH 5 OPHIUCHUS |
| 18:07:18.0 | +09.34'00" | 3.7 | 0.12 | 72 | OPH 28 OPHIUCHUS |
| 18:20:54.0 | +03.23'00" | 4.9 | 0.91 | 74 | OPH 82 OPHIUCHUS |
| 5:55:12.0 | +07.24'00" | 0.5 | 1.85 | ALPHA | ORI 95 ORION |
| 5:14:30.0 | -08.12'00" | 0.1 | -0.03 | BETA | ORI 280 ORION |
| 5:54:24.0 | +20.17'00" | 4.4 | 0.59 | CH1 | ORI 10 ORION |
| 6:03:54.0 | +20.08'00" | 4.6 | 0.28 | CH2 | ORI 1100 ORION |
| 5:32:00.0 | -00.18'00" | 2.2 | -0.22 | DELTA | ORI 720 ORION |
| 5:36:12.0 | -01.12'00" | 1.7 | -0.19 | EPSILON | ORI 370 ORION |
| 5:24:30.0 | -02.24'00" | 3.4 | -0.17 | ETA | ORI 230 ORION |
| 5:25:06.0 | +06.21'00" | 1.6 | -0.22 | GAMMA | ORI 110 ORION |
| 5:35:24.0 | -05.55'00" | 2.8 | -0.23 | IOTA | ORI 570 ORION |
| 5:47:48.0 | -09.40'00" | 2.1 | -0.17 | KAPPA | ORI 21 ORION |
| 5:35:06.0 | +09.56'00" | 3.4 | -0.18 | LAMBDA | ORI 9999 ORION |
| 6:02:24.0 | +09.39'00" | 4.1 | 0.15 | MU | ORI 37 ORION |
| 6:07:36.0 | +14.46'00" | 4.4 | -0.17 | NU | ORI 170 ORION |
| 4:52:30.0 | +14.15'00" | 4.7 | 1.84 | OI1 | ORI 32 ORION |
| 4:56:24.0 | +13.31'00" | 4.1 | 1.15 | OI2 | ORI 68 ORION |
| 5:39:12.0 | +04.07'00" | 4.6 | -0.11 | OMEGA | ORI 310 ORION |
| 5:34:48.0 | +09.29'00" | 4.4 | -0.16 | PH1 | ORI 570 ORION |
| 5:36:54.0 | +09.17'00" | 4.1 | 0.95 | PH2 | ORI 60 ORION |
| 4:54:54.0 | +10.09'00" | 4.7 | 0.09 | PI1 | ORI 9999 ORION |
| 4:50:36.0 | +08.54'00" | 4.4 | 0.01 | PI2 | ORI 55 ORION |
| 4:49:48.0 | +06.58'00" | 3.2 | 0.55 | PI3 | ORI 8 ORION |
| 4:51:12.0 | +05.36'00" | 3.7 | -0.17 | PI4 | ORI 280 ORION |

| | | | | | |
|---|---|---|---|---|---|
| 4:54:18.0 | +02.26'00" | 3.7 | -0.18 | PI5 ORI | 290 ORION |
| 4:58:30.0 | +01.43'00" | 4.5 | 1.40 | PI6 ORI | 190 ORION |
| 5:13:18.0 | +02.52'00" | 4.5 | 1.19 | RHO ORI | 86 ORION |
| 5:38:42.0 | -02.36'00" | 3.8 | -0.24 | SIGMA ORI | 550 ORION |
| 5:17:36.0 | -06.51'00" | 3.6 | -0.11 | TAU ORI | 130 ORION |
| 5:35:18.0 | -05.23'00" | 4.5 | 0.03 | TH1 ORI | 9999 ORION |
| 5:35:24.0 | -05.25'00" | 5.1 | -0.08 | TH2 ORI | 800 ORION |
| 6:11:54.0 | +14.13'00" | 4.5 | -0.18 | XI ORI | 170 ORION |
| 5:40:48.0 | -01.57'00" | 1.8 | -0.21 | ZETA ORI | 340 ORION |
| 5:04:36.0 | +15.24'00" | 4.7 | -0.06 | 11 ORI | 26 ORION |
| 5:09:18.0 | +09.50'00" | 5.4 | 0.24 | 16 ORI | 20 ORION |
| 5:21:48.0 | -00.23'00" | 4.7 | -0.17 | 22 ORI | 340 ORION |
| 5:23:54.0 | -07.48'00" | 4.1 | 0.96 | 29 ORI | 58 ORION |
| 5:30:48.0 | +05.57'00" | 4.2 | -0.14 | 32 ORI | 150 ORION |
| 5:35:24.0 | -04.50'00" | 4.6 | -0.19 | 42 ORI | 440 ORION |
| 5:35:42.0 | -04.51'00" | 5.3 | 0.24 | 45 ORI | 86 ORION |
| 5:58:48.0 | +00.33'00" | 5.2 | 0.01 | 60 ORI | 40 ORION |
| 6:16:24.0 | +12.16'00" | 5.0 | 0.42 | 74 ORI | 28 ORION |
| 20:25:36.0 | -56.44'00" | 1.9 | -0.20 | ALPHA PAV | 71 PAVO |
| 20:45:00.0 | -66.12'00" | 3.4 | 0.16 | BETA PAV | 28 PAVO |
| 20:08:42.0 | -66.11'00" | 3.6 | 0.76 | DELTA PAV | 6 PAVO |
| 20:00:36.0 | -72.55'00" | 4.0 | -0.03 | EPSILON PAV | 41 PAVO |
| 17:45:42.0 | -64.43'00" | 3.6 | 1.19 | ETA PAV | 45 PAVO |
| 21:26:24.0 | -65.22'00" | 4.2 | 0.49 | GAMMA PAV | 9 PAVO |
| 18:57:00.0 | -67.14'00" | 3.9 | 0.60 | KAPPA PAV | 23 PAVO |
| 18:52:12.0 | -62.11'00" | 4.2 | -0.14 | LAMBDA PAV | 350 PAVO |
| 21:13:18.0 | -70.08'00" | 5.0 | 1.58 | OMICRON PAV | 130 PAVO |

407-001

| RA | Dec | Mag | ? | Name | Const | # | Constellation |
|---|---|---|---|---|---|---|---|
| 18:08:36.0 | −63.40′00″ | 4.4 | 0.22 | PI | PAV | 17 | PAVO |
| 18:23:12.0 | −61.30′00″ | 4.4 | 1.48 | XI | PAV | 94 | PAVO |
| 18:43:00.0 | −71.26′00″ | 4.0 | 1.14 | ZETA | PAV | 66 | PAVO |
| 23:04:48.0 | +15.12′00″ | 2.5 | −0.04 | ALPHA | PEG | 31 | PEGASUS |
| 23:03:48.0 | +28.05′00″ | 2.4 | 1.67 | BETA | PEG | 54 | PEGASUS |
| 0:14:36.0 | +20.12′00″ | 4.8 | 1.57 | CHI | PEG | 120 | PEGASUS |
| 21:44:12.0 | +09.53′00″ | 2.4 | 1.53 | EPSILON | PEG | 160 | PEGASUS |
| 22:43:00.0 | +30.13′00″ | 2.9 | 0.86 | ETA | PEG | 53 | PEGASUS |
| 0:13:12.0 | +15.11′00″ | 2.8 | −0.23 | GAMMA | PEG | 150 | PEGASUS |
| 22:07:00.0 | +25.21′00″ | 3.8 | 0.44 | IOTA | PEG | 13 | PEGASUS |
| 21:44:36.0 | +25.39′00″ | 4.1 | 0.43 | KAPPA | PEG | 27 | PEGASUS |
| 22:46:30.0 | +23.34′00″ | 4.0 | 1.07 | LAMBDA | PEG | 33 | PEGASUS |
| 22:50:00.0 | +24.36′00″ | 3.5 | 0.93 | MU | PEG | 45 | PEGASUS |
| 23:52:30.0 | +19.07′00″ | 5.1 | 1.60 | PHI | PEG | 130 | PEGASUS |
| 23:57:48.0 | +25.08′00″ | 4.7 | 1.59 | PSI | PEG | 110 | PEGASUSΘ |
| 22:10:00.0 | +33.11′00″ | 4.3 | 0.46 | PI | PEG | 96 | PEGASUS |
| 23:20:36.0 | +23.44′00″ | 4.6 | 0.17 | TAU | PEG | 47 | PEGASUS |
| 22:10:12.0 | +06.12′00″ | 3.5 | 0.08 | THETA | PEG | 25 | PEGASUS |
| 23:25:24.0 | +23.24′00″ | 4.4 | 0.61 | UPSILON | PEG | 22 | PEGASUS |
| 22:46:42.0 | +12.10′00″ | 4.2 | 0.50 | XI | PEG | 14 | PEGASUS |
| 22:41:30.0 | +10.50′00″ | 3.4 | −0.09 | ZETA | PEG | 48 | PEGASUS |
| 21:22:06.0 | +19.48′00″ | 4.1 | 1.11 | 1 | PEG | 63 | PEGASUS |
| 21:49:48.0 | +30.10′00″ | 5.0 | −0.03 | 14 | PEG | 77 | PEGASUS |
| 21:53:06.0 | +25.56′00″ | 5.1 | −0.17 | 16 | PEG | 230 | PEGASUS |
| 21:29:54.0 | +23.38′00″ | 4.6 | 1.62 | 2 | PEG | 97 | PEGASUS |
| 22:21:30.0 | +12.12′00″ | 5.0 | −0.13 | 31 | PEG | 310 | PEGASUS |
| 22:30:00.0 | +32.34′00″ | 5.6 | −0.10 | 38 | PEG | 120 | PEGASUS |

407-001

| | | | | | | | |
|---|---|---|---|---|---|---|---|
| 21:37:48.0 | +19.19'19'00" | 5.5 | 0.30 | 5 | | PEG 55 | PEGASUS |
| 23:07:00.0 | +09.25'00" | 4.5 | 1.57 | 55 | | PEG 100 | PEGASUS |
| 23:11:42.0 | +08.43'00" | 5.2 | 0.13 | 59 | | PEG 51 | PEGASUS |
| 23:29:12.0 | +12.46'00" | 4.6 | 0.94 | 70 | | PEG 70 | PEGASUS |
| 23:52:36.0 | +10.57'00" | 5.3 | 0.10 | 82 | | PEG 54 | PEGASUS |
| 21:44:30.0 | +17.21'00" | 4.3 | 1.17 | 9 | | PEG 490 | PEGASUS |
| 3:24:18.0 | +49.52'00" | 1.8 | 0.08 | ALPHA | | PER 190 | PERSEUS |
| 3:08:12.0 | +40.57'00" | 2.1 | -0.05 | BETA | | PER 29 | PERSEUS |
| 3:42:54.0 | +47.47'00" | 3.0 | -0.13 | DELTA | | PER 100 | PERSEUS |
| 3:57:54.0 | +40.01'00" | 2.9 | -0.18 | EPSILON | | PER 40 | PERSEUS |
| 2:50:42.0 | +55.54'00" | 3.8 | 1.68 | ETA | | PER 250 | PERSEUS |
| 3:04:48.0 | +53.30'00" | 2.9 | 0.70 | GAMMA | | PER 34 | PERSEUS |
| 3:09:06.0 | +49.37'00" | 4.1 | 0.61 | IOTA | | PER 12 | PERSEUS |
| 3:09:30.0 | +44.51'00" | 3.8 | 0.98 | KAPPA | | PER 53 | PERSEUS |
| 4:06:36.0 | +50.21'00" | 4.3 | -0.01 | LAMBDA | | PER 62 | PERSEUS |
| 4:14:54.0 | +48.25'00" | 4.1 | 0.95 | MU | | PER 460 | PERSEUS |
| 3:45:12.0 | +42.35'00" | 3.8 | 0.42 | NU | | PER 140 | PERSEUS |
| 3:44:18.0 | +32.17'00" | 3.8 | 0.05 | OMICRON | | PER 310 | PERSEUS |
| 3:36:30.0 | +48.12'00" | 4.2 | -0.06 | PSI | | PER 9999 | PERSEUS@ |
| 1:43:42.0 | +50.41'00" | 4.1 | -0.04 | PHI | | PER 350 | PERSEUS |
| 3:05:12.0 | +38.50'00" | 3.4 | 1.65 | RHO | | PER 60 | PERSEUS |
| 3:30:36.0 | +47.60'00" | 4.4 | 1.37 | SIGMA | | PER 71 | PERSEUS |
| 2:54:18.0 | +52.46'00" | 4.0 | 0.74 | TAU | | PER 54 | PERSEUS |
| 2:44:12.0 | +49.14'00" | 4.1 | 0.49 | THETA | | PER 13 | PERSEUS |
| 3:59:00.0 | +35.47'00" | 4.0 | 0.01 | XI | | PER 46 | PERSEUS |
| 3:54:06.0 | +31.53'00" | 2.9 | 0.12 | ZETA | | PER 340 | PERSEUS |
| 2:44:06.0 | +44.18'00" | 5.4 | 0.90 | 14 | | PER 880 | PERSEUS |

407-001

| RA | Dec | Mag | Val | Greek | Abbr | Num | Constellation |
|---|---|---|---|---|---|---|---|
| 2:50:36.0 | +38.19'00" | 4.2 | 0.34 | 16 | PER | 50 | PERSEUS |
| 2:59:06.0 | +35.11'00" | 4.9 | 1.23 | 24 | PER | 92 | PERSEUS |
| 3:29:24.0 | +49.31'00" | 4.7 | -0.09 | 34 | PER | 210 | PERSEUS |
| 2:02:18.0 | +54.29'00" | 5.0 | -0.08 | 4 | PER | 110 | PERSEUS |
| 4:08:42.0 | +47.43'00" | 4.0 | -0.03 | 48 | PER | 140 | PERSEUS |
| 4:20:24.0 | +34.34'00" | 4.9 | 0.94 | 54 | PER | 84 | PERSEUS |
| 4:36:42.0 | +41.16'00" | 4.3 | 1.22 | 58 | PER | 160 | PERSEUS |
| 0:26:18.0 | -42.18'00" | 2.4 | 1.09 | ALPHA | PHE | 24 | PHOENIX |
| 1:06:06.0 | -46.43'00" | 3.3 | 0.89 | BETA | PHE | 40 | PHOENIX |
| 1:31:18.0 | -49.04'00" | 4.0 | 0.99 | DELTA | PHE | 28 | PHOENIX |
| 0:09:24.0 | -45.45'00" | 3.9 | 1.03 | EPSILON | PHE | 23 | PHOENIX |
| 0:43:24.0 | -57.28'00" | 4.4 | 0.00 | ETA | PHE | 71 | PHOENIX |
| 1:28:24.0 | -43.19'00" | 3.4 | 1.57 | GAMMA | PHE | 280 | PHOENIX |
| 23:35:06.0 | -42.37'00" | 4.7 | 0.08 | IOTA | PHE | 25 | PHOENIX |
| 0:26:12.0 | -43.41'00" | 3.9 | 0.17 | KAPPA | PHE | 19 | PHOENIX |
| 0:31:24.0 | -48.48'00" | 4.8 | 0.02 | LA1 | PHE | 52 | PHOENIX |
| 0:41:18.0 | -46.05'00" | 4.6 | 0.97 | MU | PHE | 70 | PHOENIX |
| 1:54:24.0 | -42.30'00" | 5.1 | -0.06 | PHI | PHE | 48 | PHOENIX |
| 23:58:54.0 | -52.45'00" | 5.1 | 1.13 | PI | PHE | 100 | PHOENIX |
| 1:53:36.0 | -46.18'00" | 4.4 | 1.59 | PSI | PHE | 96 | PHOENIX |
| 1:07:48.0 | -41.29'00" | 5.2 | 0.16 | UPSILON | PHE | 47 | PHOENIX |
| 1:08:24.0 | -55.15'00" | 3.9 | -0.08 | ZETA | PHE | 67 | PHOENIX |
| 6:48:12.0 | -61.56'00" | 3.3 | 0.21 | ALPHA | PIC | 16 | PICTOR |
| 5:47:18.0 | -51.04'00" | 3.9 | 0.17 | BETA | PIC | 24 | PICTOR |
| 6:10:18.0 | -54.58'00" | 4.8 | -0.23 | DELTA | PIC | 9999 | PICTOR |
| 5:05:00.0 | -49.35'00" | 5.0 | 1.49 | ETA | PIC | 130 | PICTOR |
| 5:49:48.0 | -56.10'00" | 4.5 | 1.10 | GAMMA | PIC | 80 | PICTOR |

| | | | | | |
|---|---|---|---|---|---|
| 5:19:24.0 | −50.36′00″ | 5.5 | 0.51 | ZETA | PIC 61 | PICTOR |
| 22:57:36.0 | −29.37′00″ | 1.2 | 0.09 | ALPHA | PSA 7 | PISCES AUSTRINUS |
| 22:31:30.0 | −32.21′00″ | 4.3 | 0.01 | BETA | PSA 53 | PISCES AUSTRINUS |
| 22:55:54.0 | −32.32′00″ | 4.2 | 0.97 | DELTA | PSA 49 | PISCES AUSTRINUS |
| 22:40:42.0 | −27.03′00″ | 4.2 | −0.11 | EPSILON | PSA 75 | PISCES AUSTRINUS |
| 22:52:30.0 | −32.53′00″ | 4.5 | −0.04 | GAMMA | PSA 59 | PISCES AUSTRINUS |
| 21:44:54.0 | −33.02′00″ | 4.3 | −0.05 | IOTA | PSA 42 | PISCES AUSTRINUS |
| 22:14:18.0 | −27.46′00″ | 5.4 | −0.16 | LAMBDA | PSA 210 | PISCES AUSTRINUS |
| 22:08:24.0 | −32.59′00″ | 4.5 | 0.05 | MU | PSA 42 | PISCES AUSTRINUS |
| 23:03:30.0 | −34.45′00″ | 5.1 | 0.29 | PI | PSA 48 | PISCES AUSTRINUS |
| 21:47:42.0 | −30.54′00″ | 5.0 | 0.04 | THETA | PSA 110 | PISCES AUSTRINUS |
| 2:02:00.0 | +02.46′00″ | 3.8 | 0.03 | ALPHA | PSC 30 | PISCES |
| 23:03:54.0 | +03.49′00″ | 4.5 | −0.12 | BETA | PSC 9999 | PISCES |
| 1:11:30.0 | +21.02′00″ | 4.7 | 1.03 | CHI | PSC 75 | PISCES |
| 0:48:42.0 | +07.35′00″ | 4.4 | 1.50 | DELTA | PSC 88 | PISCES |
| 1:02:54.0 | +07.53′00″ | 4.3 | 0.96 | EPSILON | PSC 66 | PISCES |
| 1:31:30.0 | +15.21′00″ | 3.6 | 0.97 | ETA | PSC 44 | PISCES |
| 23:17:12.0 | +03.17′00″ | 3.7 | 0.92 | GAMMA | PSC 48 | PISCES |
| 23:39:54.0 | +05.38′00″ | 4.1 | 0.51 | IOTA | PSC 13 | PISCES |
| 23:26:54.0 | +01.15′00″ | 4.9 | 0.23 | KAPPA | PSC 30 | PISCES |
| 23:42:00.0 | +01.47′00″ | 4.5 | 0.20 | LAMBDA | PSC 26 | PISCES |
| 1:41:24.0 | +05.29′00″ | 4.4 | 1.36 | NU | PSC 42 | PISCES |
| 23:59:18.0 | +06.52′00″ | 4.0 | 0.42 | OMEGA | PSC 26 | PISCES |
| 1:45:24.0 | +09.09′00″ | 4.3 | 0.96 | OMICRON | PSC 65 | PISCES |
| 1:13:42.0 | +24.35′00″ | 4.7 | 1.04 | PHI | PSC 74 | PISCES |
| 1:05:42.0 | +21.28′00″ | 4.7 | −0.05 | PSI | PSC 120 | PISCES@ |
| 1:11:42.0 | +30.05′00″ | 4.5 | 1.09 | TAU | PSC 29 | PISCES |

407-001

| | | | | | | |
|---|---|---|---|---|---|---|
| 23:28:00.0 | +06.23'00" | 4.3 | 1.07 | THETA | PSC 72 | PISCES |
| 1:19:30.0 | +27.16'00" | 4.8 | 0.03 | UPSILON | PSC 47 | PISCES |
| 1:53:36.0 | +03.11'00" | 4.6 | 0.94 | XI | PSC 77 | PISCES |
| 1:13:42.0 | +07.35'00" | 4.9 | 0.32 | ZETA | PSC 33 | PISCES |
| 23:47:54.0 | -02.46'00" | 5.5 | 0.94 | 20 | PSC 110 | PISCES |
| 23:58:42.0 | -03.33'00" | 4.9 | 0.93 | 27 | PSC 86 | PISCES |
| 0:02:00.0 | -06.01'00" | 4.4 | 1.63 | 30 | PSC 30 | PISCES |
| 0:05:18.0 | -05.42'00" | 4.6 | 1.04 | 33 | PSC 84 | PISCES |
| 0:20:36.0 | +08.11'00" | 5.4 | 1.34 | 41 | PSC 120 | PISCES |
| 0:49:00.0 | +16.56'00" | 5.1 | 0.51 | 64 | PSC 20 | PISCES |
| 23:20:18.0 | +05.23'00" | 5.1 | 1.20 | 7 | PSC 100 | PISCES |
| 1:17:48.0 | +03.37'00" | 5.2 | 0.07 | 89 | PSC 49 | PISCES |
| 1:26:42.0 | +19.14'00" | 5.5 | 1.11 | 94 | PSC 120 | PISCES |
| 8:11:24.0 | -39.37'00" | 4.5 | 1.62 | h 1 | PUP 850 | PUPPISθ |
| 8:14:00.0 | -40.21'00" | 4.4 | 1.17 | h 2 | PUP 81 | PUPPISθ |
| 7:35:24.0 | -28.22'00" | 4.6 | -0.12 | p | PUP 9999 | PUPPISθ |
| 6:37:48.0 | -43.12'00" | 3.2 | -0.11 | NU | PUP 75 | PUPPIS |
| 7:48:06.0 | -25.56'00" | 4.5 | -0.05 | OMICRON | PUP 390 | PUPPIS |
| 7:49:12.0 | -46.22'00" | 4.1 | -0.18 | P | PUP 820 | PUPPISθ |
| 7:17:06.0 | -37.06'00" | 2.7 | 1.62 | PI | PUP 40 | PUPPIS |
| 7:48:18.0 | -47.05'00" | 4.7 | 1.06 | Q | PUP 72 | PUPPISθ |
| 8:07:30.0 | -24.18'00" | 2.8 | 0.43 | RHO | PUP 92 | PUPPIS |
| 7:29:12.0 | -43.18'00" | 3.3 | 1.51 | SIGMA | PUP 51 | PUPPIS |
| 6:49:54.0 | -50.37'00" | 2.9 | 1.20 | TAU | PUP 25 | PUPPIS |
| 7:58:12.0 | -49.15'00" | 4.4 | -0.17 | V | PUP 470 | PUPPIS |
| 7:49:18.0 | -24.52'00" | 3.3 | 1.24 | XI | PUP 230 | PUPPIS |
| 8:03:36.0 | -40.00'00" | 2.3 | -0.26 | ZETA | PUP 9999 | PUPPIS |

| | | | | | | |
|---|---|---|---|---|---|---|
| 7:56:54.0 | -22.53'00" | 4.2 | 0.72 | 11 | PUP | 150 | PUPPIS |
| 8:09:00.0 | -19.15'00" | 4.4 | -0.15 | 16 | PUP | 130 | PUPPIS |
| 8:11:18.0 | -12.56'00" | 4.7 | 0.95 | 19 | PUP | 45 | PUPPIS |
| 8:13:18.0 | -15.47'00" | 5.0 | 1.07 | 20 | PUP | 230 | PUPPIS |
| 7:43:48.0 | -28.57'00" | 4.0 | 0.18 | 3 | PUP | 1700 | PUPPIS |
| 7:45:54.0 | -14.34'00" | 5.0 | 0.33 | 4 | PUP | 16 | PUPPIS |
| 8:43:36.0 | -33.11'00" | 3.7 | -0.18 | ALPHA | PYX | 410 | PYXIS |
| 8:40:06.0 | -35.18'00" | 4.0 | 0.94 | BETA | PYX | 46 | PYXIS |
| 8:50:30.0 | -27.43'00" | 4.0 | 1.27 | GAMMA | PYX | 73 | PYXIS |
| 9:21:30.0 | -25.58'00" | 4.7 | 1.68 | THETA | PYX | 100 | PYXIS |
| 4:14:24.0 | -62.28'00" | 3.4 | 0.91 | ALPHA | RET | 120 | RETICULUM |
| 3:44:12.0 | -64.48'00" | 3.9 | 1.13 | BETA | RET | 17 | RETICULUM |
| 3:58:42.0 | -61.24'00" | 4.6 | 1.62 | DELTA | RET | 97 | RETICULUM |
| 4:16:30.0 | -59.18'00" | 4.4 | 1.08 | EPSILON | RET | 21 | RETICULUM |
| 4:21:54.0 | -63.23'00" | 5.2 | 0.95 | ETA | RET | 76 | RETICULUM |
| 4:00:54.0 | -62.10'00" | 4.5 | 1.65 | GAMMA | RET | 9999 | RETICULUM |
| 3:29:24.0 | -62.56'00" | 4.7 | 0.40 | KAPPA | RET | 20 | RETICULUM |
| 0:58:36.0 | -29.21'00" | 4.3 | -0.16 | ALPHA | SCL | 130 | SCULPTOR |
| 23:33:00.0 | -37.49'00" | 4.4 | -0.09 | BETA | SCL | 9999 | SCULPTOR |
| 23:48:54.0 | -28.08'00" | 4.6 | 0.01 | DELTA | SCL | 30 | SCULPTOR |
| 1:45:36.0 | -25.03'00" | 5.3 | 0.39 | EPSILON | SCL | 30 | SCULPTOR |
| 0:27:54.0 | -33.00'00" | 4.8 | 1.64 | ETA | SCL | 47 | SCULPTOR |
| 23:18:48.0 | -32.32'00" | 4.4 | 1.13 | GAMMA | SCL | 47 | SCULPTOR |
| 1:42:06.0 | -32.20'00" | 5.3 | 1.04 | PI | SCL | 87 | SCULPTOR |
| 0:11:42.0 | -35.08'00" | 5.3 | 0.44 | THETA | SCL | 24 | SCULPTOR |
| 0:02:18.0 | -29.43'00" | 5.0 | -0.15 | ZETA | SCL | 170 | SCULPTOR |
| 16:29:24.0 | -26.26'00" | 1.0 | 1.83 | ALPHA | SCO | 100 | SCORPIUS |

| | | | | | |
|---|---|---|---|---|---|
| 16:05:24.0 | -19.48'00" | 2.6 | -0.07 | BE1 | SCO 9999 SCORPIUS |
| 16:05:24.3 | -19.47'48" | 4.9 | -0.02 | BE2 | SCO 250 SCORPIUS@ |
| 16:00:18.0 | -22.37'00" | 2.3 | -0.12 | DELTA | SCO 170 SCORPIUS |
| 16:50:12.0 | -34.18'00" | 2.3 | 1.15 | EPSILON | SCO 20 SCORPIUS |
| 17:12:12.0 | -43.14'00" | 3.3 | 0.41 | ETA | SCO 21 SCORPIUS |
| 17:47:36.0 | -40.08'00" | 3.0 | 0.51 | IO1 | SCO 1700 SCORPIUS |
| 17:42:30.0 | -39.02'00" | 2.4 | -0.22 | KAPPA | SCO 120 SCORPIUS |
| 17:33:36.0 | -37.06'00" | 1.6 | -0.22 | LAMBDA | SCO 84 SCORPIUS |
| 16:51:54.0 | -38.03'00" | 3.1 | -0.20 | MU1 | SCO 160 SCORPIUS |
| 16:52:18.0 | -38.01'00" | 3.6 | -0.21 | MU2 | SCO 210 SCORPIUS |
| 16:12:00.0 | -19.28'00" | 4.0 | 0.04 | NU | SCO 170 SCORPIUS |
| 17:30:48.0 | -37.18'00" | 2.7 | -0.22 | UPSILON | SCO 480 SCORPIUS@ |
| 16:06:48.0 | -20.40'00" | 4.0 | -0.04 | OMEGA1 | SCO 250 SCORPIUS@ |
| 16:07:24.0 | -20.52'00" | 4.3 | 0.84 | OMEGA2 | SCO 53 SCORPIUS@ |
| 16:20:36.0 | -24.10'00" | 4.6 | 0.84 | OMICRON | SCO 92 SCORPIUS |
| 15:58:48.0 | -26.07'00" | 2.9 | -0.19 | PI | SCO 190 SCORPIUS |
| 15:56:54.0 | -29.13'00" | 3.9 | -0.20 | RHO | SCO 190 SCORPIUS |
| 16:21:12.0 | -25.36'00" | 2.9 | 0.13 | SIGMA | SCO 180 SCORPIUS |
| 16:35:54.0 | -28.13'00" | 2.8 | -0.25 | TAU | SCO 240 SCORPIUS |
| 17:37:18.0 | -42.60'00" | 1.9 | 0.40 | THETA | SCO 280 SCORPIUS |
| 16:04:24.0 | -11.22'00" | 4.2 | 0.45 | XI | SCO 26 SCORPIUS |
| 16:54:36.0 | -42.22'00" | 3.6 | 1.37 | ZE2 | SCO 50 SCORPIUS |
| 16:19:30.0 | -30.54'00" | 5.5 | 0.47 | 13 | SCO 91 SCORPIUS |
| 16:30:12.0 | -25.07'00" | 4.8 | -0.11 | 22 | SCO 260 SCORPIUS@ |
| 18:35:12.0 | -08.15'00" | 3.9 | 1.33 | ALPHA | SCT 55 SCUTUM |
| 18:47:12.0 | -04.45'00" | 4.2 | 1.10 | BETA | SCT 150 SCUTUM |
| 18:42:18.0 | -09.03'00" | 4.7 | 0.35 | DELTA | SCT 49 SCUTUM |

407-001

| | | | | | | |
|---|---|---|---|---|---|---|
| 18:43:30.0 | -08:17'00" | 4.9 | 1.12 | EPSILON | SCT | 230 | SCUTUM |
| 18:57:06.0 | -05:51'00" | 4.8 | 1.08 | ETA | SCT | 36 | SCUTUM |
| 18:29:12.0 | -14:34'00" | 4.7 | 0.06 | GAMMA | SCT | 45 | SCUTUM |
| 18:47:30.0 | -05:42'00" | 5.2 | 1.47 | R | SCT | 770 | SCUTUM |
| 18:23:42.0 | -08:56'00" | 4.7 | 0.95 | ZETA | SCT | 79 | SCUTUM |
| 15:44:18.0 | +06:26'00" | 2.7 | 1.17 | ALPHA | SER | 26 | SERPENS |
| 15:46:12.0 | +15:25'00" | 3.7 | 0.06 | BETA | SER | 37 | SERPENS |
| 15:34:48.0 | +10:32'00" | 4.2 | 0.30 | DELTA | SER | 27 | SERPENS |
| 15:50:48.0 | +04:29'00" | 3.7 | 0.15 | EPSILON | SER | 33 | SERPENS |
| 18:21:18.0 | -02:54'00" | 3.3 | 0.94 | ETA | SER | 16 | SERPENS |
| 15:56:30.0 | +15:40'00" | 3.9 | 0.48 | GAMMA | SER | 12 | SERPENS |
| 15:41:36.0 | +19:40'00" | 4.5 | 0.04 | IOTA | SER | 36 | SERPENS |
| 15:48:42.0 | +18:08'00" | 4.1 | 1.62 | KAPPA | SER | 78 | SERPENS |
| 15:46:24.0 | +07:21'00" | 4.4 | 0.60 | LAMBDA | SER | 11 | SERPENS |
| 15:49:36.0 | -03:26'00" | 3.5 | -0.04 | MU | SER | 44 | SERPENS |
| 17:20:48.0 | -12:51'00" | 4.3 | 0.03 | NU | SER | 42 | SERPENS |
| 17:41:24.0 | -12:53'00" | 4.3 | 0.08 | OMICRON | SER | 36 | SERPENS |
| 15:51:18.0 | +20:59'00" | 4.8 | 1.54 | RHO | SER | 98 | SERPENS |
| 16:22:06.0 | +01:02'00" | 4.8 | 0.34 | SIGMA | SER | 28 | SERPENS |
| 15:25:48.0 | +15:26'00" | 5.2 | 1.66 | TA1 | SER | 120 | SERPENS |
| 18:56:12.0 | +04:12'00" | 4.1 | 0.17 | THETA | SER | 31 | SERPENS@ |
| 17:37:36.0 | -15:24'00" | 3.5 | 0.26 | XI | SER | 23 | SERPENS |
| 18:00:30.0 | -03:41'00" | 4.6 | 0.38 | ZETA | SER | 22 | SERPENS |
| 15:15:12.0 | +04:56'00" | 5.3 | 1.09 | 3 | SER | 93 | SERPENS |
| 10:07:54.0 | -00:22'00" | 4.5 | -0.04 | ALPHA | SEX | 100 | SEXTANS |
| 10:30:18.0 | -00:38'00" | 5.1 | -0.14 | BETA | SEX | 160 | SEXTANS |
| 10:29:30.0 | -02:44'00" | 5.2 | -0.06 | DELTA | SEX | 9999 | SEXTANS |

407-001

| | | | | | | |
|---|---|---|---|---|---|---|
| 10:17:36.0 | −08.04′00″ | 5.2 | 0.31 | EPSILON | SEX | 85 | SEXTANS |
| 9:52:30.0 | −08.06′00″ | 5.1 | 0.04 | GAMMA | SEX | 16 | SEXTANS |
| 19:40:06.0 | +18.01′00″ | 4.4 | 0.78 | ALPHA | SGE | 190 | SAGGITA |
| 19:41:00.0 | +17.29′00″ | 4.4 | 1.05 | BETA | SGE | 200 | SAGGITA |
| 19:47:24.0 | +18.32′00″ | 3.8 | 1.41 | DELTA | SGE | 170 | SAGGITA |
| 20:05:12.0 | +19.59′00″ | 5.1 | 1.06 | ETA | SGE | 110 | SAGGITA |
| 19:58:48.0 | +19.30′00″ | 3.5 | 1.57 | GAMMA | SGE | 51 | SAGGITA |
| 19:49:00.0 | +19.09′00″ | 5.0 | 0.10 | ZETA | SGE | 46 | SAGGITA |
| 19:23:54.0 | −40.37′00″ | 4.0 | −0.10 | ALPHA | SGR | 36 | SAGGITARIUS |
| 19:22:36.0 | −44.28′00″ | 4.0 | −0.10 | BE1 | SGR | 67 | SAGGITARIUS |
| 19:23:12.0 | −44.48′00″ | 4.3 | 0.34 | BE2 | SGR | 52 | SAGGITARIUS |
| 18:21:00.0 | −29.50′00″ | 2.7 | 1.38 | DELTA | SGR | 25 | SAGGITARIUS |
| 18:24:12.0 | −34.23′00″ | 1.9 | −0.03 | EPSILON | SGR | 26 | SAGGITARIUS |
| 18:17:36.0 | −36.46′00″ | 3.1 | 1.56 | ETA | SGR | 130 | SAGGITARIUS |
| 18:05:48.0 | −30.25′00″ | 3.0 | 1.00 | GAMMA | SGR | 36 | SAGGITARIUS |
| 19:55:18.0 | −41.52′00″ | 4.1 | 1.08 | IOTA | SGR | 55 | SAGGITARIUS |
| 18:28:00.0 | −25.25′00″ | 2.8 | 1.04 | LAMBDA | SGR | 30 | SAGGITARIUS |
| 18:13:48.0 | −21.04′00″ | 3.9 | 0.23 | MU | SGR | 1200 | SAGGITARIUS |
| 19:55:48.0 | −26.18′00″ | 4.7 | 0.75 | OMEGA | SGR | 11 | SAGGITARIUS |
| 19:04:42.0 | −21.45′00″ | 3.8 | 1.01 | OMICRON | SGR | 43 | SAGGITARIUS |
| 19:15:30.0 | −25.15′00″ | 4.9 | 0.56 | PSI | SGR | 21 | SAGGITARIUSθ |
| 18:45:42.0 | −26.59′00″ | 3.2 | −0.11 | PHI | SGR | 75 | SAGGITARIUS |
| 19:09:48.0 | −21.01′00″ | 2.9 | 0.35 | PI | SGR | 95 | SAGGITARIUS |
| 19:21:42.0 | −17.51′00″ | 3.9 | 0.22 | RH1 | SGR | 28 | SAGGITARIUS |
| 18:55:18.0 | −26.18′00″ | 2.0 | −0.22 | SIGMA | SGR | 64 | SAGGITARIUS |
| 19:06:54.0 | −27.40′00″ | 3.3 | 1.19 | TAU | SGR | 40 | SAGGITARIUS |
| 19:59:42.0 | −35.17′00″ | 4.4 | −0.15 | TH1 | SGR | 210 | SAGGITARIUS |

−140−

| | | | | | |
|---|---|---|---|---|---|
| 19:59:54.0 | -34.42'00" | 5.3 | 0.17 | TH2 | SGR 53 | SAGGITARIUS |
| 19:21:42.0 | -15.57'00" | 4.6 | 0.10 | UPSILON | SGR 21 | SAGGITARIUS |
| 18:05:00.0 | -29.35'00" | 5.1 | 0.80 | W | SGR 9999 | SAGGITARIUSθ |
| 17:47:36.0 | -27.50'00" | 4.6 | 0.70 | X | SGR 200 | SAGGITARIUSθ |
| 18:57:42.0 | -21.06'00" | 3.5 | 1.18 | XI2 | SGR 44 | SAGGITARIUSθ |
| 19:02:36.0 | -29.53'00" | 2.6 | 0.08 | ZETA | SGR 24 | SAGGITARIUS |
| 19:17:36.0 | -18.57'00" | 5.0 | 1.02 | 43 | SGR 210 | SAGGITARIUS |
| 19:36:42.0 | -24.53'00" | 4.6 | -0.07 | 52 | SGR 9999 | SAGGITARIUS |
| 19:40:42.0 | -16.18'00" | 5.3 | 1.13 | 54 | SGR 14 | SAGGITARIUS |
| 19:42:30.0 | -16.07'00" | 5.1 | 0.33 | 55 | SGR 76 | SAGGITARIUS |
| 19:46:24.0 | -19.46'00" | 4.9 | 0.93 | 56 | SGR 98 | SAGGITARIUS |
| 19:56:54.0 | -27.10'00" | 4.5 | 1.46 | 59 | SGR 69 | SAGGITARIUS |
| 19:59:00.0 | -26.12'00" | 4.8 | 0.90 | 60 | SGR 80 | SAGGITARIUS |
| 19:57:54.0 | -15.29'00" | 5.0 | 0.05 | 61 | SGR 71 | SAGGITARIUS |
| 20:02:42.0 | -27.43'00" | 4.6 | 1.65 | 62 | SGR 100 | SAGGITARIUS |
| 4:35:54.0 | +16.31'00" | 0.9 | 1.54 | ALPHA | TAU 21 | TAURUS |
| 5:26:18.0 | +28.36'00" | 1.7 | -0.13 | BETA | TAU 40 | TAURUS |
| 4:22:54.0 | +17.33'00" | 3.8 | 0.98 | DE1 | TAU 51 | TAURUS |
| 4:24:06.0 | +17.27'00" | 4.8 | 0.15 | DE2 | TAU 30 | TAURUS |
| 4:28:36.0 | +19.11'00" | 3.5 | 1.02 | EPSILON | TAU 45 | TAURUS |
| 3:47:30.0 | +24.06'00" | 2.9 | -0.09 | ETA | TAU 73 | TAURUSθ |
| 4:19:48.0 | +15.38'00" | 3.7 | 0.99 | GAMMA | TAU 49 | TAURUS |
| 5:03:06.0 | +21.35'00" | 4.6 | 0.15 | IOTA | TAU 28 | TAURUS |
| 4:25:24.0 | +22.18'00" | 4.2 | 0.14 | KAPPA | TAU 23 | TAURUS |
| 4:00:42.0 | +12.29'00" | 3.5 | -0.12 | LAMBDA | TAU 100 | TAURUS |
| 4:15:30.0 | +08.54'00" | 4.3 | -0.05 | MU | TAU 140 | TAURUS |
| 4:03:12.0 | +05.59'00" | 3.9 | 0.03 | NU | TAU 34 | TAURUS |

| | | | | | | |
|---|---|---|---|---|---|---|
| 3:24:48.0 | +09.02'00" | 3.6 | 0.89 | OMICRON | TAU 46 | TAURUS |
| 4:33:48.0 | +14.51'00" | 4.7 | 0.24 | RHO | TAU 26 | TAURUS |
| 4:39:12.0 | +15.48'00" | 5.1 | 0.15 | SI1 | TAU 9999 | TAURUS |
| 4:39:18.0 | +15.55'00" | 4.7 | 0.15 | SI2 | TAU 33 | TAURUS |
| 4:42:12.0 | +22.57'00" | 4.3 | -0.13 | TAU | TAU 150 | TAURUS |
| 4:28:36.0 | +15.58'00" | 3.9 | 0.96 | TH1 | TAU 54 | TAURUS |
| 4:28:42.0 | +15.52'00" | 3.4 | 0.18 | TH2 | TAU 38 | TAURUS |
| 4:26:18.0 | +22.49'00" | 4.3 | 0.26 | UPSILON | TAU 42 | TAURUS |
| 3:27:12.0 | +09.44'00" | 3.7 | -0.09 | XI | TAU 27 | TAURUS |
| 5:37:36.0 | +21.09'00" | 3.0 | -0.19 | ZETA | TAU 150 | TAURUS |
| 3:36:54.0 | +00.24'00" | 4.3 | 0.58 | 10 | TAU 13 | TAURUS |
| 5:32:12.0 | +18.36'00" | 4.4 | 2.07 | 119 | TAU 290 | TAURUS |
| 5:53:18.0 | +27.37'00" | 4.6 | -0.02 | 136 | TAU 64 | TAURUS |
| 3:44:54.0 | +24.07'00" | 3.7 | -0.11 | 17 | TAU 120 | TAURUS |
| 3:45:12.0 | +24.28'00" | 4.3 | -0.11 | 19 | TAU 110 | TAURUS |
| 3:45:48.0 | +24.22'00" | 3.9 | -0.07 | 20 | TAU 120 | TAURUS |
| 3:46:18.0 | +23.57'00" | 4.2 | -0.06 | 23 | TAU 120 | TAURUS |
| 3:49:12.0 | +24.03'00" | 3.6 | -0.08 | 27 | TAU 90 | TAURUS |
| 4:04:42.0 | +22.05'00" | 4.4 | 1.07 | 37 | TAU 60 | TAURUS |
| 4:09:12.0 | +19.37'00" | 5.5 | 1.07 | 43 | TAU 19 | TAURUS |
| 4:10:48.0 | +26.29'00" | 5.4 | 0.34 | 44 | TAU 35 | TAURUS |
| 3:30:54.0 | +12.56'00" | 4.1 | 1.12 | 5 | TAU 97 | TAURUS |
| 4:20:00.0 | +14.02'00" | 5.6 | 0.28 | 57 | TAU 32 | TAURUS |
| 4:25:30.0 | +17.56'00" | 4.3 | 0.05 | 68 | TAU 38 | TAURUS |
| 4:26:18.0 | +15.37'00" | 4.5 | 0.25 | 71 | TAU 24 | TAURUS |
| 4:35:42.0 | +10.10'00" | 4.3 | 0.18 | 88 | TAU 25 | TAURUS |
| 4:38:12.0 | +12.31'00" | 4.3 | 0.13 | 90 | TAU 27 | TAURUS |

407-001

407-001

| | | | | | |
|---|---|---|---|---|---|
| 4:51:24.0 | +18:50'00" | 5.1 | 0.21 | 97 | TAU 32 TAURUS |
| 18:27:00.0 | -45:58'00" | 3.5 | -0.17 | ALPHA | TEL 180 TELESCOPIUM |
| 18:11:12.0 | -45:57'00" | 4.5 | 1.01 | EPSILON | TEL 57 TELESCOPIUM |
| 19:35:12.0 | -48:06'00" | 4.9 | 1.09 | IOTA | TEL 74 TELESCOPIUM |
| 18:58:30.0 | -52:56'00" | 4.9 | 0.00 | LAMBDA | TEL 140 TELESCOPIUM |
| 19:48:00.0 | -56:22'00" | 5.4 | 0.20 | NU | TEL 9999 TELESCOPIUM |
| 20:07:24.0 | -52:53'00" | 4.9 | 1.62 | XI | TEL 120 TELESCOPIUM |
| 18:28:48.0 | -49:04'00" | 4.1 | 1.02 | ZETA | TEL 51 TELESCOPIUM |
| 16:48:42.0 | -69:02'00" | 1.9 | 1.44 | ALPHA | TRA 17 TRIANGULUM AUSTRALE |
| 15:55:06.0 | -63:26'00" | 2.9 | 0.29 | BETA | TRA 10 TRIANGULUM AUSTRALE |
| 16:15:24.0 | -63:41'00" | 3.9 | 1.11 | DELTA | TRA 110 TRIANGULUM AUSTRALE |
| 15:36:42.0 | -66:19'00" | 4.1 | 1.17 | EPSILON | TRA 44 TRIANGULUM AUSTRALE |
| 15:18:54.0 | -68:41'00" | 2.9 | 0.00 | GAMMA | TRA 28 TRIANGULUM AUSTRALE |
| 16:28:30.0 | -70:05'00" | 4.9 | 0.55 | ZETA | TRA 12 TRIANGULUM AUSTRALE |
| 1:53:06.0 | +29:35'00" | 3.4 | 0.49 | ALPHA | TRI 18 TRIANGULUM |
| 2:09:30.0 | +34:59'00" | 3.0 | 0.14 | BETA | TRI 35 TRIANGULUM |
| 2:17:18.0 | +33:51'00" | 4.0 | 0.02 | GAMMA | TRI 46 TRIANGULUM |
| 2:28:12.0 | +29:40'00" | 5.3 | 0.30 | 12 | TRI 36 TRIANGULUM |
| 2:32:06.0 | +36:09'00" | 5.2 | 1.47 | 14 | TRI 120 TRIANGULUM |
| 22:18:30.0 | -60:16'00" | 2.9 | 1.39 | ALPHA | TUC 35 TUCANA |
| 0:31:30.0 | -62:57'00" | 4.4 | -0.07 | BE1 | TUC 33 TUCANA |
| 22:27:18.0 | -64:58'00" | 4.5 | -0.03 | DELTA | TUC 76 TUCANA |
| 23:59:54.0 | -65:35'00" | 4.5 | -0.08 | EPSILON | TUC 67 TUCANA |
| 23:17:24.0 | -58:14'00" | 4.0 | 0.40 | GAMMA | TUC 45 TUCANA |
| 1:07:18.0 | -61:47'00" | 5.4 | 0.88 | IOTA | TUC 100 TUCANA |
| 1:15:48.0 | -68:53'00" | 4.9 | 0.47 | KAPPA | TUC 18 TUCANA |
| 0:55:00.0 | -69:32'00" | 5.5 | 1.09 | LA2 | TUC 80 TUCANA |

-143-

| | | | | | | |
|---|---|---|---|---|---|---|
| 0:20:06.0 | −64.53'00" | 4.2 | 0.58 | ZETA | TUC | 7 | TUCANA |
| 11:03:42.0 | +61.45'00" | 1.8 | 1.07 | ALPHA | UMA | 23 | URSA MAJOR |
| 11:01:48.0 | +56.23'00" | 2.4 | −0.02 | BETA | UMA | 19 | URSA MAJOR |
| 11:46:00.0 | +47.47'00" | 3.7 | 1.18 | CHI | UMA | 37 | URSA MAJOR |
| 12:15:24.0 | +57.02'00" | 3.3 | 0.08 | DELTA | UMA | 20 | URSA MAJOR |
| 12:54:00.0 | +55.58'00" | 1.8 | −0.02 | EPSILON | UMA | 19 | URSA MAJOR |
| 13:47:30.0 | +49.19'00" | 1.9 | −0.19 | ETA | UMA | 33 | URSA MAJOR |
| 11:53:48.0 | +53.42'00" | 2.4 | 0.00 | GAMMA | UMA | 23 | URSA MAJOR |
| 8:59:12.0 | +48.03'00" | 3.1 | 0.19 | IOTA | UMA | 15 | URSA MAJOR |
| 9:03:36.0 | +47.09'00" | 3.6 | 0.00 | KAPPA | UMA | 28 | URSA MAJOR |
| 10:17:06.0 | +42.55'00" | 3.5 | 0.03 | LAMBDA | UMA | 37 | URSA MAJOR |
| 10:22:18.0 | +41.30'00" | 3.1 | 1.59 | MU | UMA | 48 | URSA MAJOR |
| 11:18:30.0 | +33.06'00" | 3.5 | 1.40 | NU | UMA | 46 | URSA MAJOR |
| 8:30:18.0 | +60.43'00" | 3.4 | 0.84 | OMICRON | UMA | 71 | URSA MAJOR |
| 9:52:06.0 | +54.04'00" | 4.6 | 0.03 | PHI | UMA | 13 | URSA MAJOR |
| 11:09:42.0 | +44.30'00" | 3.0 | 1.14 | PSI | UMA | 37 | URSA MAJOR |
| 9:02:30.0 | +67.38'00" | 4.8 | 1.53 | RHO | UMA | 23 | URSA MAJOR |
| 9:10:24.0 | +67.08'00" | 4.8 | 0.49 | SI2 | UMA | 22 | URSA MAJOR |
| 9:32:54.0 | +51.41'00" | 3.2 | 0.46 | THETA | UMA | 14 | URSA MAJOR |
| 9:51:00.0 | +59.02'00" | 3.8 | 0.29 | UPSILON | UMA | 26 | URSA MAJOR |
| 11:18:12.0 | +31.32'00" | 3.8 | 0.59 | XI | UMA | 8 | URSA MAJOR |
| 13:23:54.0 | +54.56'00" | 2.1 | 0.02 | ZETA | UMA | 18 | URSA MAJOR |
| 9:08:54.0 | +51.36'00" | 4.5 | 0.27 | 15 | UMA | 9999 | URSA MAJOR |
| 9:31:30.0 | +63.04'00" | 3.7 | 0.33 | 23 | UMA | 25 | URSA MAJOR |
| 9:34:30.0 | +69.50'00" | 4.6 | 0.77 | 24 | UMA | 21 | URSA MAJOR |
| 9:34:48.0 | +52.03'00" | 4.5 | 0.01 | 26 | UMA | 42 | URSA MAJOR |
| 10:30:36.0 | +55.59'00" | 4.8 | 0.52 | 36 | UMA | 13 | URSA MAJOR |

407-001

| | | | | | |
|---|---|---|---|---|---|
| 10:35:12.0 | +57.05'00" | 5.2 | 0.34 | 37 | UMA | 30 | URSA MAJOR |
| 10:59:30.0 | +40.26'00" | 5.1 | 0.61 | 47 | UMA | 13 | URSA MAJOR |
| 11:19:06.0 | +38.11'00" | 4.8 | 0.12 | 55 | UMA | 42 | URSA MAJOR |
| 11:41:00.0 | +34.12'00" | 5.3 | 0.72 | 61 | UMA | 9 | URSA MAJOR |
| 12:30:00.0 | +58.24'00" | 5.4 | 0.20 | 74 | UMA | 9999 | URSA MAJOR |
| 13:00:42.0 | +56.22'00" | 4.9 | 0.36 | 78 | UMA | 24 | URSA MAJOR |
| 13:25:12.0 | +54.59'00" | 4.0 | 0.16 | 80 | UMA | 25 | URSA MAJOR |
| 2:31:48.0 | +89.16'00" | 2.0 | 0.60 | ALPHA | UMI | 210 | URSA MINOR |
| 14:50:42.0 | +74.09'00" | 2.1 | 1.47 | BETA | UMI | 29 | URSA MINOR |
| 17:32:12.0 | +86.35'00" | 4.4 | 0.02 | DELTA | UMI | 44 | URSA MINOR |
| 16:46:00.0 | +82.02'00" | 4.2 | 0.89 | EPSILON | UMI | 61 | URSA MINOR |
| 16:17:30.0 | +75.45'00" | 5.0 | 0.37 | ETA | UMI | 28 | URSA MINOR |
| 15:20:42.0 | +71.50'00" | 3.1 | 0.05 | GAMMA | UMI | 69 | URSA MINOR |
| 15:31:24.0 | +77.21'00" | 5.0 | 1.58 | THETA | UMI | 130 | URSA MINOR |
| 15:44:06.0 | +77.48'00" | 4.3 | 0.04 | ZETA | UMI | 33 | URSA MINOR |
| 16:10:48.0 | +75.53'00" | 5.5 | -0.15 | 19 | UMI | 9999 | URSA MINOR |
| 14:08:48.0 | +77.33'00" | 4.8 | 1.36 | 4 | UMI | 90 | URSA MINOR |
| 14:27:30.0 | +75.42'00" | 4.3 | 1.44 | 5 | UMI | 79 | URSA MINOR |
| 8:44:42.0 | -54.42'00" | 2.0 | 0.04 | DELTA | VEL | 21 | VELA |
| 8:09:27.3 | -47.21'00" | 4.3 | -0.23 | GA1 | VEL | 430 | VELA@ |
| 8:09:30.0 | -47.20'00" | 1.8 | -0.22 | GA2 | VEL | 9999 | VELA |
| 9:22:06.0 | -55.01'00" | 2.5 | -0.18 | KAPPA | VEL | 120 | VELA |
| 9:08:00.0 | -43.26'00" | 2.2 | 1.66 | LAMBDA | VEL | 150 | VELA |
| 10:46:48.0 | -49.25'00" | 2.7 | 0.90 | MU | VEL | 30 | VELA |
| 9:31:12.0 | -57.02'00" | 3.1 | 1.55 | N | VEL | 45 | VELA |
| 8:40:18.0 | -52.55'00" | 3.6 | -0.18 | OMICRON | VEL | 120 | VELA |
| 9:56:54.0 | -54.34'00" | 3.5 | -0.08 | PHI | VEL | 770 | VELA |

-145-

| | | | | | |
|---|---|---|---|---|---|
| 9:30:42.0 | −40.28'00" | 3.6 | 0.36 | PSI | VEL 19 VELA |
| 12:45:36.0 | +07.40'00" | 5.2 | 0.33 | 32 | VIR 22 VIRGO@ |
| 13:25:12.0 | −11.10'00" | 1.0 | −0.24 | ALPHA | VIR 79 VIRGO |
| 11:50:42.0 | +01.46'00" | 3.6 | 0.55 | BETA | VIR 10 VIRGO |
| 12:39:12.0 | −07.60'00" | 4.7 | 1.23 | CHI | VIR 78 VIRGO |
| 12:55:36.0 | +03.24'00" | 3.4 | 1.58 | DELTA | VIR 45 VIRGO |
| 13:02:12.0 | +10.58'00" | 2.8 | 0.94 | EPSILON | VIR 32 VIRGO |
| 12:19:54.0 | −00.40'00" | 3.9 | 0.02 | ETA | VIR 32 VIRGO |
| 12:41:42.0 | −01.27'00" | 2.8 | 0.36 | GAMMA | VIR 11 VIRGO |
| 14:16:00.0 | −06.00'00" | 4.1 | 0.52 | IOTA | VIR 22 VIRGO |
| 14:12:54.0 | −10.16'00" | 4.2 | 1.33 | KAPPA | VIR 71 VIRGO |
| 14:19:06.0 | −13.22'00" | 4.5 | 0.13 | LAMBDA | VIR 20 VIRGO |
| 14:43:06.0 | −05.40'00" | 3.9 | 0.38 | MU | VIR 26 VIRGO |
| 11:45:54.0 | +06.32'00" | 4.0 | 1.51 | NU | VIR 51 VIRGO |
| 12:05:12.0 | +08.44'00" | 4.1 | 0.98 | OMICRON | VIR 34 VIRGO |
| 14:28:12.0 | −02.14'00" | 4.8 | 0.70 | PHI | VIR 29 VIRGO |
| 12:00:54.0 | +06.37'00" | 4.7 | 0.13 | PI | VIR 37 VIRGO |
| 12:54:24.0 | −09.32'00" | 4.8 | 1.60 | PSI | VIR 120 VIRGO |
| 12:41:54.0 | +10.14'00" | 4.9 | 0.09 | RHO | VIR 63 VIRGO |
| 13:17:36.0 | +05.28'00" | 4.8 | 1.67 | SIGMA | VIR 100 VIRGO |
| 14:01:36.0 | +01.33'00" | 4.3 | 0.10 | TAU | VIR 32 VIRGO |
| 13:09:54.0 | −05.32'00" | 4.4 | −0.01 | THETA | VIR 43 VIRGO |
| 13:34:42.0 | −00.36'00" | 3.4 | 0.11 | ZETA | VIR 23 VIRGO |
| 14:46:12.0 | +01.54'00" | 3.7 | −0.01 | 109 | VIR 38 VIRGO |
| 15:02:54.0 | +02.05'00" | 4.4 | 1.04 | 110 | VIR 65 VIRGO |
| 12:20:18.0 | +03.19'00" | 5.0 | 1.16 | 16 | VIR 67 VIRGO |
| 13:18:24.0 | −18.19'00" | 4.7 | 0.71 | 61 | VIR 8 VIRGO |

| | | | | | |
|---|---|---|---|---|---|
| 13:26:42.0 | −12.42'00" | 5.3 | 1.52 | 68 | VIR 140 VIRGO |
| 13:27:30.0 | −15.58'00" | 4.8 | 1.09 | 69 | VIR 32 VIRGO |
| 13:28:24.0 | +13.47'00" | 5.0 | 0.71 | 70 | VIR 10 VIRGO |
| 13:34:06.0 | +03.40'00" | 4.9 | 0.03 | 78 | VIR 26 VIRGO |
| 13:41:36.0 | −08.42'00" | 5.0 | 1.63 | 82 | VIR 120 VIRGO |
| 13:49:54.0 | −18.08'00" | 5.0 | 1.06 | 89 | VIR 99 VIRGO |
| 9:02:24.0 | −66.24'00" | 4.0 | 0.14 | ALPHA | VOL 24 VOLANS |
| 8:25:42.0 | −66.08'00" | 3.8 | 1.13 | BETA | VOL 59 VOLANS |
| 7:16:48.0 | −67.57'00" | 4.0 | 0.79 | DELTA | VOL 730 VOLANS |
| 8:07:54.0 | −68.37'00" | 4.4 | −0.11 | EPSILON | VOL 120 VOLANS |
| 7:08:48.0 | −70.30'00" | 3.8 | 0.90 | GAMMA | VOL 23 VOLANS |
| 6:51:30.0 | −70.58'00" | 5.4 | −0.11 | IOTA | VOL 210 VOLANSθ |
| 7:41:48.0 | −72.36'00" | 4.0 | 1.04 | ZETA | VOL 54 VOLANS |
| 19:28:42.0 | +24.40'00" | 4.4 | 1.50 | ALPHA | VUL 26 VULPECULA |
| 19:16:12.0 | +21.23'00" | 4.8 | −0.05 | 1 | VUL 210 VULPECULA |
| 19:53:30.0 | +24.05'00" | 4.6 | −0.06 | 13 | VUL 110 VULPECULA |
| 20:01:06.0 | +27.45'00" | 4.6 | 0.18 | 15 | VUL 18 VULPECULA |
| 20:15:48.0 | +27.49'00" | 4.5 | 1.26 | 23 | VUL 88 VULPECULA |
| 20:16:48.0 | +24.40'00" | 5.3 | 0.95 | 24 | VUL 100 VULPECULA |
| 20:38:30.0 | +21.12'00" | 4.8 | −0.02 | 29 | VUL 70 VULPECULA |
| 20:52:06.0 | +27.06'00" | 4.6 | 0.83 | 31 | VUL 38 VULPECULA |
| 20:54:36.0 | +28.03'00" | 5.0 | 1.48 | 32 | VUL 100 VULPECULA |
| 20:58:18.0 | +22.20'00" | 5.3 | 1.40 | 33 | VUL 130 VULPECULA |

Having described the invention what is claimed is:

1. A method of displaying on a display device, stereographic three-dimensional images of celestial objects, wherein these objects have celestial coordinates on the celestial sphere, comprising the steps of:
   1) selecting at least a portion of the celestial sphere to display;
   2) determining the celestial coordinates for each celestial object within this portion of the celestial sphere;
   3) mapping the celestial coordinates of each celestial object within the selected portion of the celestial sphere into a planar coordinate system forming a first part of the display device so as to be viewable in this first part of the display device;
   4) determining the distance from the earth of each celestial object at least within the selected portion of the celestial sphere; and
   5) mapping the celestial coordinates of each celestial object within the selected portion of the celestial sphere into a planar coordinate system forming a second part of the display device so as to be viewable in this second part of the display device, wherein each celestial object displayed is offset in at least one coordinate by an amount inversely proportional to its distance from the earth.

2. A method of displaying stereographic three-dimensional images of celestial objects as defined in claim 1, wherein the maximum value of the offset is equal to or less than a predetermined value.

3. A method of displaying stereographic three-dimensional images of celestial objects as defined in claim 2, further comprising the step of:
   6) determining the celestial object within the selected portion of the celestial sphere that is closest to the earth and offsetting at least one of its coordinates in the second part of the display device by an amount equal to the maximum value of the offset.

4. A method of displaying stereographic three-dimensional images of celestial objects as defined in claim 3; wherein the displaying of the remaining celestial objects within the selected portion of the celestial sphere within the second part of the display device is inversely proportional to each object's distance from the earth as normalized by each object's distance ratioed to the distance of the celestial object determined in step 6.

5. A method of displaying stereographic three-dimensional images of celestial objects as defined in claim 4, wherein the offset of each celestial object displayed in the second part of the display device is:

Object offset=(Maximum value of the offset)×(closest displayed object)/(object's distance).

6. A method of displaying stereographic three-dimensional images of celestial objects as defined in claim 5, wherein the display device is the printed output of a printer.

7. A method of displaying stereographic three-dimensional images of celestial objects as defined in claim 1, further comprising the step of:
   6) generating the display of coordinate information corresponding to at least some of the celestial objects displayed within the first and second parts of the display device.

8. A method of displaying stereographic three-dimensional images of celestial objects as defined in claim 7, wherein the coordinate information includes the right ascension of the celestial objects nearest the left and right lower perimeter of the display device.

9. A method of displaying stereographic three-dimensional images of celestial objects as defined in claim 8, wherein the coordinate information includes the right ascension of the celestial objects nearest the left and right upper perimeter of the display device if the selected portion of the celestial sphere includes either the north or south celestial pole.

10. A method of displaying stereographic three-dimensional images of celestial objects as defined in claim 9, wherein the coordinate information includes the declination of the celestial objects nearest the top and bottom of the display device.

11. A method of displaying stereographic three-dimensional images of celestial objects as defined in claim 8, wherein the coordinate information includes the declination of the celestial objects nearest the top and bottom of the display device.

12. A method of displaying stereographic three-dimensional images of celestial objects as defined in claim 7, further comprising the step of:
   7) generating the display of Messier object information in the selected portion of the celestial sphere if the selected portion of the celestial sphere includes at least one Messier object.

13. A method of displaying stereographic three-dimensional images of celestial objects as defined in claim 1, further comprising the step of:
   6) generating the display of a simulated meteor shower, with each meteor displayed in both parts of the display device so as to have an offset in at least one coordinate in at least one of the two parts of the display device.

14. A method of displaying stereographic three-dimensional images of celestial objects as defined in claim 1, further comprising the step of:
   6) generating the display of a pointing arrow in at least one part of the display device.

15. A method of displaying stereographic three-dimensional images of celestial objects as defined in claim 14, wherein the arrow may be moved about the display device by user supplied information.

16. A method of displaying stereographic three-dimensional images of celestial objects as defined in claim 1, further comprising the step of:
   6) selecting the viewing size of the selected portion of the celestial sphere.

17. A method of displaying stereographic three-dimensional images of celestial objects as defined in claim 1, wherein the coordinates of the celestial objects are in right ascension and declination, and wherein the step of selecting the portion of the celestial sphere includes selecting the right ascension and declination of the central location of the selected portion of the celestial sphere.

18. A method of displaying stereographic three-dimensional images of celestial objects as defined in claim 1, wherein the spacial separation of the points of view giving rise to the offset of the celestial objects displayed in the second part of the display device is also displayed on the display device.

19. A method of displaying stereographic three-dimensional images of celestial objects on a display device by executing on a digital computer the program set forth in Table 1 using celestial object information as set forth in Table 2, said execution comprising the steps of:
   1) reading and mapping the celestial coordinates of each celestial object within at least a selected portion of the celestial sphere into a planar coordinate system forming a first part of the display device so as to be viewable in this first part of the display device;

2) determining the distance from the earth of each celestial object at least within the selected portion of the celestial sphere; and 3) mapping the celestial coordinates of each celestial object within the selected portion of the celestial sphere into a planar coordinate system forming a second part of the display device so as to be viewable in this second part of the display device, wherein each celestial object displayed is offset in at least one coordinate by an amount inversely proportional to its distance from the earth.

20. A method for displaying Stereographic pair images, including those illustrated in FIGS. 5 though 9 and 11 through 13, by executing on a digital computer the program set forth in Table 1 using celestial object information as set forth in Table 2, wherein said executing comprises the steps of:

1) reading and mapping the celestial coordinates of each celestial object within at least a selected portion of the celestial sphere into a planar coordinate system forming a first part of the display device so as to be viewable in this first part of the display device;

2) determining the distance from the earth of each celestial object at least within the selected portion of the celestial sphere; and 3) mapping the celestial coordinates of each celestial object within the selected portion of the celestial sphere into a planar coordinate system forming a second part of the display device so as to be viewable in this second part of the display device, wherein each celestial object displayed is offset in at least one coordinate by an amount inversely proportional to its distance from the earth.

21. A system for the display on a display device, of stereographic three-dimensional images of celestial objects, wherein these objects have celestial coordinates on the celestial sphere, comprising:

A) a keyboard for inputting information;

B) a display device for the display of the stereographic three-dimensional images of celestial objects; and C) a digital computer connected to the keyboard and the display device, digital computer having means for executing a control program so as to comprise therewith:

1) means for selecting at least a portion of the celestial sphere to display;

2) means for determining the celestial coordinates for each celestial object within this portion of the celestial sphere;

3) means for mapping the celestial coordinates of each celestial object within the selected portion of the celestial sphere into a planar coordinate system forming a first part of the display device so as to be viewable in this first part of the display device;

4) means for determining the distance from the earth of each celestial object at least within the selected portion of the celestial sphere; and 5) means for mapping the celestial coordinates of each celestial object within the selected portion of the celestial sphere into a planar coordinate system forming a second part of the display device so as to be viewable in this second part of the display device, wherein each celestial object displayed is offset in at least one coordinate by an amount inversely proportional to its distance from the earth.

22. A system for the display of stereographic three-dimensional images of celestial objects as defined in claim 21, wherein the maximum value of the offset is equal to or less than a predetermined value.

23. A system for the display of stereographic three-dimensional images of celestial objects as defined in claim 22, further comprising:

D) means for determining the celestial object within the selected portion of the celestial sphere that is closest to the earth and offsetting at least one of its coordinates in the second part of the display device by an amount equal to the maximum value of the offset.

24. A system for the display of stereographic three-dimensional images of celestial objects as defined in claim 23, wherein the means for displaying of the remaining celestial objects within the selected portion of the celestial sphere within the second part of the display device is inversely proportional to each object's distance from the earth as normalized by each object's distance ratioed to the distance of the celestial object determined by the means set forth in element F.

25. A system for the display of stereographic three-dimensional images of celestial objects as defined in claim 24, wherein the offset of each celestial object displayed in the second part of the display device is:

Object offset=(Maximum value of the offset)×(closest displayed object)/(object's distance).

26. A system for the display of stereographic three-dimensional images of celestial objects as defined in claim 25, wherein the display device is the printed output of a printer.

27. A system for the display of stereographic three-dimensional images of celestial objects as defined in claim 21, further comprising:

D) means for generating the display of coordinate information corresponding to at least some of the celestial objects displayed within the first and second parts of the display device.

28. A system for the display of stereographic three-dimensional images of celestial objects as defined in claim 27, wherein the coordinate information includes the right ascension of the celestial objects nearest the left and right lower perimeter of the display device.

29. A system for the display of stereographic three-dimensional images of celestial objects as defined in claim 28, wherein the coordinate information includes the right ascension of the celestial objects nearest the left and right upper perimeter of the display device if the selected portion of the celestial sphere includes either the north or south celestial pole.

30. A system for the display of stereographic three-dimensional images of celestial objects as defined in claim 29, wherein the coordinate information includes the declination of the celestial objects nearest the top and bottom of the display device.

31. A system for the display of stereographic three-dimensional images of celestial objects as defined in claim 30, wherein the coordinate information includes the declination of the celestial objects nearest the top and bottom of the display device.

32. A system for the display of stereographic three-dimensional images of celestial objects as defined in claim 27, further comprising:

E) means for generating the display of Messier object information in the selected portion of the celestial sphere if the selected portion of the celestial sphere includes at least one Messier object.

33. A system for the display of stereographic three-dimensional images of celestial objects as defined in claim 21, further comprising:

D) means for generating the display of a simulated meteor shower, with each meteor displayed in both parts of the display device so as to have an offset in at least one coordinate in at least one of the two parts of the display device.

34. A system for the display of stereographic three-dimensional images of celestial objects as defined in claim 21, further comprising:

D) means for generating the display of a pointing arrow in at least one part of the display device.

35. A system for the display of stereographic three-dimensional images of celestial objects as defined in claim 34, further comprising means for moving the arrow about the display device by user supplied information.

36. A system for the display of stereographic three-dimensional images of celestial objects as defined in claim 21, further comprising:

D) means for selecting the viewing size of the selected portion of the celestial sphere.

37. A system for the display of stereographic three-dimensional images of celestial objects as defined in claim 21, wherein the coordinates of the celestial are in right ascension and declination, and wherein the means for selecting the portion of the celestial sphere includes means for selecting the right ascension and declination of the central location of the selected portion of the celestial sphere.

38. A system for the display of stereographic three-dimensional images of celestial objects as defined in claim 21, further comprising means for displaying the spacial separation of the points of view giving rise to the offset of the celestial objects displayed in the second part of the display device.

* * * * *